(12) United States Patent
Eckhardt et al.

(10) Patent No.: US 10,892,641 B2
(45) Date of Patent: *Jan. 12, 2021

(54) HIGHLY FLEXIBLE, ELECTRICAL DISTRIBUTION GRID EDGE ENERGY MANAGER AND ROUTER

(71) Applicant: GRIDBRIDGE, INC., Raleigh, NC (US)

(72) Inventors: Chad Eckhardt, Raleigh, NC (US); Stephen Timothy Watts, Fuquay-Varina, NC (US)

(73) Assignee: Gridbridge, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,532

(22) Filed: Aug. 30, 2019

(65) Prior Publication Data
US 2020/0006982 A1 Jan. 2, 2020

Related U.S. Application Data

(63) Continuation of application No. 15/321,897, filed as application No. PCT/US2015/022979 on Mar. 27, 2015, now Pat. No. 10,439,432.
(Continued)

(51) Int. Cl.
*H02J 13/00* (2006.01)
*G06Q 50/06* (2012.01)
(Continued)

(52) U.S. Cl.
CPC .......... *H02J 13/0096* (2013.01); *G05B 15/02* (2013.01); *G06Q 50/06* (2013.01);
(Continued)

(58) Field of Classification Search
CPC . G05B 15/02; G06F 1/26; G06F 1/30; H02M 1/42; Y02B 70/3216;
(Continued)

(56) References Cited

U.S. PATENT DOCUMENTS

2002/0036430 A1* 3/2002 Welches ................ F02G 1/043
307/18
2010/0268579 A1* 10/2010 Momoh ................ G06Q 10/06
705/14.1
(Continued)

*Primary Examiner* — Duy T Nguyen
(74) *Attorney, Agent, or Firm* — F. Michael Sajovec; Andrew Shores; Williams Mullen

(57) ABSTRACT

An electrical distribution grid energy management and router device, or GER device, may be installed in a distribution grid, and route power from power supply to one or more power consumers. The GER devices described herein may provide platforms to add one or more features to a distribution transformer, provide additional features and benefits to both the utility company and end consumer, and may serve as a platform for providing other features, such as communications services, local and remote management, and intelligence to components of the distribution grid. A GER device may include sensors to measure electrical properties of incoming and outgoing power, and may include an electrical circuit layer having a central DC power stage. A GER device may include a physical layer providing a communications platform for one or more communication devices that may communicate with other GER devices to form a micro-grid, a utility, power consumers, third parties, and other electrical devices.

19 Claims, 33 Drawing Sheets

Related U.S. Application Data

(60) Provisional application No. 62/015,703, filed on Jun. 23, 2014.

(51) Int. Cl.
| | | |
|---|---|---|
| *H02J 3/14* | (2006.01) | |
| *H02J 3/01* | (2006.01) | |
| *G05B 15/02* | (2006.01) | |
| *H02J 3/38* | (2006.01) | |
| *H02J 3/18* | (2006.01) | |
| *H02M 1/42* | (2007.01) | |

(52) U.S. Cl.
CPC ...... *H02J 3/01* (2013.01); *H02J 3/14* (2013.01); *H02J 3/18* (2013.01); *H02J 3/381* (2013.01); *H02J 3/383* (2013.01); *H02J 3/386* (2013.01); *H02J 13/0006* (2013.01); *H02J 13/0079* (2013.01); *H02M 1/42* (2013.01); *H02J 3/382* (2013.01); *H02J 2310/14* (2020.01); *H02J 2310/64* (2020.01); *Y02B 70/3225* (2013.01); *Y02B 70/3266* (2013.01); *Y02E 40/72* (2013.01); *Y04S 10/123* (2013.01); *Y04S 20/222* (2013.01); *Y04S 20/224* (2013.01); *Y04S 20/242* (2013.01)

(58) Field of Classification Search
CPC ... Y02B 70/3266; Y04S 20/221; G06Q 50/06; H02J 13/0006; H02J 13/0079; H02J 13/0096; H02J 2300/20; H02J 2310/14; H02J 2310/64; H02J 3/01; H02J 3/14; H02J 3/18; H02J 3/381; H02J 3/382; H02J 3/383; H02J 3/386
USPC .......................................................... 700/295
See application file for complete search history.

(56) References Cited

U.S. PATENT DOCUMENTS

| | | | |
|---|---|---|---|
| 2011/0071695 A1* | 3/2011 | Kouroussis | H02J 3/1892 700/295 |
| 2012/0050971 A1* | 3/2012 | Seal | H05K 5/0004 361/679.02 |
| 2013/0024042 A1* | 1/2013 | Asghari | H02J 3/381 700/295 |
| 2013/0041516 A1* | 2/2013 | Rockenfeller | H02J 3/38 700/287 |
| 2013/0342011 A1* | 12/2013 | Robinson | G06F 1/263 307/12 |

* cited by examiner

HIGHLY FLEXIBLE, ELECTRICAL DISTRIBUTION GRID EDGE ENERGY MANAGER AND ROUTER

RELATED APPLICATIONS

This application is a Continuation of U.S. Nonprovisional application Ser. No. 15/321,897, filed Dec. 23, 2016, which claims the benefit of International Application PCT/US2015/22979, filed Mar. 27, 2015, which claims priority to U.S. Provisional Application No. 62/015,703 filed on Jun. 23, 2014; and claims priority to International Application PCT/US2015/043396, filed Aug. 3, 2015, which claims priority to U.S. Provisional Application No. 62/032,186 filed on Aug. 1, 2014, each of which is hereby incorporated in its entirety.

STATEMENT REGARDING GOVERNMENT SUPPORT

None

FIELD

This application relates to devices, systems, and methods for electrical distribution grid edge energy management and routing.

BACKGROUND

Advanced power delivery is essential to meeting the growing demand for power distribution. Power consumers expect safe and reliable electricity, and the generation and consumption of power is increasingly monitored, analyzed, scrutinized, and reported. Further, the environmental effects of the worldwide increase in energy demand are alarming, raising the need for enhanced efficiency in not only power generation, but also power distribution and use. Power delivery systems need to evolve. Today's electrical grid, for example, was designed for a less-demanding consumer, in a less-demanding time, and for a significantly less-demanding purpose.

Consumers' steady adoption of new energy-related technology has the potential to reduce the price of adopting and exposing weaknesses in the fragile electrical distribution grid. The power distribution grid, which may also be referred to as the grid, was designed over a century ago. The grid was designed without anticipating the need to accommodate solar panels, wind turbines, electric vehicles, energy storage, and many other devices. Simultaneously, consumer intolerance for extended outages has grown, efficiency mandates are numerous, and traditional generation practices are being scrutinized. A need for a modernized grid exists The power distribution substation is, in most distribution grids, the last point of "energy traffic control" before electricity is sent downstream to thousands of consumers. The growing emphasis on generation emissions and pressures to reduce carbon footprints necessitate system-wide efficiency gains, and exposed the limitations of the distribution grid and substation design. Because utilities (i.e., power providers) are able to control distribution only up to a power substation, utilities are limited on achievable efficiency gains in the overall grid. Furthermore, centralized software platforms approach promised some degree of improved efficiency and load management, but the required a complicated complementary environment and supporting infrastructure not heretofore seen. Modernizing the distribution grid in this fashion will create the growing need for an immense communications bandwidth, extensive centralized processing power, numerous functioning downstream sensors, and intelligent hardware able to enact organized adjustments on a granular scale.

The distribution transformer is an example of a grid edge component with limited usefulness in a modernized grid. Electric utility systems typically distribute power using transmission and distribution networks. High voltage (e.g., 69 kV and above) transmission networks are used to convey power from generating stations to substations that feed lower voltage (e.g., 35 kV and below) distribution networks that are used to carry power to homes and businesses. In a typical distribution network used in residential areas, for example, a 7.2 kV single-phase distribution line may be run along a street, with individual residences being fed via respective service drops from distribution transformers that step down the voltage to a 120/240V service level. The electrical distribution system in the United States, for example, includes millions of such distribution transformers.

The edge of most modern electrical distribution networks or grids, e.g., the grid location just before demarcation to an end customer, or upstream of a power meter, is represented by a distribution transformer performing the last voltage reduction to the customer's consumed voltage (usually 100-600 Vac). Although conventional distribution transformers are rugged and relatively efficient devices, they generally have limited control capabilities. For example, the impedance of the load connected to a distribution transformer typically dictates reactive power flow through the transformer, as typical conventional distribution transformers have no ability to control reactive power flow. In addition, while traditional distribution transformers can be enhanced to adjust voltage provided to the load using mechanisms such as tap changers, such capabilities are typically more expensive and seldom used, and typically cannot effectively regulate the load voltage in real time to compensate for transient sags and spikes. Conventional distribution transformers also typically have no capability to compensate for harmonics introduced by non-linear loads. Hybrid transformers that may address some of these issues are described in U.S. Pat. No. 8,013,702 to Haj-Maharsi et al., U.S. Patent Application Publication No. 2010/0220499 to Haj-Maharsi et al., U.S. Patent Application Publication No. 2010/0201338 to Haj-Maharsi et al. and the article by Bala et al. entitled "Hybrid Distribution Transformer: Concept Development and Field Demonstration," IEEE Energy Conversion Congress & Exposition, Raleigh, N.C. (Sep. 15-20, 2012). However, today's distribution transformer has no intelligent computing sub-system and is essentially a simple, one-function, passive component.

The limitations of the transformer are only one example of the hurdles facing a modernized distribution grid. Today's grid also has a limited ability to integrate renewable power generation, as can be seen by the number of consumers seeking to integrate sources such as photovoltaic (PV) systems, and the correlated mandates to connect such devices to the grid. The distribution grid was originally designed for large centralized generation facilities and power flow in one direction—to the consumer. Unfortunately, centralized generation can neither sync with hundreds of power sources nor accommodate their variability. Although utilities have experimented with various energy storage solutions, there is still a need for an intelligent orchestration of power flow between the generation, storage, and load.

The outdated distribution grid and lack of intelligent grid components is also apparent from the broad societal effects of extended outages. Power outages often result from an inability to sectionalize smaller portions of the grid, and reroute power to the healthy sections in an intelligent and controlled manner. Grid reliability and resilience are principal initiatives at many utilities. The distribution grid limitations described above will continue to hinder these initiatives. Traditional utility equipment, grid assets, and supporting distribution and routing methodology, will not be enough to enable such initiatives. What is needed is a new generation of versatile equipment with advanced capabilities is imperative to permit utilities to meet regulatory mandates, remain competitive, and evolve with customer needs.

SUMMARY

What is needed is the introduction of intelligent and adaptable capabilities in the power distribution grid, and preferably at the grid edge at either the consumer's location or the distribution transformer, downstream of the substation. Similarly, what is needed is the introduction of granular power control at key intersections throughout the grid. Described herein are devices, systems, and methods that combine innovative power electronics-based devices with advanced software and communications capabilities.

Described herein are electrical distribution grid edge energy manager and router devices, generally referred to as the "GER device," and systems and methods to utilize embodiments of GER devices in the power distribution grid for efficient power distribution, routing, and management. Embodiments of the GER device support ongoing power system evolution, such as by empowering utilities and consumers to achieve multiple objectives simultaneously with the power delivery system. Embodiments of the GER device may integrate renewable generation, significantly increase distribution efficiency, optimize distribution electricity flow, and increase overall grid reliability and resilience, through one or more of the features and methods described herein.

In some embodiments, end users of embodiments of the GER device may be utilities, including power generation companies, power distribution companies, operators of power substations and/or distribution transformers, generation locations, and ultimate users of the GER device. In this disclosure, the term consumer generally and broadly refers to the recipient and/or user of electrical power from a power distribution grid, such as, for example, a home owner, a building owner or operator, an institution or facility, and typically (but not always) will be customers of a utility company.

Numerous embodiments of a GER device are possible. The following description is in no way intended to be limiting with respect to the scope of the disclosure. For example, a GER device may include a primary electrical connection terminal for receiving power, and at least one secondary electrical connection terminal for supplying power. Power may be received, for example, from an electrical grid power supply, such as a power distribution transformer or a power substation. The GER device may provide power to, for example, a consumer electrical supply line, such as a supply line providing power to a consumer premise. The GER device may include a modular electrical circuit layer. The modular electrical circuit layer may include one or more circuits as described below. For example, the modular circuit layer may include a power processing circuit for receiving power from the primary electrical connection terminal and providing power from the central DC stage to at least one of the at least one secondary electrical connection terminal.

In some embodiments, the modular circuit layer may include a central DC power stage. The power processing circuit may be configured to convert power received at the central DC power stage to DC power, and to convert DC power exiting the central DC stage to AC power. A central DC power stage may advantageously allow for incorporating power supplied by AC power sources and DC power sources. A central DC power stage may also allow for providing power to AC power loads and DC power loads. A central DC power stage may also allow for AC phase synchronization.

Embodiments of the GER device may include a controller layer configured to control other features, functions, components, and/or layers of the GER device. For example, a controller layer may control the modular electrical circuit layer. The controller layer may include one or more computer processors and non-volatile memory, and may be configured to run one or more algorithms as described in more detail below. Algorithms may include, for example only, internal status algorithms, grid event management algorithms, power distribution algorithms, algorithms for managing reactive power, safety protocols, internal bypass algorithms, cooling and heat management algorithms, cold start protocols, micro-grid formation and management protocols. One of ordinary skill should recognize that numerous algorithms may be developed and used to enable the features and functions described below, with respect to both a single GER device and also a micro-grid formed from more than one GER device.

Embodiments of the GER device may include a physical layer comprising, for example, one or more communication devices. The physical layer may be configured to provide one or more communications services, through one or more communication devices. A communication device may be in operable communication with the controller layer. In some embodiments, a communication device may communicate with one or more of an end user, such as a utility, a consumer, and other GER devices.

Embodiments of the GER device may include one or more bi-directional DC power connection ports. A DC power connection port may be configured for electrical communication with a DC power resource, and may be in electrical communication with a central DC power stage. For example, a DC power connection port may provide DC power to or from a central DC power stage.

Embodiments of the GER device may include one or more AC power connection ports. An AC power connection port may be configured for electrical communication with an AC power source, and may be in electrical communication with an AC-to-DC power converter. The AC-to-DC power converter, in turn, may be in electrical communication with the central DC stage. In some embodiments, the GER device may receive power from and/or supply power to AC power devices and DC power devices.

Embodiments of the GER device may contain one or more sensors for sensing various parameters. For example, sensors may monitor at least one of voltage, current, power quality, and device load. Sensor may be used to monitor the primary electrical connection, secondary electrical connections, and various stages, circuits, components, and layers within a GER device.

In some embodiments, a GER device may use one or more sensors in connection with distributing power, monitoring loads, and adjusting for power quality, for example.

Embodiments of the GER device may include a Power Quality Meter, which may be a physical device or a virtual device, for measuring power quality of the primary electrical terminal and the at least one secondary electrical terminal. Embodiments of the GER device may include a virtual AMI meter, for measuring load on the GER device. In some embodiments, the GER device may measure load on one or more consumers receiving power from the GER device. For example, a GER device may include one or more current sense connection sockets for current sense cables that monitor electrical parameters on a secondary electrical connection terminal or supply line.

A GER device may be configured for mounting on a pole, on a transformer pad, and/or on a building or consumer location. For example, a GER device may include an outer enclosure enclosing at least a portion of the GER device, and the enclosure may be configured for mounting on at least one of a pole, a pad, and a building. Embodiments of the GER device may include one or more heat sinks.

Embodiments of the GER device may include a variety of communications devices, features, and functionality. A GER device may communicate with other GER devices, an end user, a consumer, third parties, and other electrical devices, for example. For instance, a GER device may include a communications link configured to receive data indicative of at least one of power provided to at least one consumer, and power demanded by at least one consumer.

Embodiments of the GER device may include a Power Factor Correction stage and a Voltage Regulation stage. Some embodiments may include at least one harmonics filter.

DETAILED DESCRIPTION

Figure 1:
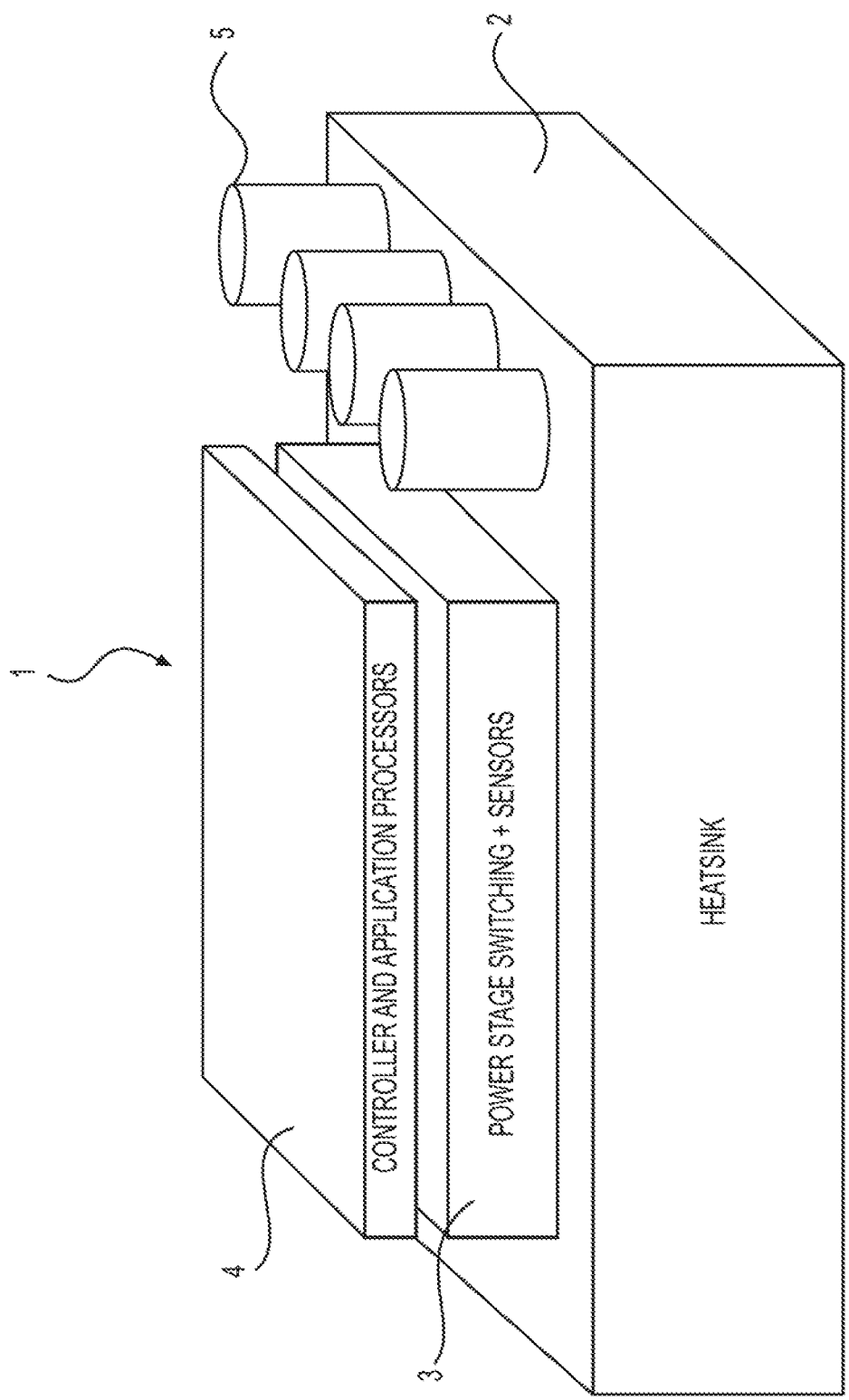
FIG. 1 illustrates an embodiment of an electrical distribution grid edge energy manager and router device.

The following paragraphs describe various embodiments and features of an electrical distribution grid edge energy manager and router device, generally referred to as the GER device. It should be understood that numerous embodiments of the GER device are described herein, and thus a GER device may incorporate any number of the features described below. Likewise, the embodiments of methods for managing and routing electrical distribution described below may use different embodiments of a GER device.

Embodiments of the GER device may serve as an energy manager and router at or near the edge of an electrical distribution grid. Disclosed herein are embodiments of a GER device that may be used as a scalable energy management platform solution for one or more end customers in an electrical distribution network. It should be understood that the "end customer" referred to herein is generally the user of electrical power provided by an electrical distribution network, such as the tenants of a single family dwelling, institution, industrial location, or office building, as examples. GER devices described herein may be owned and/or operated by a utility provider (e.g., power company), and serve as a customer-centered platform to manage energy provision and usage. It should be understood that alternative ownership and operation arrangements are possible.

The GER devices described herein may provide a platform to add one or more features, described below, to a distribution transformer. GER devices also provide additional features and benefits to both the utility company and end customer, in particular by leveraging the value of the installation position of the distribution transformer (e.g., on a pole or a pad close in proximity to the consumer's premises). Additionally, GER devices may serve as a platform for providing other features, such as, for example, communications services, local and remote management, and intelligence to components of the electrical distribution grid.

While embodiments of the device may be used in conjunction with a distribution transformer, some embodiments of the device, discussed below, also include the functionality of the existing distribution transformer (e.g., voltage step down to the voltage level used by a consumer), and therefore can entirely replace the distribution transformer.

A GER device may be a self-contained unit, and may be located downstream of an energy source, such as a distribution transformer, and upstream of an energy consumer's connection to the energy distribution grid, such as a consumer's service breaker panel. Embodiments of the GER device may provide energy management and routing services (among other features and services) to one or more customers. Embodiments of the GER device may be configured for one or more mounting locations, such as, for example, mechanical mounting to a power line or utility pole, a ground-based pad mounting, or attached to the customer premise. Embodiments of the GER device may be thermally stable and thermally managed through various mechanisms, including but not limited to convection, heat pipes, optional forced air and thermoelectric coolers, as examples. Embodiments of the GER device may include a modular multi-stage power processing circuit that can be scaled to multiple power levels based on application requirements. Embodiments of the GER device may include a computing system, consisting of one or more microprocessor(s) and enabling embedded software for control/status, self-management, micro grid management and communications.

Embodiments of the GER device may include one or more physical layer communications devices, including but not limited to: Wi-Fi, Wi-Max, cellular, and power-line-carrier. Some embodiments may include non-volatile storage. Some embodiments may include a rechargeable battery backup. The backup may be, for example, power-over-Ethernet (PoE), on device photovoltaic (PV) systems, a high-voltage (HV) inductive coil, among other conventional rechargeable power supplies. The battery backup may provide for, as examples, continued internal operations (such as communications) during power outages, and initial start-up when attached to a high voltage feeder. Embodiments of the GER device may include a GPS location service. Embodiments of the GER device may include one or more user interfaces (UI). The UI may be hardwired to the device, integral to the device, or linked to the device. For instance, the UI may be linked to a GER device by a local RF link, a customer premise link, and a utility central office link. A bypass capable capability upon device fault or command. Features of the GER device, such as those described above and below, may be added to the GER device in a modular fashion. Modules may include hardware and/or software.

Embodiments of the GER device may include one or more functional units mounted onto a main heat sink. In some embodiments, the heat sink and mounted functional units may be enclosed in an outer enclosure, and the outer enclosure may be configured for (i) pole mounting, such as on an electrical line pole, (ii) mounting on a pad mount, or (iii) mounting on an end consumer's premise.

Mounting of equipment on a utility pole, a utility pad, or at the customer premises presents very different mechanical challenges, especially when various power levels are considered. Generally, meeting such challenges require multiple and independent mechanical designs or configurations. However, in some embodiments of the GER device, these mounting challenges are met through strategically mounting of some or all of the functional components (including, for example, power stage switches, a main controller, an application controller, and sensors) on the heat sink, and then subsequently mounting the heat sink inside a customized outer enclosure tailored to the specific mounting requirements of a particular installation. In such embodiments, the functional switching components may be placed within a module which is transferrable across multiple application environments. The common functional unit may be configured to reside in a multitude of external enclosures and a number of mounting options. Additionally, using a common functional unit reduces manufacturing and inventory costs.

FIG. 1 illustrates an embodiment of an electrical distribution grid edge energy manager and router device 1. In this embodiment, the GER device 1 includes heat sink 2, a power stage switching and sensor layer 3, a controller and application processor(s) layer 4, and one or more DC capacitors 5. It should be understood that more than one layer may be used for various sub-components. For example, switching circuits and sensors may be on more than one layer and may be on separate layers. It should also be understood that sub-components may be one the same or different layers. For example, switching circuits and controller processors may be on the same layer. One or more layers may be modular, such that a layer may be removed from GER device 1 and replaced with a different layer, such as an upgraded layer or a layer providing one or more additional and/or different features.

GER device 1 may be inserted into the distribution grid in several locations. For example, GER device 1 may be attached directly to a distribution transformer, mounted on a power line pole or similar structure, attached to a ground-based mounting pad, or attached to a consumer's location (e.g., a consumer's premise). GER device 1 may be configured for one or more mounting options. For example, embodiments of the GER device may feature a common heat sink 2 and/or layers and components for use with one or more mounting configurations. The common heat sink 2 and/or layers and components may be enclosed in a pole-mountable and/or a pad-mountable outer enclosure. The various components, including switching components for power processing, may be located on one or more transferrable modules for multiple application environments.

Figure 2:
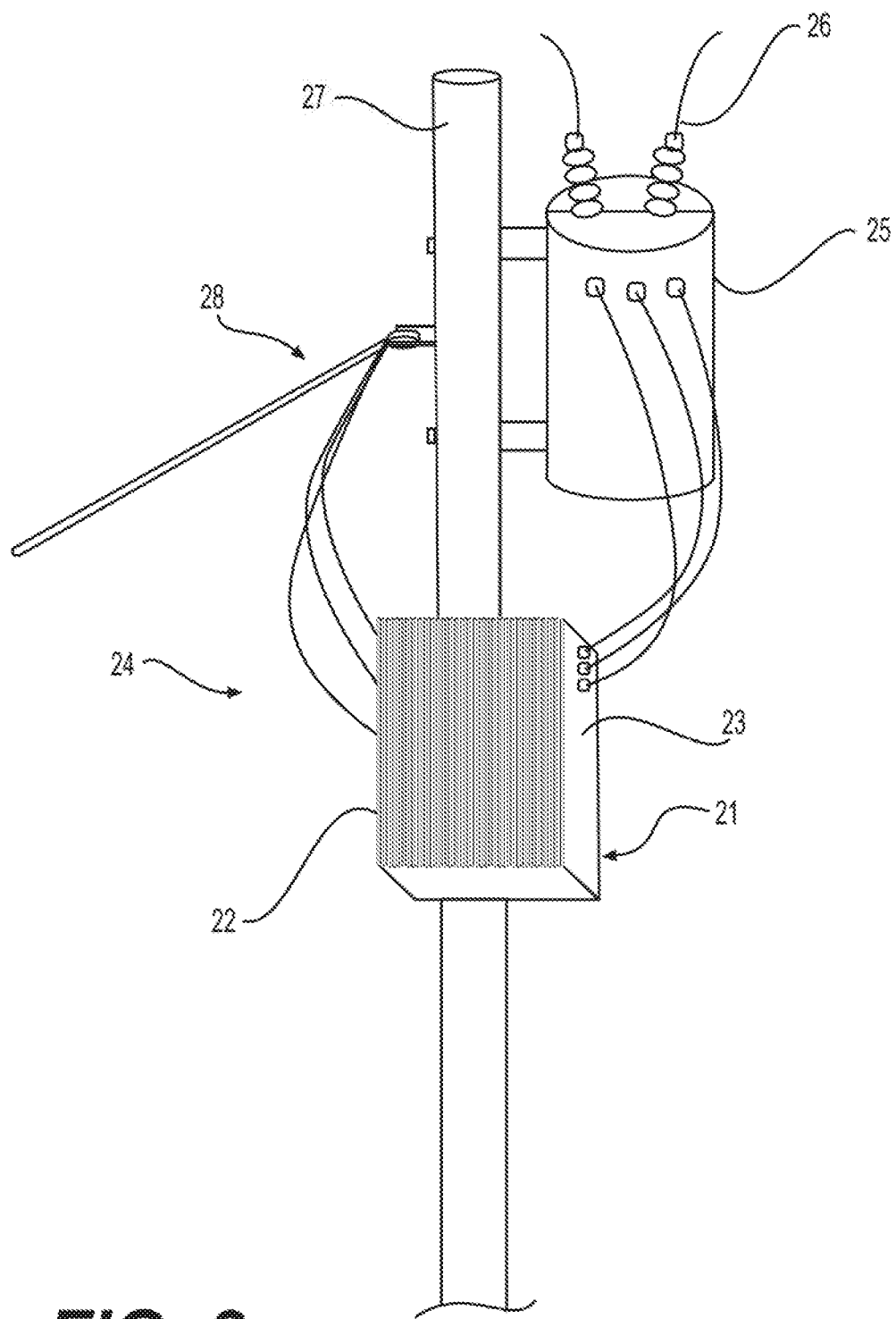
FIG. 2 illustrates an example of a pole-mounted embodiment of an electrical distribution grid edge energy manager and router device.

FIG. 2 illustrates a pole-mounted embodiment of an electrical distribution grid edge energy manager and router device. In this embodiment, GER device 21 includes an external heat sink 22, and is mounted on utility pole 27. Distribution transformer 25 receives power from high voltage input 26 from an electrical grid (not shown), and outputs power to the GER device 21 primary input 23. GER device 21 outputs power from secondary 24 to supply line 28, which provides power to an end consumer (not shown).

In some embodiments of pole-mounted GER devices, the GER device 21 may be located below the distribution transformer 25, and offset at about 90 degrees on the pole 27 relative to the distribution transformer 25. FIG. 2 demonstrates such a configuration. (One of ordinary skill in the art should appreciate that the components shown in FIG. 2, and many other figures appended hereto, are not shown to scale.) The offset aids with cable dressing from the secondary of the distribution transformer 25, through the device 21, and ultimately to the end consumer through supply line 28. Efficient cable arrangements as shown in FIG. 2 provide numerous benefits. For example, such arrangements allow for quicker and safer installation, easy bypass of the GER device 21 if necessary, loss reduction between units, and require little—if any—changes to the existing transformer 25. The arrangements also simplify retrofit installation. Thus, mounting a GER device in close proximity to the distribution transformer minimizes disturbance to the existing wiring, minimizes electrical losses, and enables simplified mechanical bypass and device removal when necessary. In some embodiments, a GER device may attach directly to a distribution transformer. In some embodiments, the outer enclosure of a GER device may be configured for convenient attachment to a distribution transformer, such as, for example, by having similar geometries and simple attachment mechanisms.

Figure 3:
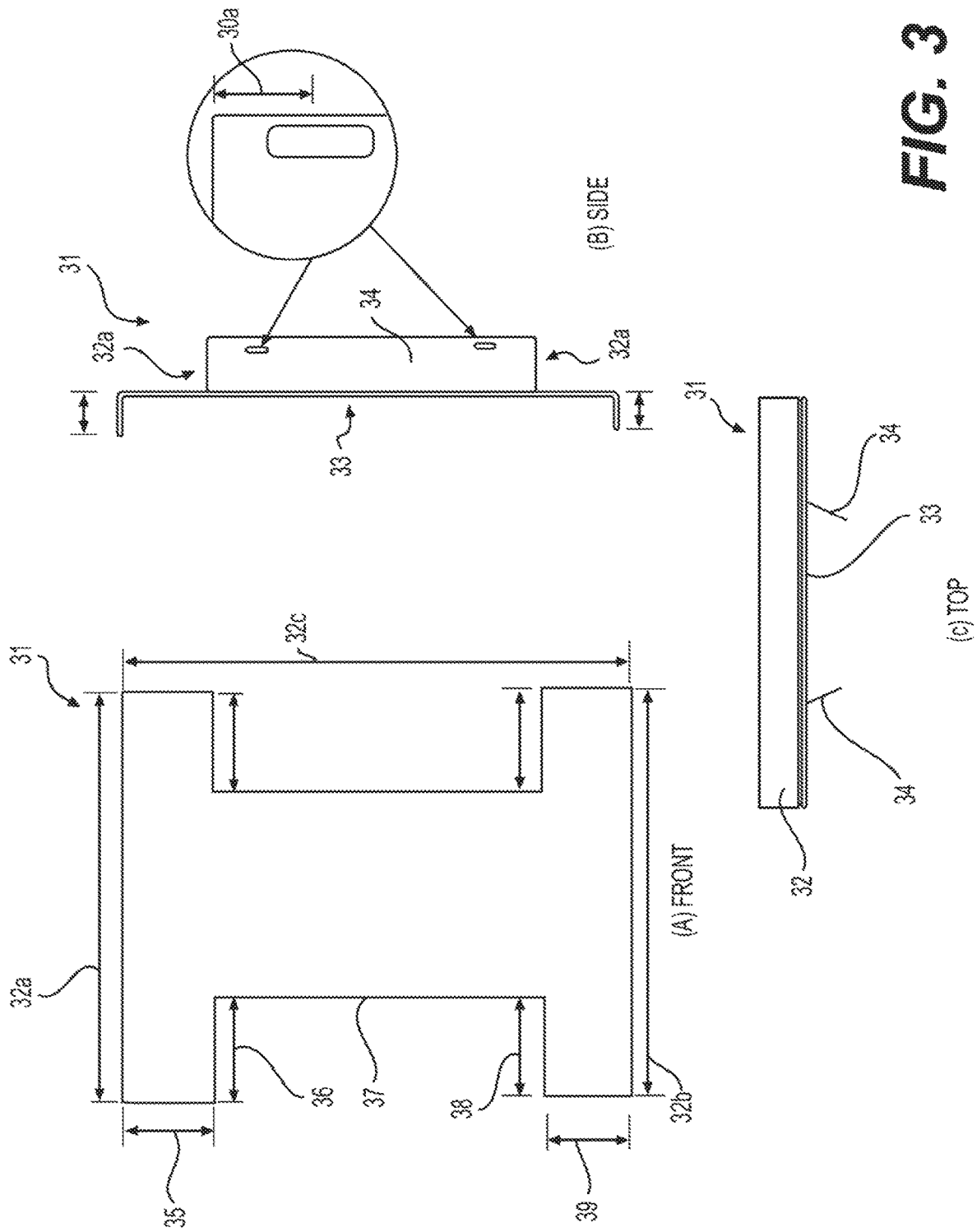
FIG. 3 shows a schematic of an embodiment of one possible bracket for pole mounting embodiments from (a) the front, (b) the side, and (c) the top of the embodiment.

Embodiments of the GER device may incorporate multi-use mounting brackets configured for connecting the device to a pole, such as, for example, by strapping or bolting. Embodiments of the GER device may be configured for use with a multitude of pole materials and pole diameters. FIG. 3 shows a schematic of an embodiment of a bracket for pole mounting embodiments from (a) the front, (b) the side, and (c) the top of the embodiment. Although the following description includes dimensions for an embodiment of the bracket shown in FIG. 3, it should be appreciated that a wide range of brackets may be used for mounting a GER device, and a bracket may be configured as needed.

In the embodiment shown in FIG. 3, bracket 31 allows the device (not shown) to be mounted on a pole via a strapping method. Strapping slots 30, which may be offset from a side or top surface by 30a, about 1-4 inches, provide for use of straps to attach the bracket 31 to a pole. Viewed from the front, bracket 31 may have an I-shape. In some embodiments, the width of top 32a and bottom 32b of bracket 31 may be about 20 inches, the height 32c may be about 24 inches. In some embodiments, sides 35 and 39 may be about 7 inches, and indented surface 36 and 38 may be about 5 inches. One of ordinary skill in the art should appreciate that bracket 31 may feature different dimensions as needed. The embodiment in FIG. 3 uses a strapping method to connect the bracket 31 to a pole (not shown), but other methods for connecting bracket 31 to a pole may be used. Generally, a strapping method provides flexibility for adjusting to pole diameter variations, and accommodates pole materials not well-suited for drilling and bolting. Bracket 31 may include attachment arms 34 that may be bent by an angle along a long axis of a pole to improve the mounting of bracket 31 to a pole. As seen in the top view, mounting arms 34 may provide contact area along the outer surface of the cylindrical pole. A mounting arm may be bent by an angle according to the diameter of the pole and width of the bracket. For example, in the embodiment shown in FIG. 3, mounting arms 34 are bent by about 110 degrees relative to the rear surface of the bracket 31. By altering the angle of the attachment arms 34, a large range of pole diameters can be accommodated. Straps may also include strapping holes for providing other mechanisms to connect a bracket to a pole, such as, for example, bolt attachment on poles. One of ordinary skill in the art should appreciate that the bracket may connect the GER device to a pole through another technique, such as bolting.

Figure 4:
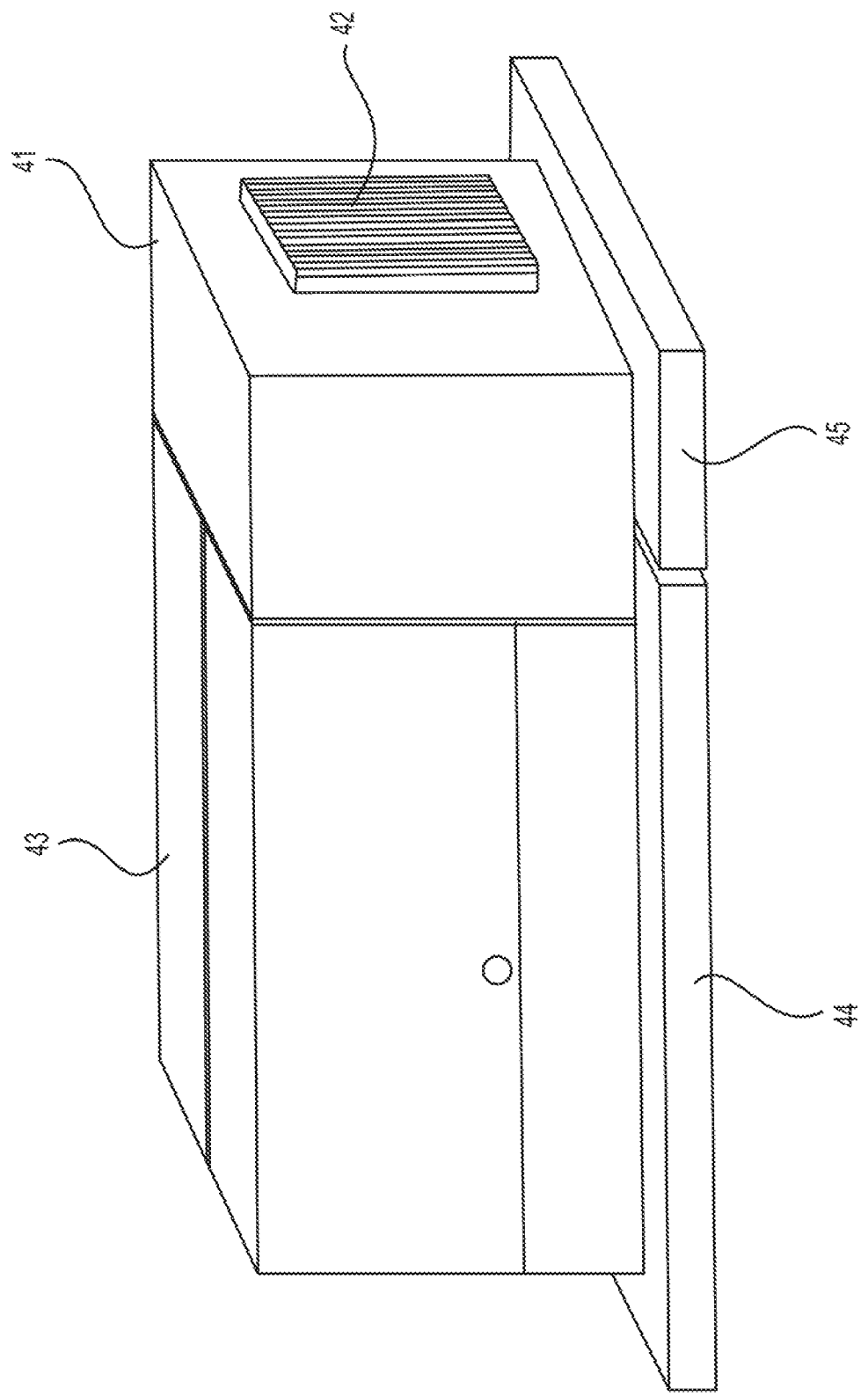
FIGS. 4 and 5 illustrate pad-mounted embodiments of an electrical distribution grid edge energy manager and router device.
Figure 5:
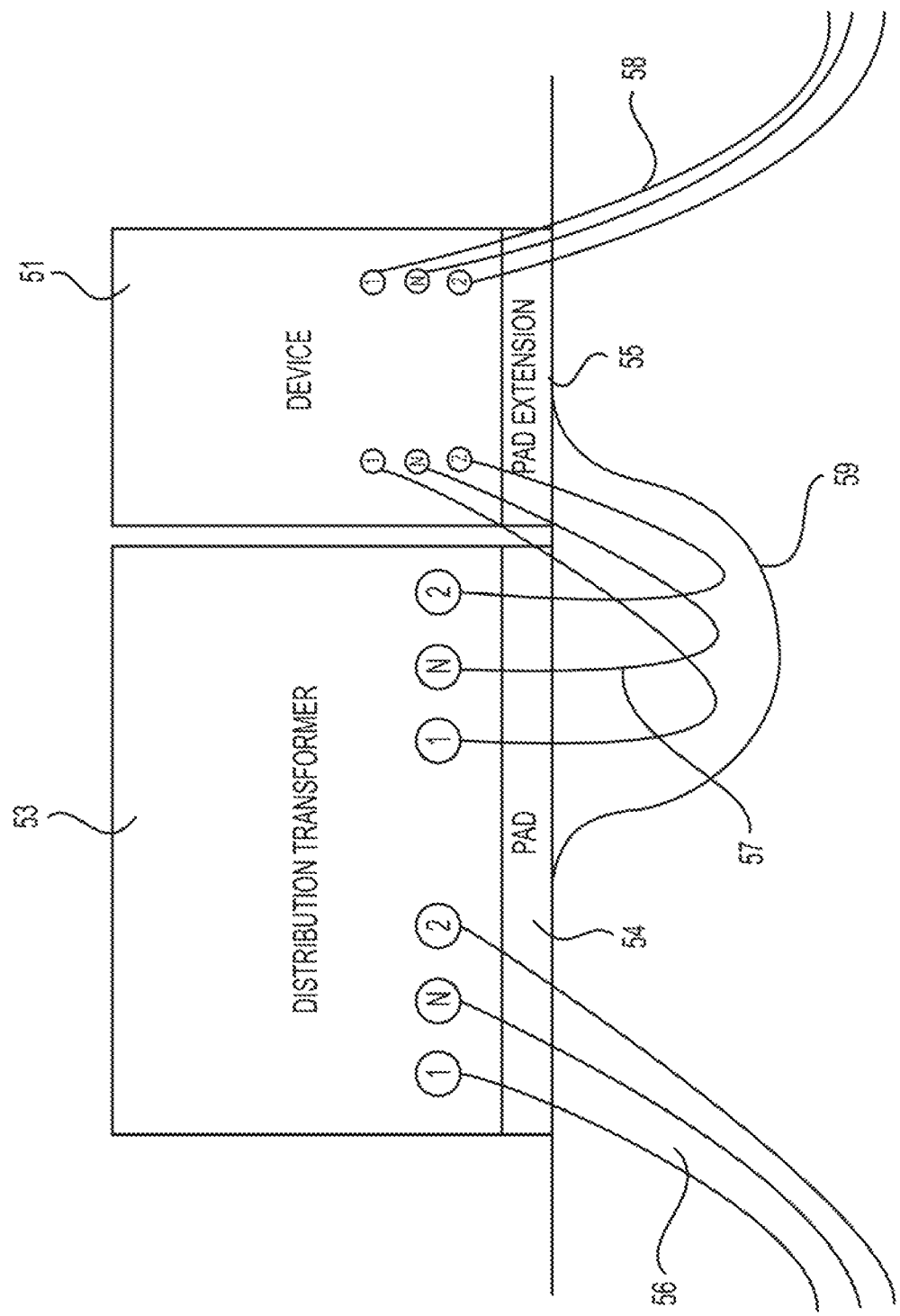

Embodiments of the GER device may be mounted on existing pads. FIGS. 4 and 5 illustrate pad-mounted embodiments of an electrical distribution grid edge energy manager and router device. In the embodiment shown in FIG. 4, GER device 41 is mounted on pad 44 supporting transformer 43. Some embodiments may require a pad extension 45, should the pad 44 supporting the transformer 43 not provide sufficient mounting surface for GER device 41 and heat sink 42. Some embodiments may further include a hood that covers all or a portion of any exposed surfaces of the heat sink 42. For example, a hood may be a thin box-like structure having vent holes that allow for heat exchange. Mounting a GER device 41 on a pad may require more surface area than would normally be provided by the existing pad 44. In such scenarios, pad mounting may be achieved by the addition of an extended external enclosure sitting partially or completely on a pad-extension 45 thus adding the extra area. The common functional unit described above may be enclosed in the outer enclosure mounted on the pad extension.

In some embodiments, cabling for standard pad mounted transformers enters and leaves from a space below the pad cut into the ground. When an additional pad is placed next to the existing pad, the pit below the existing pad may be further dug out to increase the volume of cable management space below the whole transformer and device. Primary cables enter as before and are connected to the primary input of the distribution transformer. Cables from the secondary of the distribution transformer that previously exited the pit to attach to the load may be attached to the secondary of the GER device. The secondary of the distribution transformer is attached to the primary of the GER device, such as a multiport connection bar, via a short cable assembly that may be housed in the pit or trench. For example, in the embodiment shown in FIG. 5, GER device 51 is mounted on pad extension 55, and cables 55 exit transformer 53 under pad 54, traverse through a pit 59, and enter device 51.

Figure 6:
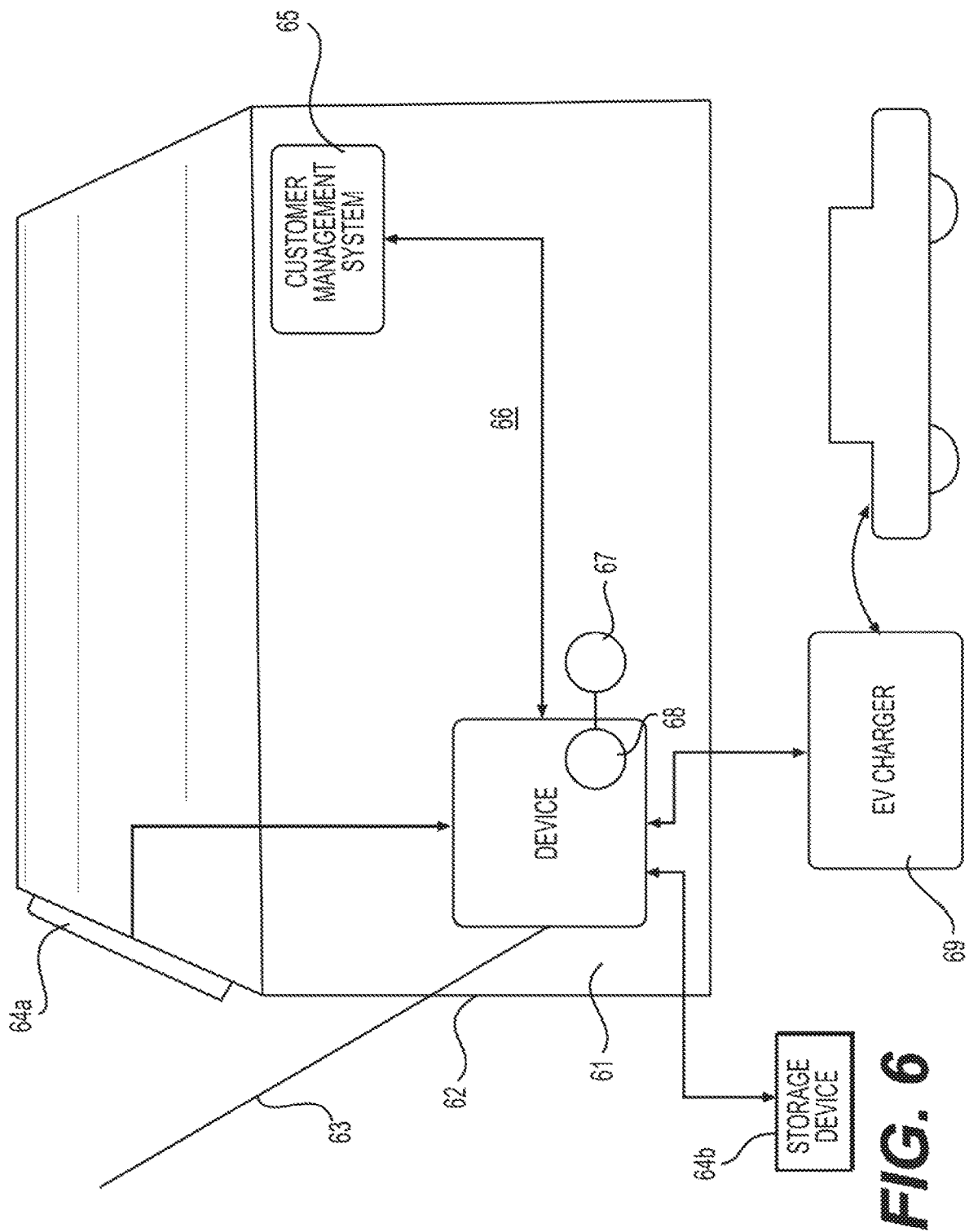
FIG. 6 shows an embodiment of an electrical distribution grid edge energy manager and router device mounted on a power consumer's premises.

Under certain application scenarios the device may be mounted at the customer premises. FIG. 6 shows an embodiment of an electrical distribution grid edge energy manager and router device mounted on a power consumer's premises.

The GER device 61 in FIG. 6 is attached to the customer premises 62, preferably close to the location of the metering unit 67 to simplify and reduce the cost of installation and connection. The GER device 61 may include a communications link 66 to the customer premises management system 65, such as, for example, an RF link or wired link. The utility supplied line 63 attaches to the GER device 61, through physical cabling, and preferably before connecting to the power grid within premises 62. The GER device 61 may include one or more onboard meters 68, as described elsewhere herein, or the device may integrate the functionality of an existing meter 67. Some premises 62 may include power generation devices such as photovoltaic cells 64a and battery or other energy storage device 64b. Some premises 62 may include additional power charging supply lines, such as electrical vehicle charger 69. Such devices may be attached to the GER device 61. The attachment may be via a DC port, as described in more detail below.

This mounting option has certain advantages in terms of ease of installation, added bypass capability, easier tie in to customer owned renewables, and home automation and use of existing AMI connections, to name a few. Premises mounting may be achieved in a number of manners, including, for example, a standard pad mount option on the side of the customer premises 62 of a wall mounted external enclosure. In any mounting option, a common functional unit may be used within the GER device 61.

The mounting versatility of embodiments of the GER device 61 allow for a centrally located junction point on the consumer's premise 62 for numerous features and services described herein, including, for example, metering, power parameter control, DC-connectivity, and/or home automation control, and aggregation. Mounting of a utility-controlled apparatus on the consumer's premises 62 permits easy installation, integration, and maintenance, which may include internal metering functions.

Figure 7:
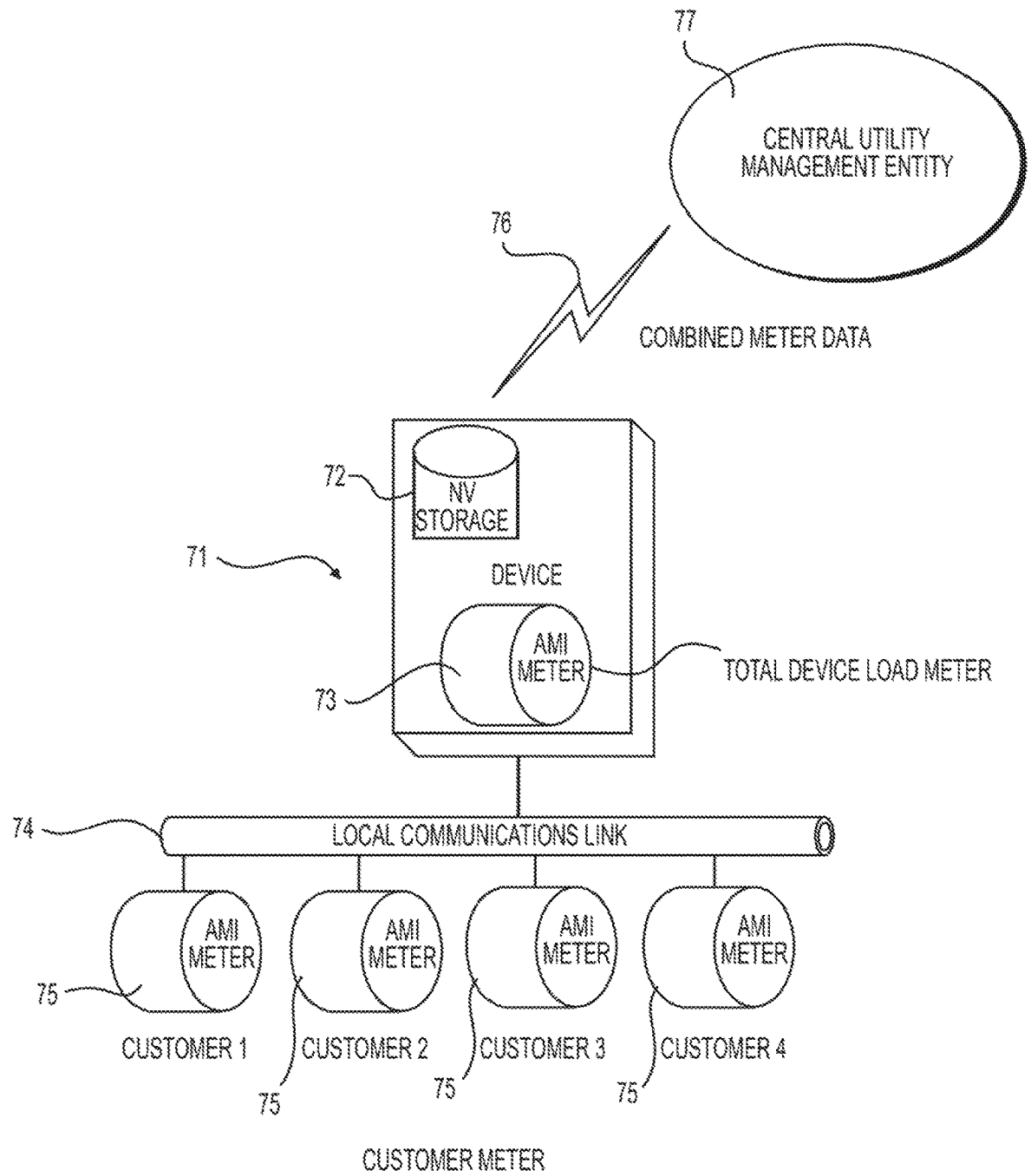
FIG. 7 illustrates an embodiment of an electrical distribution grid edge energy manager and router device integrating AMI features for a plurality of power consumers.

Advanced Metering Infrastructure (AMI) is likely to be deployed throughout large portions of most electrical distribution grids worldwide. The amount of data generated and communications bandwidth consumed is likely to become an important issue for electric utilities. FIG. 7 illustrates an embodiment of a GER device 71 integrating AMI features for a plurality of power consumers, Customers 1-4.

Metering data may be collected from individual consumer meters 75 by GER device 71, which may then process the metering data and then transmit the data 76 (processed or unprocessed) to centralized utility facilities 77, such as for billing purposes, for example. The GER device 71 may use a local communications link 74 to communicate with one or more consumer meters 75. As more components within the distribution grid become intelligent components, more communications traffic results, and a more complex and heavily utilized communications infrastructure is required. The GER device 71 may provide the ability to integrate AMI features for one or more consumers, and may locally aggregate data from multiple AMI meters 75. Integration of the AMI function 73, such as for a total load meter on the GER device 71, may reduce capital costs, particularly where the common functional units include the required metering. Additionally, the device installation location may reduce the potential for tampering due to the reduced access. Furthermore, communications requirements for the consumer AMI meters 75 may be integrated with onboard GER device 71 communications systems, thus reducing general traffic overhead or the number of specific communications links required. Aggregation of several local streams of AMI traffic may also significantly reduce AMI traffic overheads and management needs, which may become valuable as data traffic volume proliferates over time.

Some embodiments of the GER device 71 may include onboard non-volatile storage 72. During times of communications outage, AMI data can be stored within the non-volatile storage 72 for later processing and/or transmission. Local processing of meter data for power management, demand management, and other electric utility purposes, are among the advantages of including an onboard AMI meter 73 in a GER device 71. Decentralized storage of metering data through various integrated data storage methods may be included in embodiments of a GER device 71. Strategic physical installation and onboard encryption methods may be used to reduce the risk of AMI tampering.

Voltage, current, and power sensing are also features that may be included in embodiments of the GER device. Increasingly intelligent, efficient, and reliable distribution grids require an increased number of sensing points where a utility acquires knowledge of voltage, current and power quality. Increasing the number of sensing points adds visibility to the utility, which in turn allows for improved decisions concerning dynamic distribution grid management and faster responses to faults.

Figure 8:
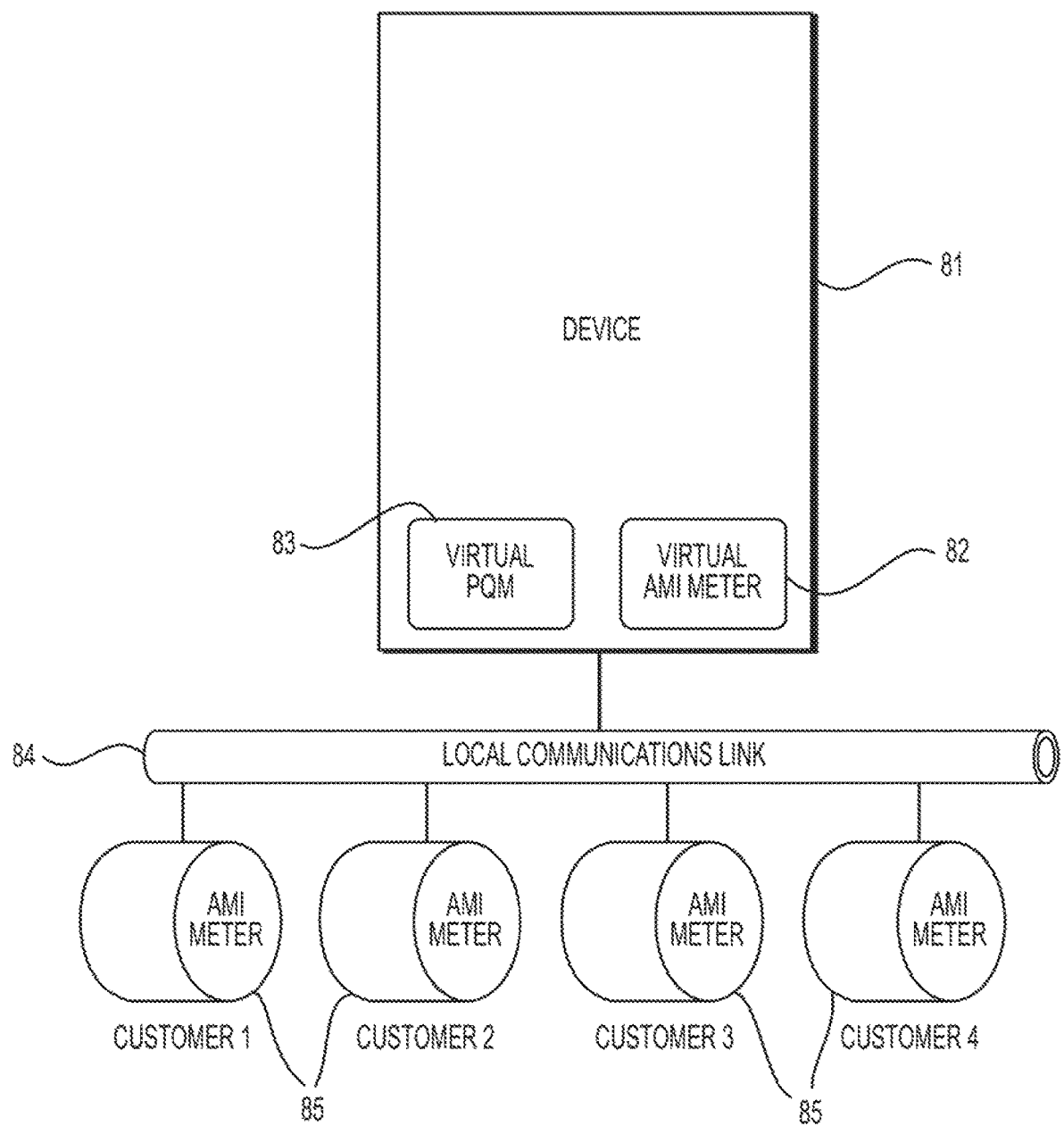
FIG. 8 illustrates an embodiment of an electrical distribution grid edge energy manager and router device operating as a virtual PQM and virtual AMI meter.

FIG. 8 illustrates an embodiment of an electrical distribution grid edge energy manager and router device 81 providing virtual PQM 83 and virtual AMI meter 82 services. Embodiments of the GER device 81 may sense and process data including voltage, current, power quality, and device load, for use in various applications, such as decision making and various analytics. The GER device 81 may receive data from one or more consumer meters 85, through a local communications link 84. Embodiments of the GER device 81 may contain voltage and current sensors at one, more than one, or all external electrical connection terminals. Numerous sensing points allow the GER device 81 to perform several functions, including, for example, voltage regulation and VAR injection (Power Factor Correction) as described below. The voltage, current, frequency and power data sensed by the GER device 81 can also be used to provide other customer and utility services other than the management of these power processing functions.

Embodiments of a GER device 81 including such internal power sensing provides a virtual Power Quality Meter (PQM) at the device's install point. The provision of a separate PQM would normally require utility personnel visiting the installation location and incurring all associated costs. This can become extremely expensive. In embodiments featuring a virtual PQM 83, load and PQM data may be reported to the utility for use in demand response programs and coordinated with customer-installed home management systems. Through load characterization data (historical load power draws correlated to time of the day), the utility is able to more easily and efficiently detect/manage outages.

When mounted on the pole or the pad and with an internal virtual AMI meter 82 in co-operation with an existing AMI meter 75 attached to one or more customer loads that the GER device 81 is supplying (Customer, 1, 2, 3, 4), the GER device 81 can conduct analysis between internal data and that data which is provided from the external meter 75 to easily identify non-technical losses between a distribution transformer and customer premises. These features permit various protocols for detecting suspicious or problematic events. For example, the following scenarios may be used to determine when a GER device will flag and report an issue to the utility's central office:

Case1: NORMAL

Virtual AMI Meter=Customer 1 Meter+Customer 2 Meter+Customer 1 Meter+Customer 4 Meter Case2: THEFT Virtual AMI Meter>Customer 1 Meter+Customer 2 Meter+Customer 1 Meter+Customer 4 Meter Case3: UNAUTHORIZED GENERATION OR FAULT Virtual AMI Meter<Customer 1 Meter+Customer 2 Meter+Customer 1 Meter+Customer 4 Meter Thus, embodiments of the GER device 81 may include virtual PQM meters 83, thereby allowing PQM capabilities at install points. Historically, PQM capabilities are achieved only through onsite utility personnel and a specialized externally-connected PQ Meter. Embodiments of the GER device 81 may also permit increased resolution of load and associated demand through remotely available characterization data. Algorithms may be used, independently or in conjunction with meter(s) or a substation, to effectively identify and communicate non-technical losses within a distribution network.

The communications infrastructure used to deliver data between distribution grid assets is an important element of a reliable and efficient distribution grid. A primary issue is the communications bandwidth and amount of data provided over a set period of time. Embodiments of the GER device may contain a physical layer providing one or more physical layer communications capabilities. In some embodiments, the physical layer may be flexible and agnostic with respect to the evolving distribution grid communications infrastructure, such that communications capabilities may be replaced, added, and/or updated as the communications infrastructure continues to evolve.

Figure 9:
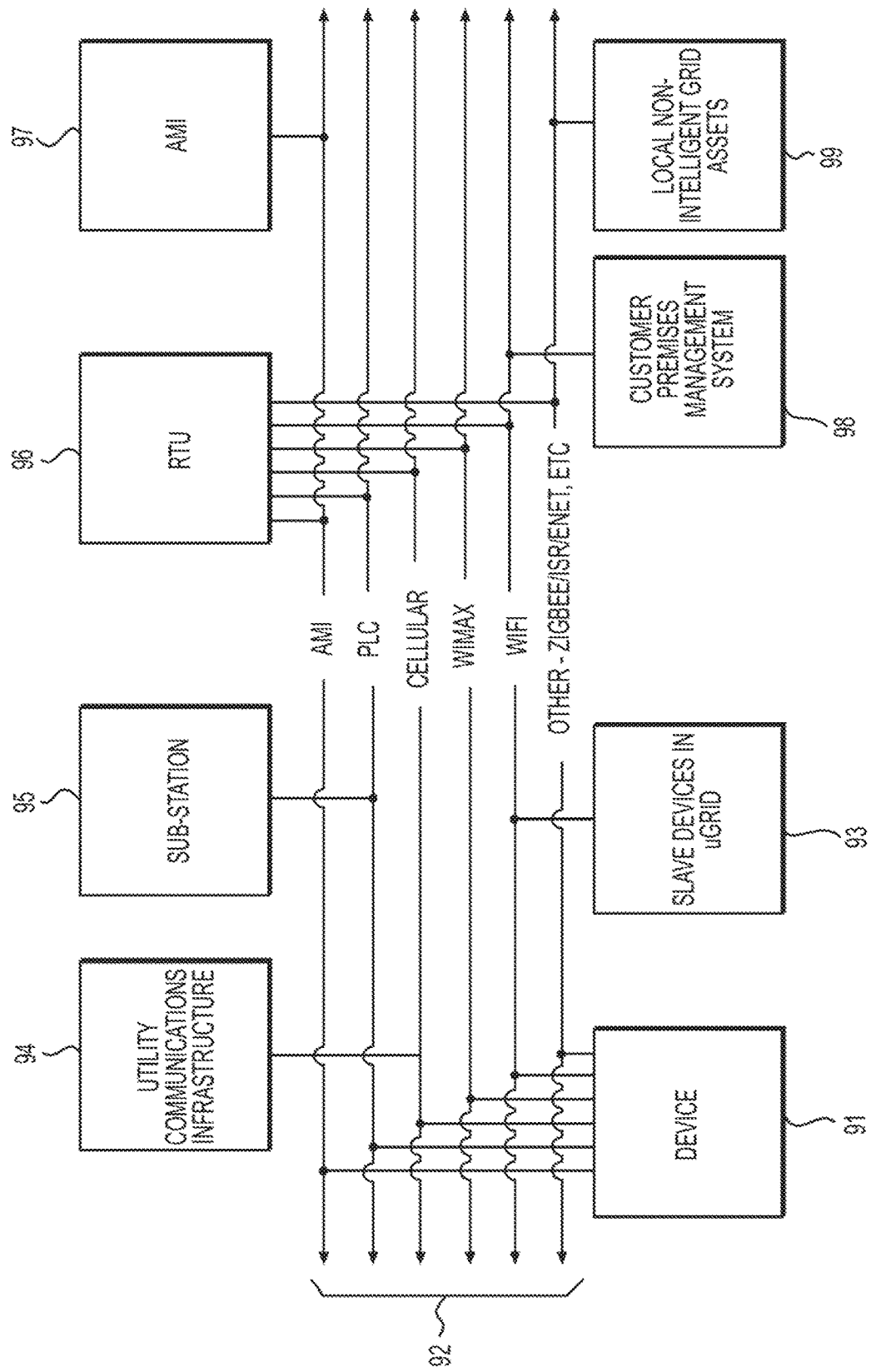
FIG. 9 shows demonstrative communication features for an embodiment of an electrical distribution grid edge energy manager and router device.

FIG. 9 shows demonstrative communication features for an embodiment of an electrical distribution grid edge energy manager and router device 91. Embodiments of the GER device 91 may incorporate a plethora of communications capabilities. Communications capabilities 92 may be provided in a physical layer, such that capabilities may be replaced, added, and/or updated. A GER device 91 may be capable of communication with not only a central distribution grid management entity 94, such as a utility service provider, but also with a number of other machines and entities, including as examples only, (1) other GER devices 93, such as slave GER devices in a micro-grid as described below; (2) one or more power supply sub-stations 95; (3) remote terminal units 96 for physical communications bridging; (4) a consumer/customer load management system 98; (5) an AMI network 97; and (6) various sensors on other devices, such as local non-intelligent grid assets 99.

This local communications ability is useful in relation to forming and operating micro-grids of more than one GER device, as described below. Additionally, this local communications ability permits the unique routing of communications around faults as described below. Should a GER device or other local grid asset be incapable of reaching a centralized management entity 94, for example, the local communications links 92 may allow communication via another GER device 91 that can reach that central entity 94 via, for instance, internal routing protocols within the micro-grid application software within a GER device. Furthermore, embodiments of the GER device also provide encrypted communications. Encrypted communications may be on a unit by unit basis, rather than using one encryption key for the whole network. Encryption and access control may be changed on a rotating schedule scheme, and may be implemented at the local level rather than network wide.

As with AMI data, other local grid assets, such as assets that provide sensing data, can use these local communications links 92 to enable one or more GER device 91 to aggregate select data, conduct localized processing and/or compression, and send the results to a central management agent 94 or other destination for subsequent use or processing.

The ability to provide an agnostic nature in the GER device 91, with respect to physical layer communications 92, provides for wide ranging and higher levels of co-operation between grid assets. Further, these capabilities offer a communications interface that may agnostic as to a service provider. Embodiments of the GER device may also include a software layer configured to communicate with one or more grid components and locations. Further, in micro-grid scenarios, the unique routing of communications internally to the micro-grid application software may increase the likelihood of critical messages from other GER devices 93 reaching the substation 95 or central office during an outage scenario. Local communications links 92 may also be utilized for transmitting data stored within, received by, and/or sensed by a GER device.

At times of peak load or when generation capabilities are constrained, it may be beneficial for a distribution grid to employ methods to reduce the end user load in an efficient and cooperative fashion, thus avoiding "brown-outs" or eventual outages.

Embodiments of the GER device described herein present an ideal demarcation point for a load management scheme. A load management scheme may be implemented at the customer level, as opposed to the historical distribution feeder level. The installation point of the GER device permits cooperation between the GER device and one or more customer load management apparatus, and may also link to any associated consumer management system, and a utilization of the prescribed methods for a load management scheme.

Some embodiments may use closed-loop feedback. The GER device may be given continual knowledge of the consumer load and can essentially "negotiate" with the consumer, even on a dynamic basis, regarding power requirements. One of ordinary skill should appreciate that various combinations of utility controlled load reduction steps and customer "veto" options may be included in a load management scheme. This versatility allows a highly flexible and extensive range of load control schemes. The one-to-one relationship between load and controller allows a utility to limit and/or control brown out (or outage control), and the brown out may be limited to a selected set of consumers.

Figure 10:
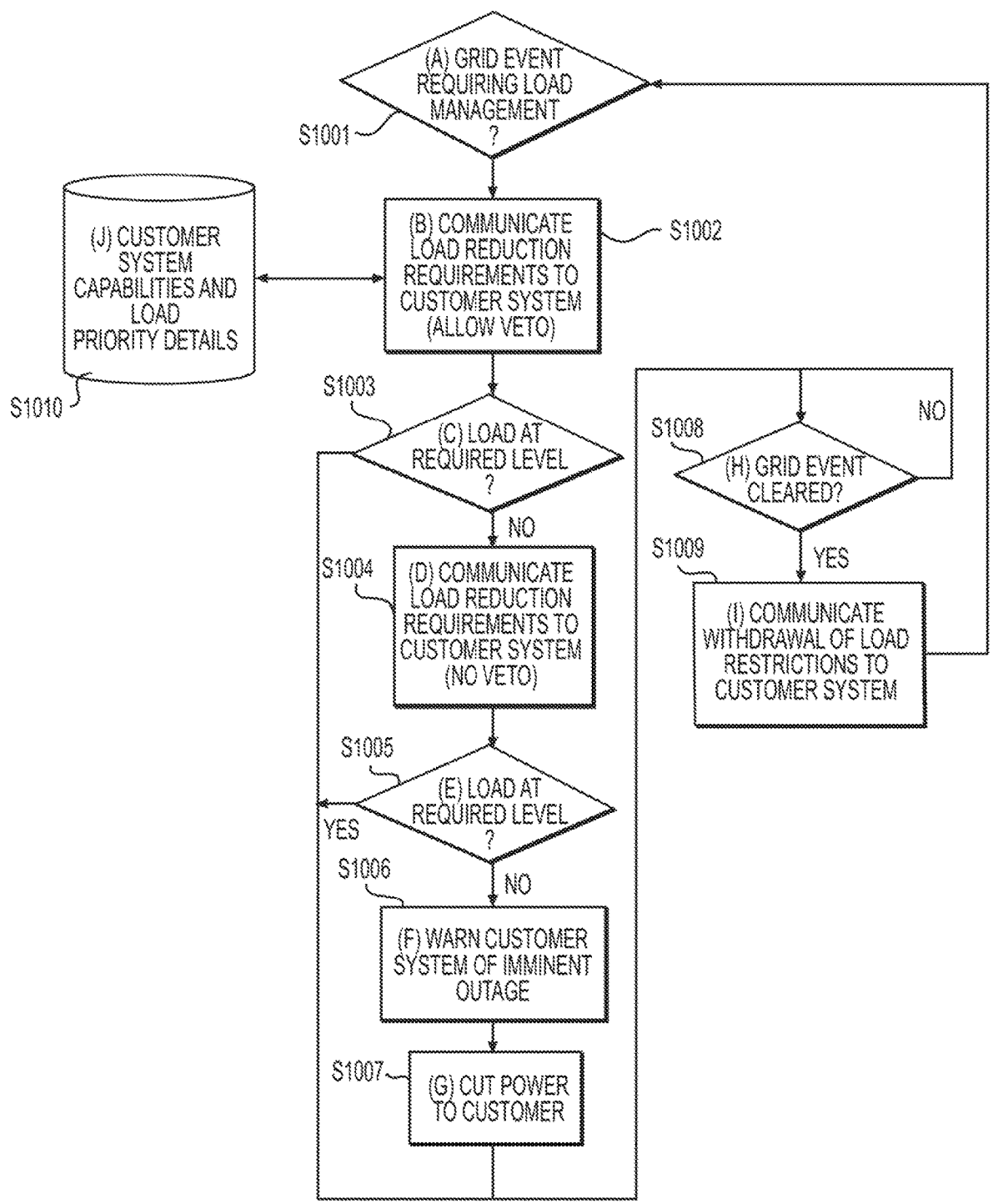
FIG. 10 is a flow chart for an embodiment of a grid event management method.

FIG. 10 is a flow chart for one embodiment of a grid event management method. The algorithm shown in FIG. 10 may be implemented within a GER device. Upon command or detection of a "Grid Event" S1001, the GER device communicates load requirements to the consumer's energy management system S1002. The load requirements may be based on pre-loaded or newly commanded parameters from a utility central management agent, for the specific grid event. In some embodiments, the consumer system may be given a veto S1002, and load reduction may be based on a requested reduction. At S1003, if the requested reduction is successful, then the GER device may end negotiation and await the clearing of the grid event S1008. If the initial request S1003 is not successful, then the GER device may direct the consumer to reduce consumption without any veto/negotiation option S1004. If S1004 is successful, then at S10005 the system may end negotiation and await the clearing of the grid event S1008. If not successful at S1004, then the GER device may cut power to the consumer load S1007. Cutting power S1007 may be preceded by a warning to the consumer S1006. The GER device then awaits the clearing of the grid event S1008. Upon clearing of the grid event the GER device may communicate S 1009 data, such as withdrawal of load restrictions and other updated information, to a central management agent of master in a micro-grid S1009.

In the case of a grid event whereby a GER device loses primary power, and also runs out of any backup power, it may be desirable for the GER device to keep certain essential and/or pre-elected processing and communications functions operational in the GER device, in lieu of shutting down completely. The close physical proximity and communications link between the GER device and the consumer home management system provides an optional power linkage. In the optional power linkage, embodiments of the GER device may use power techniques to draw power from the consumer, such as Power over Ethernet (PoE), to power one or more components of the GER Device.

Thus, embodiments of the GER device may serve as an intelligent intersection for either or both a utility controlled or customer-utility negotiated load control. Embodiments of the GER device may include an algorithm to implement load negotiation. Embodiments of the GER device may incorporate a layered approach to load negotiation, which as shown in FIG. 10 may include a consumer veto option at a first negotiation stage, followed by a rejection of the veto at a later negotiation stage, followed then by individual and finite consumer power modifications to enable a more granular consumer reaction to overall grid management. Embodiments of the GER device may be capable of using any power available in the consumer premises, such as generator, non-grid tied batteries, etc. The consumer-supplied power may be delivered via a Power over Ethernet (PoE) communications wireline to keep essential processing and communications functions operational.

The increasing complexity of distribution grid assets is expected to cause a rise in operational and maintenance costs. It will be valuable for intelligent devices and components of the distribution grid to include systems and methods that reduce or minimize operation and maintenance costs. Embodiments of the GER device may incorporate devices, systems and methods for reducing and/or minimizing operation and maintenance costs. For example, embodiments of the GER device may be configured to follow one or more algorithms that result in operation and maintenance efficiencies. One example is internal status monitoring. Embodiments of the GER device may be configured to follow one or more algorithms for monitoring internal status of the GER device.

Figure 11:
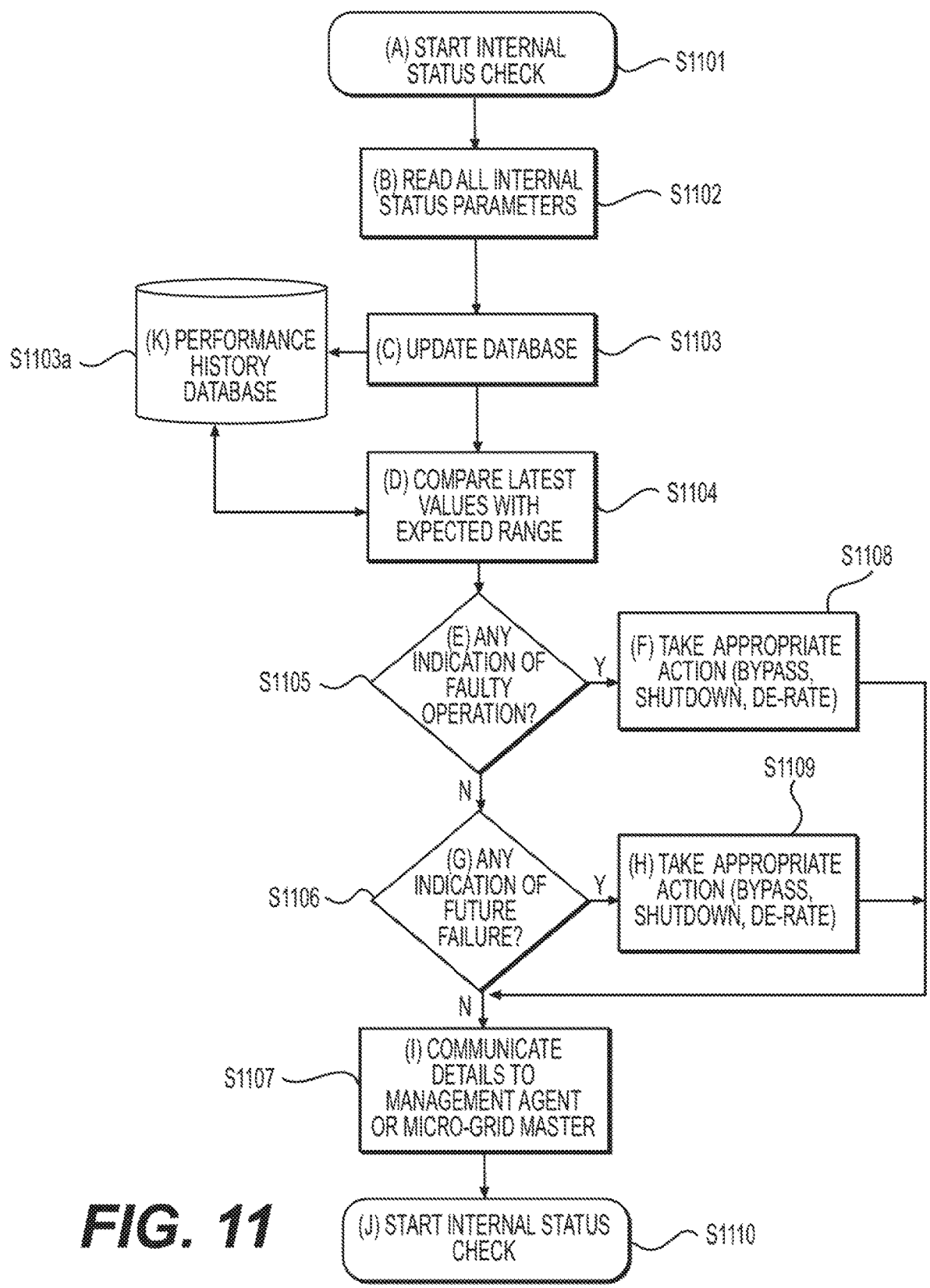
FIG. 11 is a flow chart showing an embodiment of an internal status monitoring method.

FIG. 11 is a flow chart showing an embodiment of an internal status monitoring method. Embodiments of the GER device may include one or more internal status and/or performance sensors. Those sensors may be used in connection with an internal status monitoring algorithm such as FIG. 11 shows. At the start of the algorithm S1101, a GER device may initiate in internal status check. The GER device may read all or a subset of internal status parameters from one or more sensors at S1102. Internal status and performance sensors may allow regular and commanded self-testing and sensing in some embodiments. The sensor results may be stored in a local database S1103, and in some embodiments may be transmitted to a central management agent and/or a performance history database S1103a. The performance history database may reside on the GER device, on another GER device, such as one involved in a micro-grid, and/or on another component of a distribution grid. The sensor results may be processed locally S1104, such as comparing the sensor results to predetermined or calculated expected values or ranges. In the embodiment shown in FIG. 11, the GER device may compare the sensed data to determine whether an indication of faulty operation is present S1105. The local processing S1104 may also perform various analyses on the data. For example, at S1104, the GER device may look for trends in sub-system reliability, which may be used to provide predictions for future failure, as an example. Such data analysis may be used for indications of faulty operation S1106. If faulty operation is indicated, the GER device may take appropriate action, such as bypassing, shutting down a system, and/or de-rating the system. S1108. Similarly, in embodiments monitoring for future failure, if future faulty operation is indicated, the GER device may take appropriate action, such as bypassing, shutting down a system, and/or de-rating the system. S1109. One of ordinary skill in the art should appreciate that a number of appropriate actions may be included as responses to indications faulty operation, depending on the indications and nature of the faulty operation. The GER device may then report any combination of the sensed data, indications, and actions taken, to a management agent or another GER device in a micro-grid S1107. In the embodiment shown in FIG. 11, the algorithm may then repeat S1110. However, in other embodiments, the internal status check may commence at regular or irregular intervals, or on other terms as desired.

The ability to include extensive internal monitoring capabilities in a GER device aids in the automatic calibration of various sensors in the grid system and the GER device, thus maintaining accuracy of sensor readings without the need for frequent calibration by utility personnel or other means. Calibration may be performed by a GER device by including accurate voltage references in local memory. Further, the calibration process may be performed by an onboard processor on a regular or irregular basis, or on other terms as desired.

It should be apparent that embodiments of the GER device may be configured for intelligent self-testing of a grid asset, and may provide notification of failure and estimated future failure. Embodiments of the GER device may follow one or more algorithms for closed-loop self-testing and sensing. The results of these algorithms may be used for compiling and delivering a "wellness" report to the utility or other monitoring authority. Internal monitoring capabilities may be linked to the automatic calibration of onboard voltage and current sensors. Also, calibration of onboard sensors may be achieved through voltage references stored in a GER device.

Distribution transformers may serve one end customer or multiple end customers. Embodiments of the GER device described herein may be used with one or more end customers or consumers. Interacting with a plurality of consumers raises challenges when using a one-to-one mapping architecture for customer-specific features. Typically, the voltage level supplied to each consumer from a single GER device will be similar, and a one-to-one communication link between the GER device and each consumer can be maintained. However, the current, or load, being drawn from each consumer though a GER device may vary at any given moment.

Figure 12:
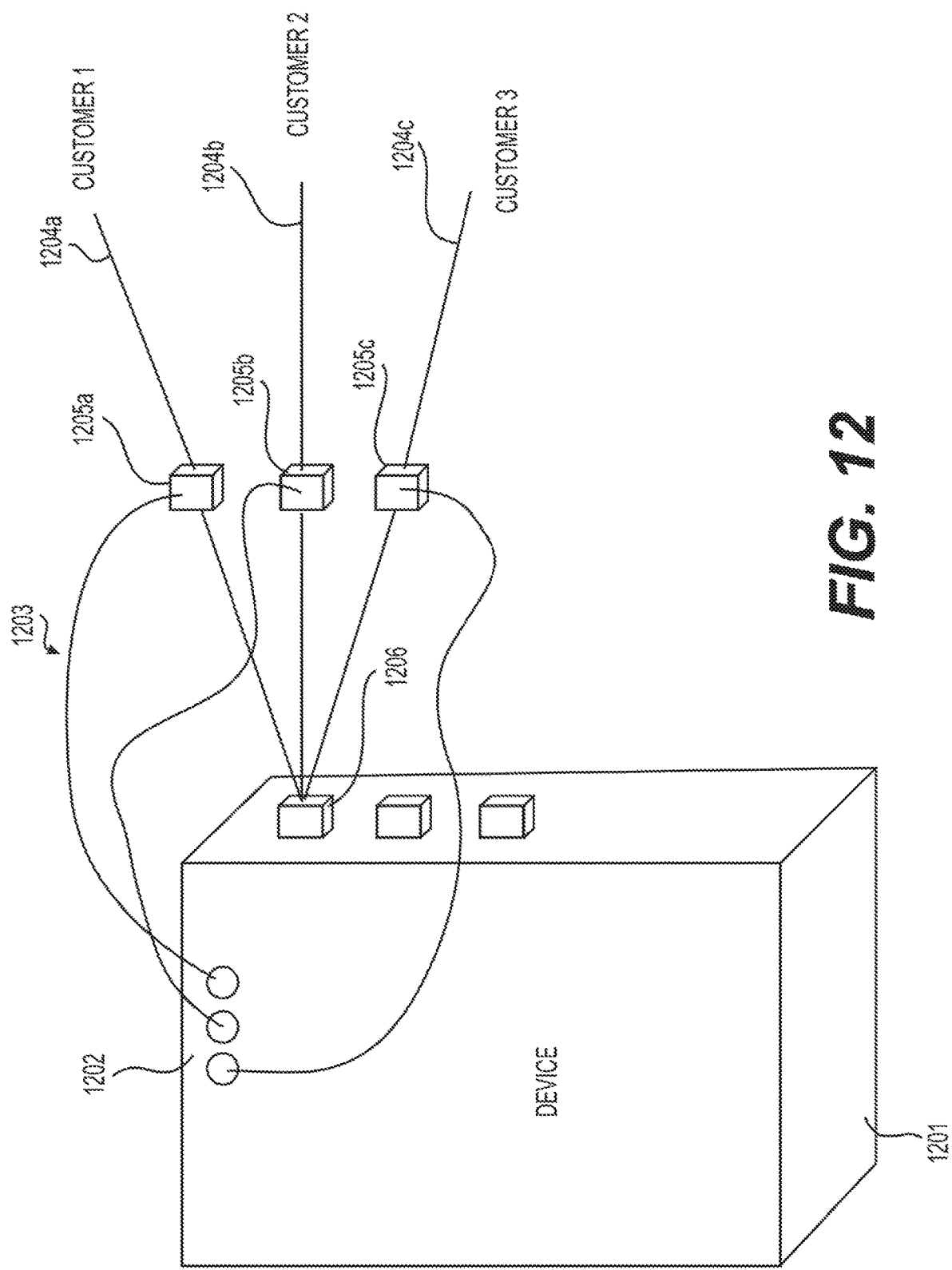
FIG. 12 illustrates an embodiment of an electrical distribution grid edge energy manager and router device measuring current drop for a plurality of power consumers.

Embodiments of the GER device may be configured for measuring the current or load delivering to each of a plurality of consumers connected to a single GER device. FIG. 12 illustrates an embodiment of an electrical distribution grid edge energy manager and router device measuring current drop for a plurality of power consumers. Embodiments of the GER device 1201 may monitor consumer-specific currents on each supply line 1204 from the GER device 1201 to a consumer. A supply line 1204 may connect to an outgoing secondary connection terminal 1206 of a GER device 1201. The GER device 1201 may feature a plurality of connection points 1202 for current sense cables 1203 that are connected to the power delivery cable 1204a, 1204b, 1204c going to a single end consumer (Customer 1, Customer 2, and Customer 3, respectively). Current sense cables may be connected to a power delivery cable 1205 in a number of ways, such as, for example only, cable clamps 1205. A sense cable 1203 may be used when a single GER device 1201 serves more than one consumer, providing customer-specific data in addition to the GER device's internal current sensing. When a GER device 1201 is supplying power to more than one end consumer, the internal current sensing represents the total load of all consumers, and each sense cable 1203 indicates an individual customer's load. Monitoring an individual consumer's load supports the advanced metering and load negotiation features described elsewhere herein. The ability to monitor each consumer's load may be particularly useful with respect to the GER device's overall load control, because embodiments of the GER device may manage overall device load control at an aggregate level for all consumers connected to a single GER device.

Renewable energy generation is increasing dramatically and its integration into the distribution grid presents several challenges for prior distribution grids. Inverters are historically used to couple the DC voltage generated to the AC distribution voltage. However, inverters are expensive and have short lifetimes, and also negatively affect the grid power quality. Utility knowledge and control of grid-tied consumer-owned DC generation sources is desirable for the utilities. Utility owned DC generation resources that are located within consumer premises also present several new business models to the utility.

Figure 13:
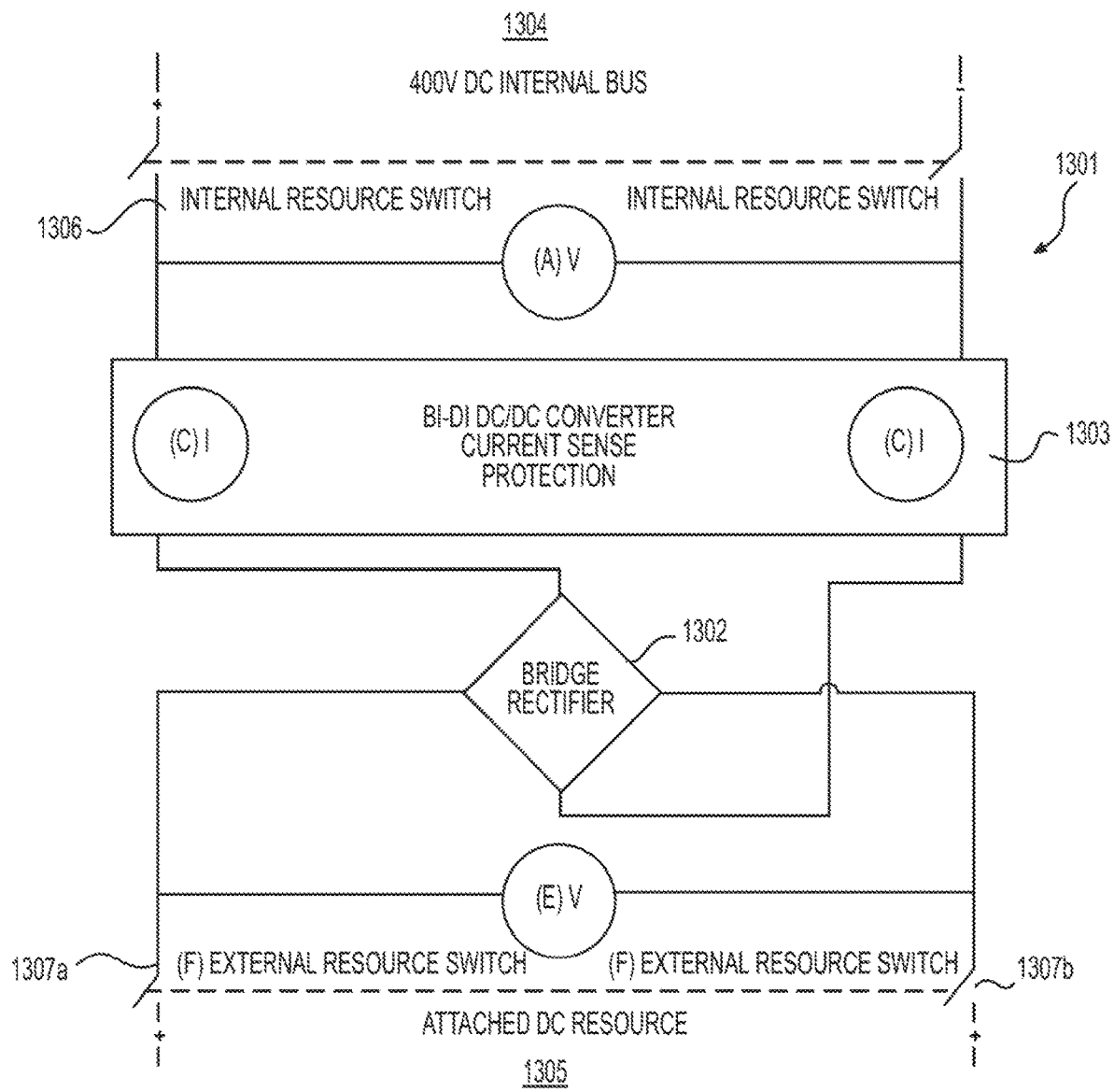
FIG. 13 shows an electrical diagram for an embodiment of a bi-directional DC connection port included in an embodiment of an electrical distribution grid edge energy manager and router device.

Embodiments of the GER device may include a bi-directional DC connection port for receiving power from a DC generation source. FIG. 13 shows an electrical diagram for an embodiment of a bi-directional DC connection port 1301 included in an embodiment of an electrical distribution grid edge energy manager and router device. The port 1301 in this embodiment incorporates isolation switches 1307a and 1307b to connect and disconnect the DC source 1305 as required, a DC to DC converter 1303 to allow flexibility in terms of attached DC voltage, voltage (A)V and (E)V sensors, and current sensors (C)(I) sensing for accurate control and integration into GER device operation. Other embodiments may feature more or fewer sensors, and the precise location of the sensors on the circuit may vary depending on the design and architecture of the circuit. Power sourced is controlled via an internal shared 400V bus 1304 within the GER device. The output current of the DC to DC converter 1303 for the DC port 1301 may be controlled via its voltage, to allow a set amount of current to flow from the output to the DC bus 1304. In such embodiments, if its voltage is pushed higher than the 400V DC bus 1304, then current may flow to the bus 1304 in proportion to the difference.

In embodiments of the GER device a bi-directional DC connection port, the port may include voltage sensing of the GER device and source/load side (A)V and (E)V. Embodiments may include current sensing in both poles (C)I. Embodiments may include Double Pole Single Throw (DPST) Switch capability on both sides. Some embodiments include a bridge rectifier function 1302 that may provide polarity protection. Embodiments may include a bi-directional DC/DC converter allowing current injection in both directions under control. Embodiments may also integrate power from consumer resources at a DC voltage, thereby negating harmonics that may have been otherwise introduced via a direct grid attachment.

Thus, embodiments of the GER device may provide flexibly, controlled, and safe attachment of DC sources and sinks for integration into the AC supply to the consumer. An internal DC bus may be used as a reference for DC input and output. Embodiments may include closed loop control of each individual DC source via voltage control and current sensing to proportional load between sources. A multitude of interlocking isolation switches may be included in some embodiments to control the direction of power flow. In such manners, inclusion of a DC-DC converter may negate harmonics that would have otherwise been introduced on the grid as a result of Device attachment.

Figure 14:
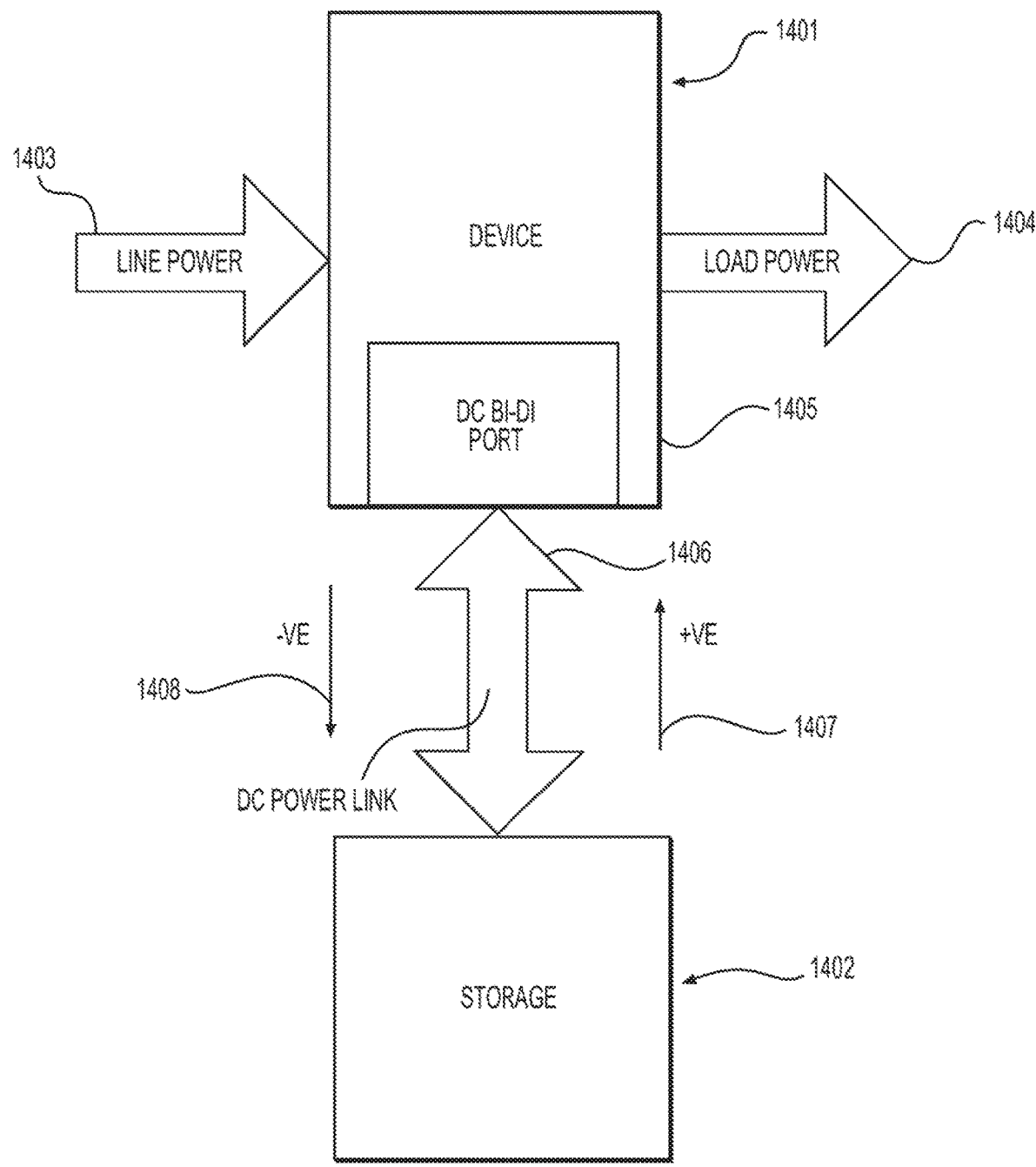
FIG. 14 illustrates the use of an embodiment of a bi-directional DC connection port with a power storage device.

Integration of energy storage, including but not limited to batteries, capacitors, flywheels and fuel cells, into a distribution grid may provide several benefits. Knowledge and control of these resources is central to a successful integration. FIG. 14 illustrates the use of an embodiment of a bi-directional DC connection port with a power storage device.

In the embodiment shown in FIG. 14, GER device 1401 includes a DC port 1405 that is bi-directional 1407 and 1408, and may be used for attaching a power storage device 1402 to the GER device 1401. Generally, a bi-directional DC port may include an electrical connector having the ability to flow electrons in two directions, e.g., both inward and outward of the port. This may include, but is not required to include, additional connection pins as compared to a traditional unidirectional connector. The GER device 1401 receives line power 1403 and provides load power 1404 to a consumer (not shown). As described, control and magnitude of energy inflow or outflow of the DC port 1405 may be voltage-controlled as related to the internal 400V DC bus. Attached power storage devices 1402 may connect at DC power link 1406, and in some embodiments of the GER device may be supported at voltages as low as 12 VDC, with internal bus adjustability typically ranging between 380 VDC and 420 VDC. A fully controlled bi-directional DC port 1405 synchronized with GER device 1401 knowledge of consumer load characteristics allow the device to implement peak shaving and manage momentary outages.

Peak shaving occurs when peaks of demand are flattened through the addition of stored energy as required. When applying peak shaving methods, an increase in load 1404 would normally affect the line power 1403, thus placing a generation burden on the utility. Embodiments of the GER device may monitor the load increase, and add power from the power storage device 1402 connected to DC power link 1406, to meet the temporary increase in load demand.

Momentary ride-through occurs when short duration outages are transparent to the consumer through use of the stored energy systems. When applying ride-through methods, the main AC power may be absent for a short period of time, i.e., line power 1403 may be 0. The normal result would be a loss of all power to the consumer. However, in embodiments of the GER device configured to perform momentary ride-through methods, the GER device 1401 may sense the line power 1403 in real time, and adds DC power 1407 from power storage device 1402 to meet the temporary load 1404 requirement. The momentary outage would be transparent to the consumer up, assuming the power storage device 1402 was capable of supplying the required load. In some embodiments, a GER device may be configured for connection to more than one power storage device 1402. Ride-through capabilities may be coupled with one or more load negotiation algorithms as described above, lowering the load requirement 1404 and increasing the time that outages can be stopped from affecting the consumer load 1404.

The size of the storage may be approximately calculated by:

Time (h)=Battery Capacity (Ah)×(Battery Voltage (V)/(Load (W)×1/Power Factor))

Embodiments of the GER device may be configured to perform one or more methods to sense load demands and/or generation instability, and seamlessly compensate either through a connected source of energy storage. Embodiments of the GER device may include one or more DC bi-directional ports to connect and integrate energy storage capability. As described above, embodiments of the GER device may be configured to perform one or more load negotiation algorithms to decrease load requirement in certain instances.

Embodiments of the GER device may also be configured to provide power to one or more additional DC loads. For instance, one or more DC ports of a GER device may be used to supply energy to DC loads such as electrical vehicle chargers or other DC power supply systems.

Figure 15:
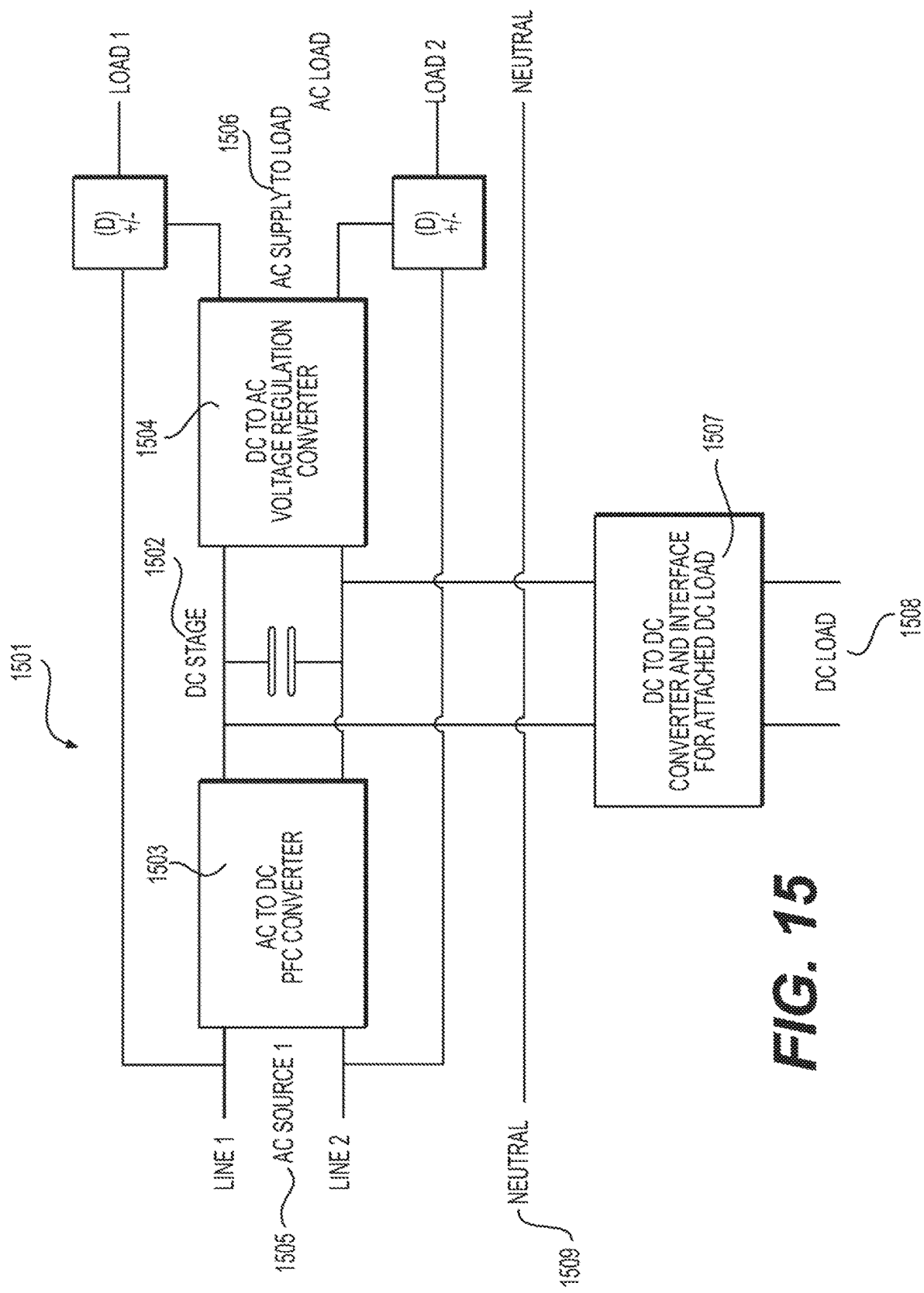
FIG. 15 shows an embodiment of integrating DC-based loads into an embodiment of an electrical distribution grid edge energy manager and router device.

FIG. 15 shows an embodiment of integrating DC-based loads 1508 into an embodiment of an electrical distribution grid edge energy manager and router device 1501. In this embodiment, the GER device 1501 provides DC load management 1507 through safety protection, load sensing, and control. GER Device 1501 may meter DC loads 1508 in the same or similar way as with the AC primary load. DC load 1508 may connect to DC to DC converter and interface 1507, which is in circuit with DC stage 1502 in the GER device 1501.

Based on the maximum load required from the DC port 1507, and the AC Load (e.g., Load 1 and Load 2 in FIG. 15), the GER device 1501 includes multiple levels within the central power processing stage that can accommodate varied power levels for the DC and AC loads. The GER device may employ internal software algorithms to maintain knowledge and control of the balance between DC power and AC power, and may thereby ensure that capabilities in each area are optimized for the current state of operation and load.

For example, the GER device may be configured to use an algorithm for maintaining the relationship Pvr=(Pt×Pp)−Pdc, where:
Pvr=power to process voltage regulation
Pt=total power rating
Pp=percentage of power processed (dependent on power stage)
Pdc=power added (−ve) or subtracted (+ve) from Device via the DC port For example, assume a Total Rated Power at 50 kW, a percentage of total power processed at 10%, power processed at 5 kW, and a DC Load Running at 3 kW. A GER device using an algorithm would determine that the remaining power for voltage regulation is =5 kVA−3 kW=2 kW.

In some embodiments, the software control algorithm may continually maintain knowledge of the DC load 1508, and hence remaining power for the AC voltage regulation, and may set maximum performance ratings accordingly. If a central power stage is upgraded to process 20% of the total system power, for example, then more power may available for sharing between the SDC load and AC voltage regulation.

By incorporating a DC stage 1502 and a DC-to-DC converter and interface 1507, embodiments of the GER device may be configured to employ methods to simultaneously provide power and satisfy both AC and DC load demands simultaneously. Embodiments of the GER device may also be configured to employ one or more algorithms to effectively balance the distribution of power between simultaneously connected AC and DC loads.

Figure 16:
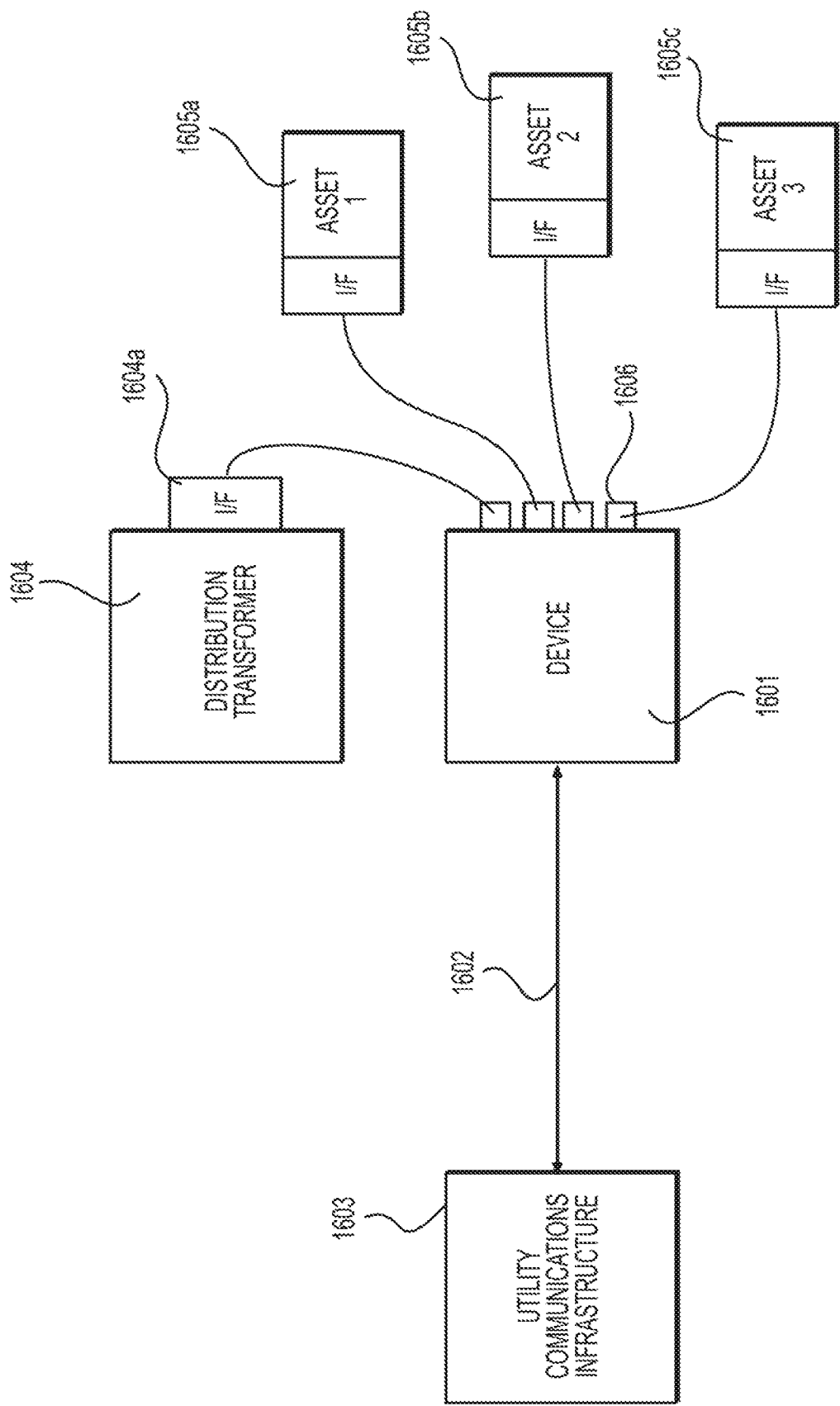
FIG. 16 illustrates an embodiment of an electrical distribution grid edge energy manager and router device monitoring local electrical infrastructure components.

Embodiments of the GER device may be configured to monitor various parameters relating to the health and operation of other local electrical infrastructure components, including as an example a distribution transformer providing a power source to the GER device. FIG. 16 illustrates an embodiment of an electrical distribution grid edge energy manager and router device monitoring local electrical infrastructure components.

As the GER device 1601 may be physically installed or located at the edge of a distribution grid (e.g., downstream of a power substation, on a pole or pad close to the consumer), the GER device 1601 is at an ideal location to conduct smart monitoring services for other grid infrastructure components, including otherwise non-intelligent co-located devices. Devices such as the distribution transformer itself 1604, and other grid assets 1605a-1605c, such as, for example, lightning arresters, fuse cutouts, line voltage regulators, capacitor banks, re-closers and air break switches, lack onboard intelligence and communications to link with a utility central a management agent. Incorporating intelligence within each of these devices 1604 and 1605a-1605c, would be cost-prohibitive and a large industry undertaking. An alternative is to retrofit such assets to sense status (I/F), and would be more reasonable value proposition to utilities. This enables utilities to monitor troublesome existing equipment through a retrofit-able solution. Embodiments of a GER device 1601 may be configured to collect status information and other data from such local equipment 1604 and 1605a-1605c. The GER device 1601 may connect to such other components through a number of methods, including plug-in sensing cables 1606 or local RF links, for example. The GER device 1601 may collect and analyze the status of local devices, and may transmit data and/or analysis to a utility central management agent 1603, such as substation. Through this method of local collection, processing, and collating of data, many local devices 1604 and 1605a-1605c may be linked to the distribution grid more efficiently, without requiring a significant increase in communications traffic across the grid.

In some embodiments, one or more sensors, capable of retrofit, may be attached to pre-existing, or installed, electrical equipment. Such sensors may communicate chosen parameters to one or more GER devices through any communications path, such as a physical link or radio link. Embodiments of the GER device may accommodate a variety of add-on localized sensory. Embodiments of the GER device may be configured to employ internal algorithms to process and/or communicate information from the sensors to utility management. Integration of local grid asset status data based on consumer, feeder segment or full feeder allocation may reduce communications traffic, and offers geographically relevant summarized status data to the utility management.

Voltage regulation is an important element of distribution grid management. Conservation Voltage Reduction (CVR) is one method for voltage regulation and management. In CVR methods, the utility reduces the voltage at a substation, and then boosts the voltage as needed along the feeder circuits to ultimately to save energy. In order to implement energy savings, a flatter voltage profile within the distribution network is extremely beneficial.

Figure 17:
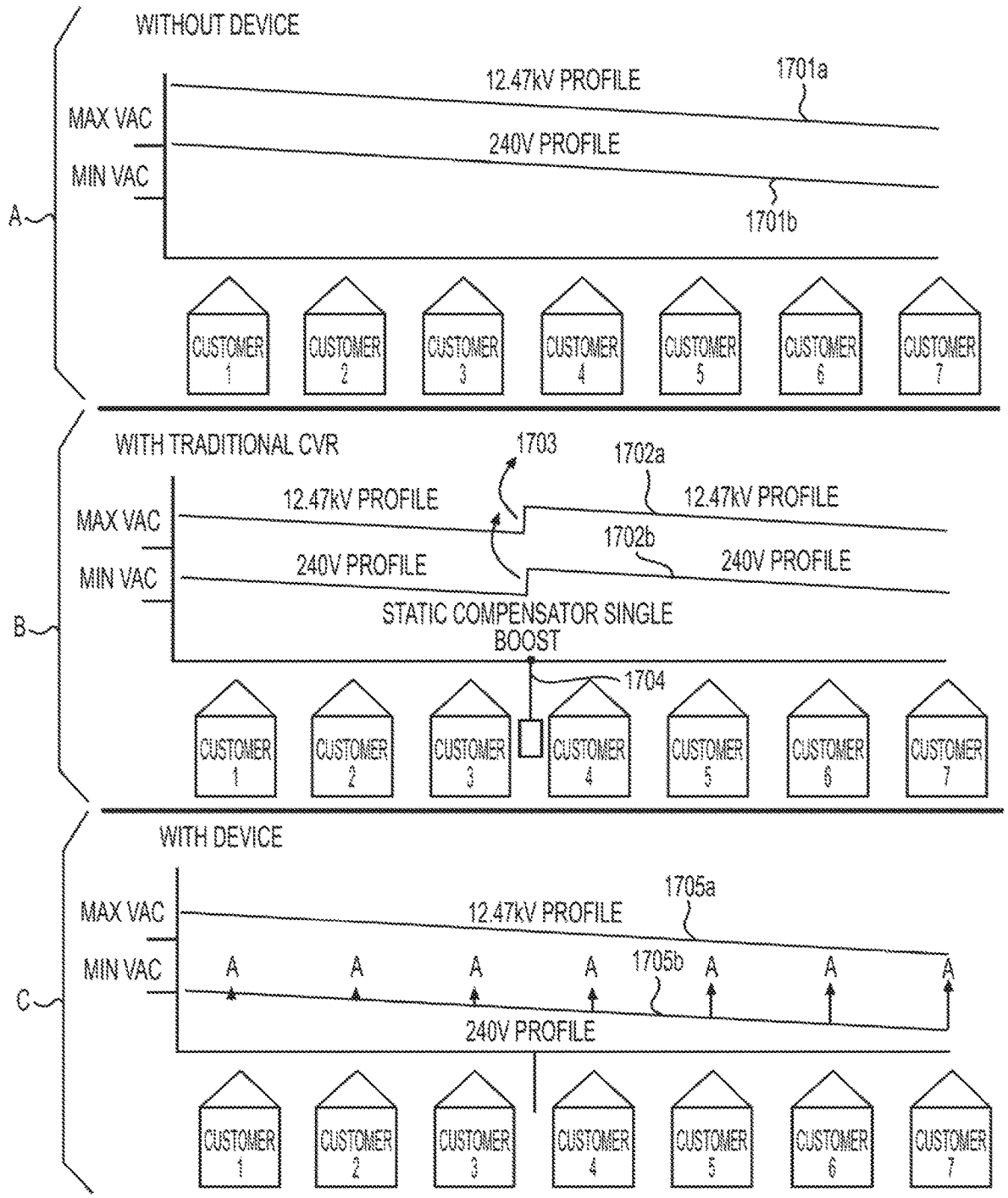
FIG. 17 shows (a) voltage reduction from electrical losses, (b) traditional voltage regulation methodology, and (c) an embodiment of voltage regulation according to methods described herein.

FIGS. 17 A-C show (a) voltage reduction from electrical losses, (b) traditional voltage regulation methodology, and (c) an embodiment of voltage regulation according to methods described herein.

As shown in FIG. 17A, without any voltage reduction, the load side and line side voltage reduces along the feeder as a natural result of electrical losses along the line 1701. Distribution transformers connected to consumers near the substation are the same as those connected at the end of the feeder, resulting in the high-voltage 1701*a* to low-voltage 1701*b* delta being extremely similar. They are passive electrical apparatus. The substation starting voltage is adjusted so that the voltage to the consumer at the end of the feeder circuit is above the minimum allowable level, in the US defined by ANSI C84.1.

FIG. 17B shows a traditional voltage regulation method, in which a limited number of static compensators 1704 are implemented. This is done to allow the voltage at the substation to be lowered. At a utility calculated point 1703, downstream of the substation, the feeder voltage is then raised, affecting all consumers and distribution transformers downstream. Certainly there is a notable cost of efficiency in this method.

FIG. 17C shows an embodiment of a voltage regulation method including a GER device. In using the voltage regulation capabilities of the GER device, the substation voltage can be lowered and the voltage on the secondary, or load, side (A) is adjusted at each customer so that each load is within voltage specification. Although the distribution transformer output voltage may be out of specification, the Device protects and dynamically corrects the voltage. As can be seen in FIG. 17C, both profiles 1705*a* and 1705*b* are significantly lower compared to the profiles in FIGS. 17A and 17B.

Embodiments of the GER device may provide a dynamically controllable voltage set point that can be set from a remote location, such as the utility central management agent or a local controller in a micro-grid scenario. Using real time clock features and internal processing, the GER device may also provide a time-scheduled voltage profile, with or without external control. This time scheduled profile can in turn be adjusted by past load characteristics and heuristics algorithms.

In comparison to traditional voltage optimization methods, architectures employing embodiments of the GER device save significantly more power. The unique topology including multiple GER devices allows the feeder voltage profile to be essentially flat. This enables the next generation of conservation voltage reduction programs.

Another component of voltage management involves the increasing number of photovoltaic installations within the feeder networks. Consumers requesting to grid-tie such PV devices create a problem for what may otherwise be a balanced distribution feeder. In order to back-feed unused power onto the grid, the voltage potential of the consumer must be higher than the output of distribution transformer. The PV creates a location, or pocket, of higher potential (voltage), whereas there is then no control over the PV's decision to adjust voltage to all other connected loads. Embodiments of the GER device may include a switching mechanism to allow for momentary unused power to have a higher potential so that it is effectively shared with other consumers connected to that GER device. Furthermore, these points of fluctuation on the distribution feeder create an unbalance at a point within the feeder and an unexpected variation in the voltage level at a point unpredictable by the electric utility, which may cause other customers to experience voltage levels outside of the allowable range. Ensuring a constant voltage to the consumer is valuable because utilities are required to keep voltage within a range. Embodiments of a GER device may be configured to maintain a constant voltage to the consumer, as described elsewhere herein.

Thus, embodiments of the GER device may actively monitor and adjusts voltage to enable energy savings and integration of DC-based devices. Closed-loop feedback to the GER device may enable auto-correcting voltage to a dynamically-adjustable set point, regardless of external electrical conditions. Voltage management circuitry including in embodiments of the GER device may be configured for adjustment from an internal command or algorithm. Embodiments of the GER device may be configured to employ one or more integrated algorithms to control voltage management components within GER device, allowing for nearly instantaneous adjustment of voltage based on onboard sensor feedback. Embodiments of the GER device may be configured for use in active voltage management of photovoltaic connection points that allows for unused power flow to be shared with other consumers connected to the GER device, yet not affect the distribution feeder. Similarly, embodiments of a GER device may apply one or more voltage management schemes to provide one or more consumers with a constant voltage. Further, a grid topology including a number of GER devices within an electrical distribution feeder may enable the feeder voltage profile to nearly be flat from the substation to endpoint.

Managing reactive loads is important in distribution grid management. Reactive power is generally caused by capacitive and inductive impedances in the consumer load. In other words, the reactive power is caused by the current draw of a load being out of phase by some degree to the voltage draw. It creates a reactive power component within the distribution network that is generally not revenue bearing. This reactive component is also often a result of active voltage management devices.

Figure 18:
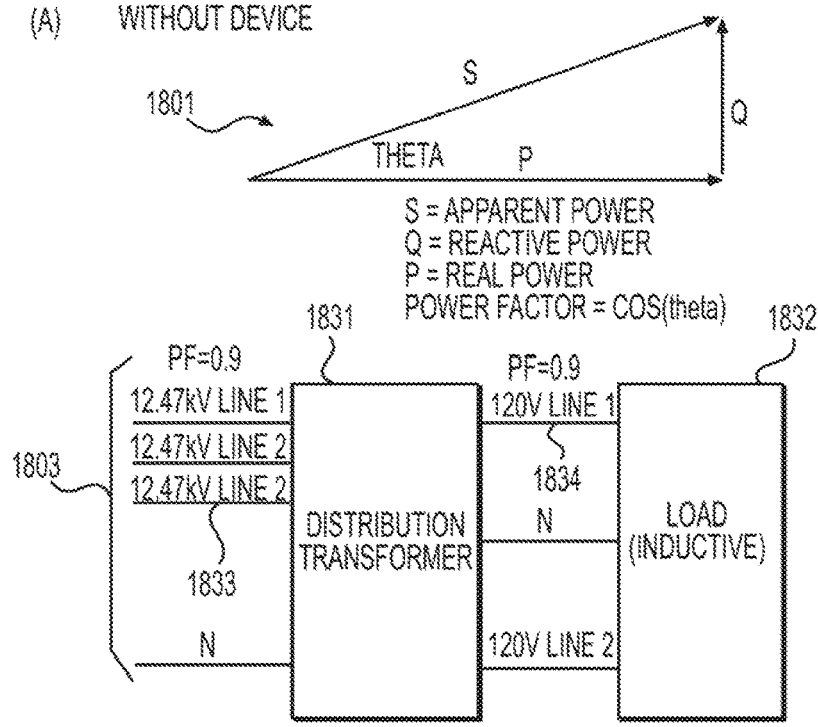
FIG. 18 shows the management of reactive power loads.
Figure 18:
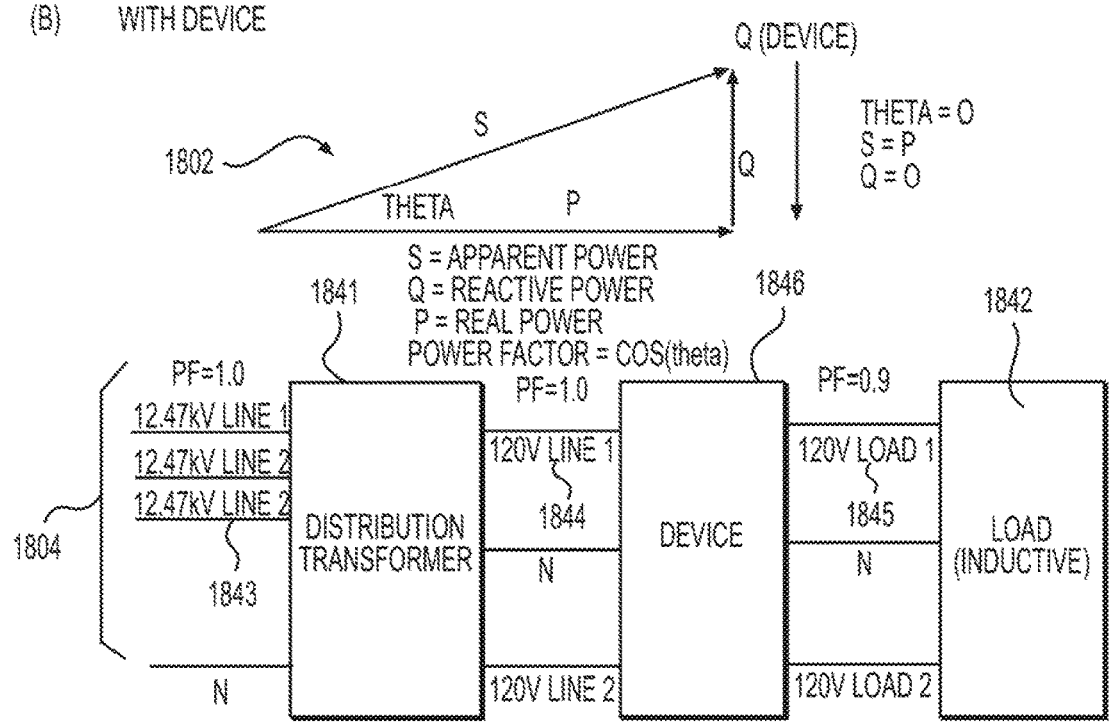

FIGS. 18A and 18B show the management of reactive power loads. As shown in FIG. 18A, in typical distribution networks, the inductive load 1832 creates a reactive power vector that increases apparent power that the utility must generate. This difference is characterized by the Power Factor that is equal to the Cosine of the angle between the Apparent and Real power vectors as reflected in diagram 1801. This Power Factor is also relevant at the line side of the distribution transformer 1831.

As shown in FIG. 18B, embodiments of the GER device 1846 may be inserted in the grid, such as at the load side circuit of the distribution transformer 1841. In such embodiments, the reactive power may be compensated through insertion of reactive power in the opposite direction, e.g., capacitive power to negate inductive power and the converse if the load is capacitive. For example, if the inductive load (E) with Power Factor of 0.9 in FIG. 18B is not seen by the distribution transformer 1841 on its load side or on the high voltage side of the distribution transformer. A load with Power Factor of 1.0 is witnessed, hence theta is zero and Apparent Power equals Real Power (S=P) as reflected in diagram 1802.

In the embodiment shown in FIG. 18B, the GER device 1846 provides a dynamically controllable reactive power set point between 0.9 and 1.0 (leading or lagging) with a fixed VAR component, a controllable VAR component, or combination of the two. The VAR component can be set from remote location such as the utility central management agent or a local controller in a micro grid scenario. Using real time clock features and internal processing, the GER device 1846 can provide a time-scheduled reactive power profile without external control. This time scheduled profile can in turn be fine-tuned by past load characteristics and heuristics algorithms.

One of ordinary skill in the art should appreciate that embodiments of the GER device 1846 may inject reactive power, which may be decoupled from voltage management through the system architecture and/or managed through algorithms.

The active VAR management may, in some embodiments, be decoupled from voltage management. VAR management may be conducted through a fixed component, controllable component, or combination of the two. Management of VAR may occur locally or remotely, such as through a set point that may be defined in terms of a power factor. VAR management circuitry within the GER device may be adjusted by an internal command or algorithm. Example circuits and algorithms are described in co-pending U.S. application Ser. Nos. 14/310,963 and 14/310,987, the contents of which are incorporated by reference in their entirety. An integrated algorithm controlling VAR management components may be included in embodiments of the GER device that allows for nearly instantaneous adjustment of reactive power based on, for example, onboard sensor feedback. Some embodiments may include a topology involving multiple GER devices within an electrical distribution grid to enable the reactive power component within the grid to be reduced or eliminated.

Figure 19:
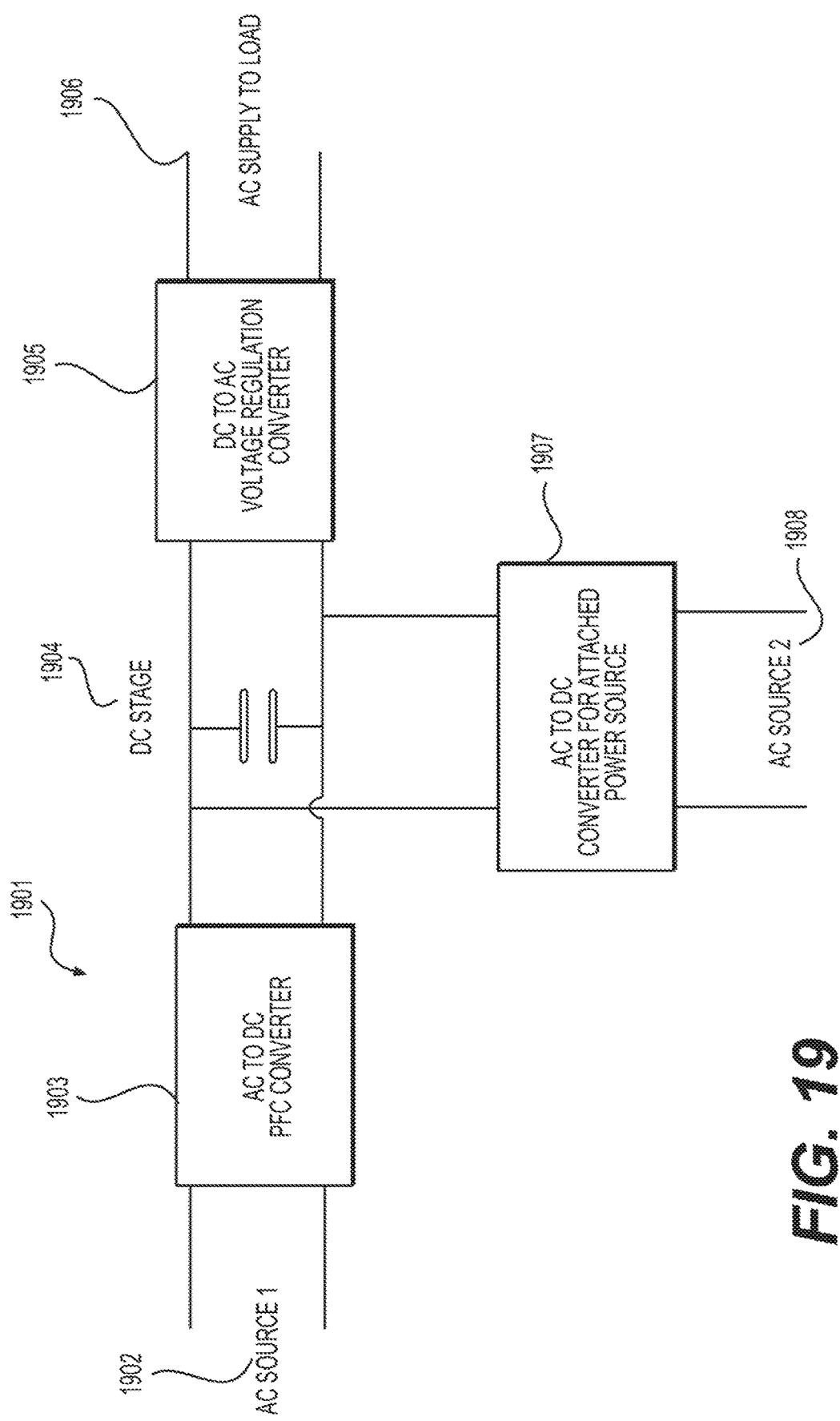
FIG. 19 illustrates frequency synchronization in an embodiment of an electrical distribution grid edge energy manager and router device.

When AC devices are combined, the frequency of each component needs to be in synchronization, as a small phase difference will result in varying power as the AC sources go in and out of phase. Lack of synchronization presents notable problem for combining power sources in the utility distribution grid. Embodiments of the GER device may be configured to synchronize frequency from more than one power source. FIG. 19 illustrates frequency synchronization in an embodiment of an electrical distribution grid edge energy manager and router device As shown in FIG. 19, power sources 1902 and 1908 may be combined at the DC level or stage 1904 within a GER device 1901, such as through a shared 400V DC bus 1904. Combining AC power sources at a DC stage 1904 effectively synchronizes the frequency and otherwise integrates out-of-AC phase sources. AC Source 1902 and AC Source 1908 can be at any phase relationship, may connect to an AC-to-DC converter 1903 and 1907, respectively. Embodiments of the GER device may include a plurality of AC-to-DC converters. Power from the plurality of AC sources 1902 and 1908 may be combined at the DC stage 1904. The power exiting the GER device may then be re-constituted into a new AC wave of a fixed frequency by DC-to-AC converter 1905. The use of an internal DC bus 1904 within a GER device may thus be used for synchronizing various AC sources which may (or may not) be out of sync. The ability to connect multiple out-of-sync AC devices to a GER device thus allows for the advantageous management of the AC sources, and output power in a single AC waveform 1906.

There are an increasing number of assets being inserted into the distribution grid, and many of those assets may communicate independently of other assets. Embodiments of the GER device may be configured for supporting or creating a communication network providing communication through one or more communications services. The GER device installation location provides for a topology as the center of an extensive communications network. When configured to combine and route communication, embodiments of the GER device may spare bandwidth, and some embodiments of the GER device may provide higher bandwidths.

Figure 20:
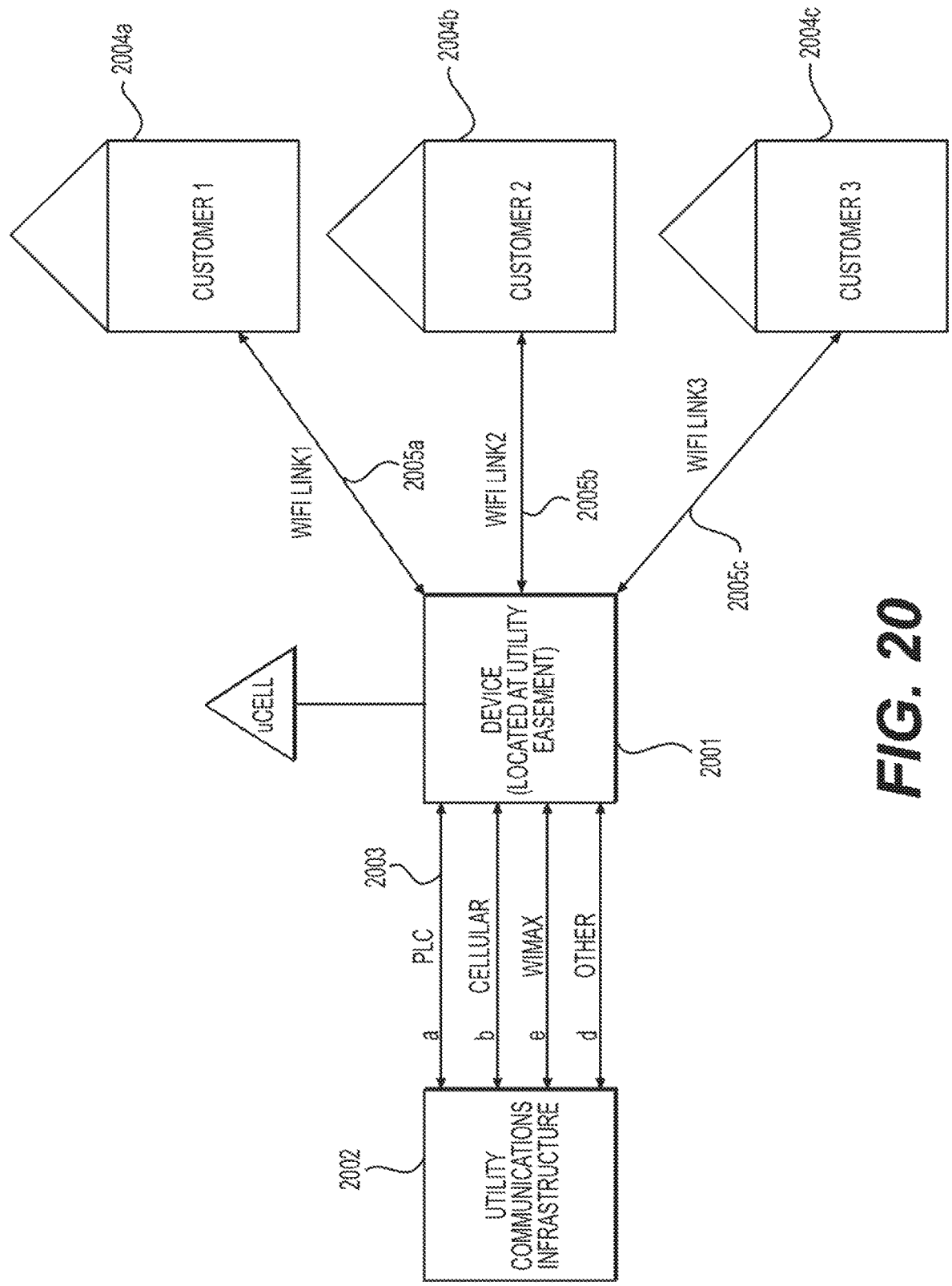
FIG. 20 shows an embodiment of an electrical distribution grid edge energy manager and router device operating as a platform for communication services.

FIG. 20 shows an embodiment of an electrical distribution grid edge energy manager and router device 2001 operating as a platform for communication services 2003 and 2005. In this embodiment, GER device 2001 is located at a utility easement, although a GER device 2001 may be located at numerous points at the grid edge as described above. Embodiments of the GER device 2001 may provide various communications services 2003 to the utility, such as by integration communications services 2003 with the utility communications infrastructure 2002. Embodiments of the GER device 2001 may be configured such that communications services are capable of being added, removed, and/or updated on a physical layer, thereby providing for efficient methods of adapting to the evolving distribution grid infrastructure. The GER device 2001 may also provide a platform for offering of communication services to one or more consumers 2004 through, for example, Wi-Fi links 2005. Some embodiments may also provide a cellular microcell uCell, and some embodiments may provide direct cable connection such as Ethernet. One of ordinary skill in the art should appreciate that a GER device may provide any number of available communications services. These physical and lower layer facilities may also allow the utility to offer communications services to consumers through direct connections such as Wi-Fi and Ethernet or a shared facility such as a shared Wi-Fi access point or a micro-cell for cellular communications.

One of ordinary skill in the art should appreciate that embodiments of the GER device may be incorporated into various grid network communications topologies. For example, the topology shown in FIG. 20 involves GER device 2001 as a central communications hub for one or more local communications services uCell and 2005, and also as a communications access service 2003 for other utility owned equipment. Embodiments of the GER device 2001 may include an integrated and flexible communications bus providing one or more linkages with utility owned equipment. Embodiments of the GER device 2001 may be configured to use one or more algorithms for the handling, prioritization, and processing of various communications signals, as one of ordinary skill in the art should appreciate.

Figure 21:
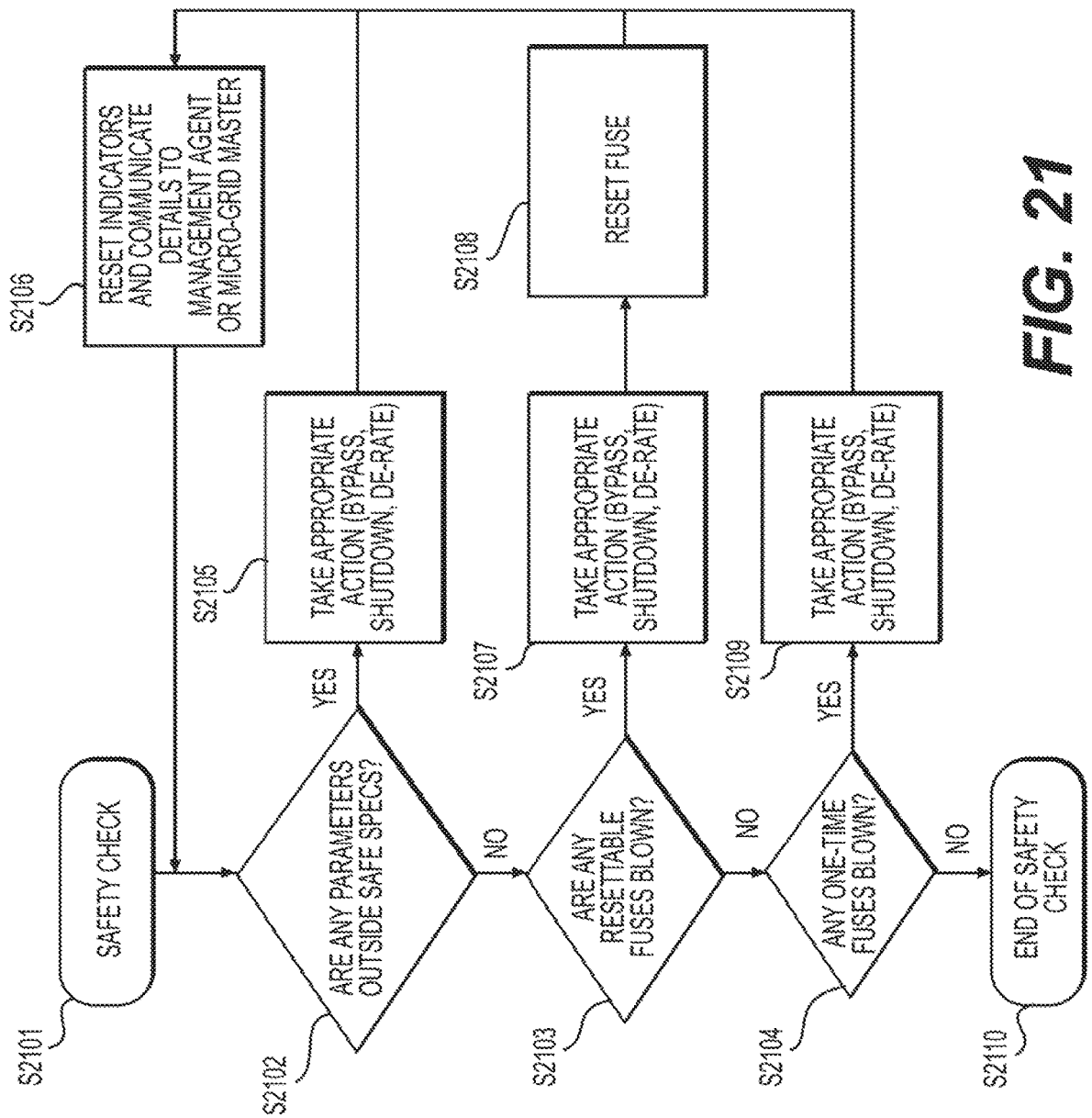
FIG. 21 is a flow chart of an embodiment of a multi-stage safety protocol.

The increased complexity of the distribution grid and assets will create unforeseen operational scenarios, making safety monitoring an important element of distribution grid management. Embodiments of the GER device may be configured to include multiple layers of safety protection and that allow the GER device to fail safely. FIG. 21 is a flow chart of an embodiment of a multi-stage safety protocol. One of ordinary skill in the art should appreciate that numerous safety protocols are possible, and one or more safety protocol may be included in a GER device.

In the exemplar algorithm in FIG. 21, a poll of all safety devices S2101 may occur on a predetermined basis or randomized basis. The GER device may include one or more processors configured to read or receive data from internal and external sensors related to the GER device's operation, and determine whether any parameters are outside of predetermined or calculated safety specifications S2102. For example, the GER device may monitor external temperature and humidity, and adjust one or more parameters based on such conditions at S2102. If one or more parameters are determined to be outside a safety specification, then the GER device may take a predetermined action S2105, such as shutting down, bypassing, or de-rating. For over-current, over-voltage and over-temperature, for example, the GER device may employ software safety monitoring set to a fast reaction time. If parameters are within safety specifications, then the GER device may determine whether any resettable fuses are blown S2103. If so, then the system may take an appropriate action S2107, which may be a predetermine action such as bypassing, shutting down, or de-rating. In this embodiment, software resettable circuit breakers may be set to an intermediate reaction time S2108, for example. Next, if a one-time fuse has blown S2104, then the GER device may take an appropriate action S2109. Physical fuses may be set at the longest reaction time, as a last resort for safe operation. Depending on the scenario, the GER device may either end the safety check S2110, or reset the indicators and communicate results to the utility S2106.

Multi-layer protection, such as the algorithm shown in FIG. 21, reduces the need for utility personnel physically servicing the GER device after each and every fault condition. After any layer of internal fault restoration, the appropriate actions may be taken and the GER device may communicate the event to the central management agent or micro-grid GER device (e.g., a master GER device on the same micro-grid) S2106. In some embodiments of the algorithm, operation continues at the new level of performance. An internal rechargeable battery may be incorporated into some embodiments of the GER device to ensure that internal computing resources will be able to conduct the safety algorithm will continue even in the absence of primary power.

Figure 22:
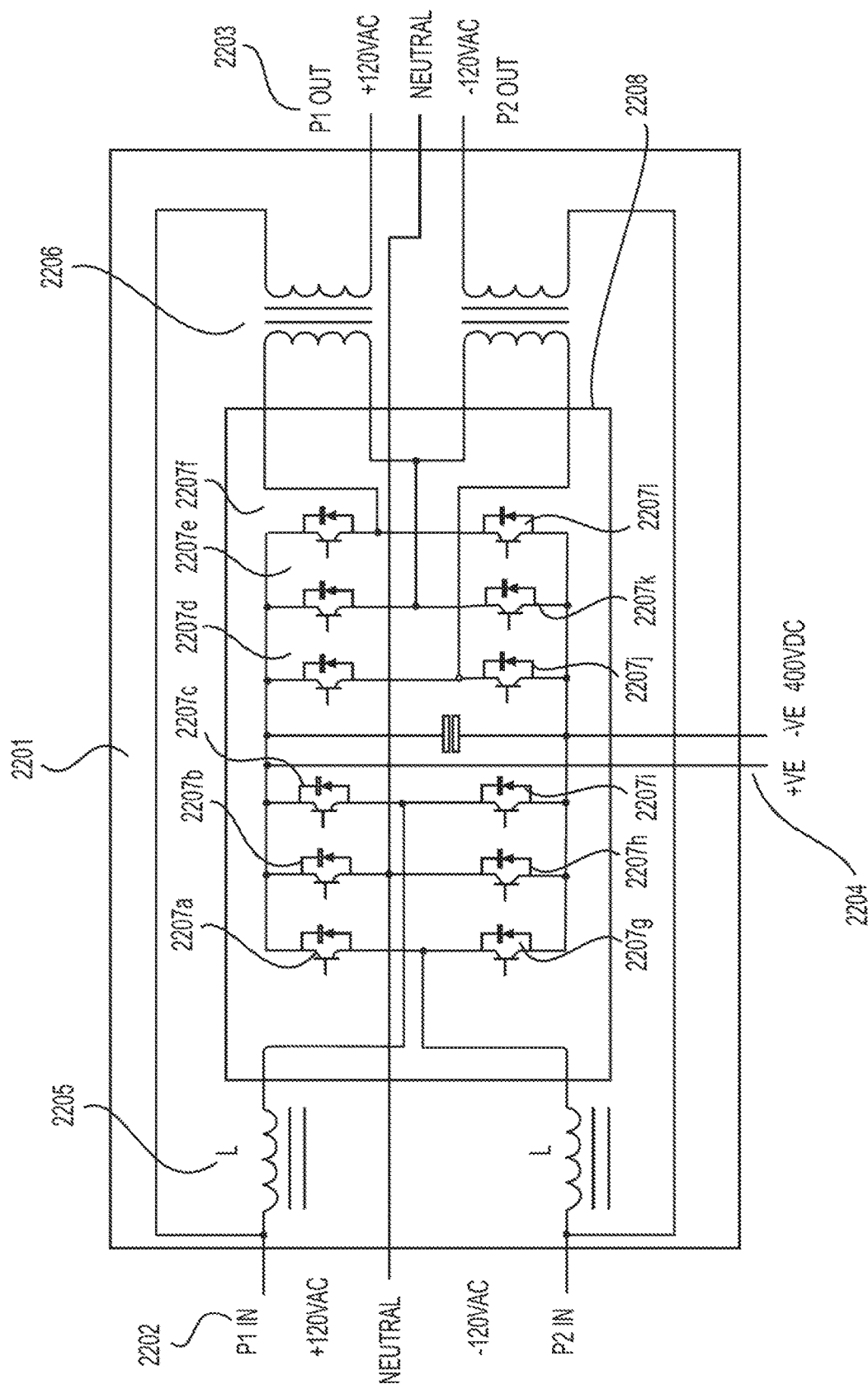
FIG. 22 is an electrical circuit diagram showing an internal bypass in an embodiment of an electrical distribution grid edge energy manager and router device.

Embodiments of the GER device may be configured for partial or complete internal bypass, whereby the GER device removes itself from the circuit in predetermined situations, such as if a fully safe operational state is not possible. FIG. 22 is an electrical circuit diagram showing one embodiment of an internal bypass in an embodiment of an electrical distribution grid edge energy manager and router device. The basic GER device bypass topology as shown in FIG. 22 includes a rectifier 2205, an inverter 2206, and DC stage 2208, and a plurality of inductors and transformers 2207a-1 within the GER device circuitry. In the exemplar circuit shown in FIG. 22, it can be seen that if all switching devices 2207a-2207 1 are set as open (also their default state if power is removed from their driving circuitry) then the entire central power processing stage is negated and all power flows direct from input 2202 to output 2203 as a simple conductive path.

Implementation of multilayer safety protocols, such as the algorithm shown in FIG. 21, may help avoid unnecessary attention of nuisance and non-critical faults. The integration of a rechargeable battery may further ensure that safety algorithms are capable of continuous operation, even during a grid outage. Also, circuitry allowing for an internal bypass of power management electronics may be included in a GER device. Layered safety systems with intelligent sensing and recovery may be included in embodiments of the GER device, and help to reduce the effects of faults on grid operations and outages.

Figure 23:
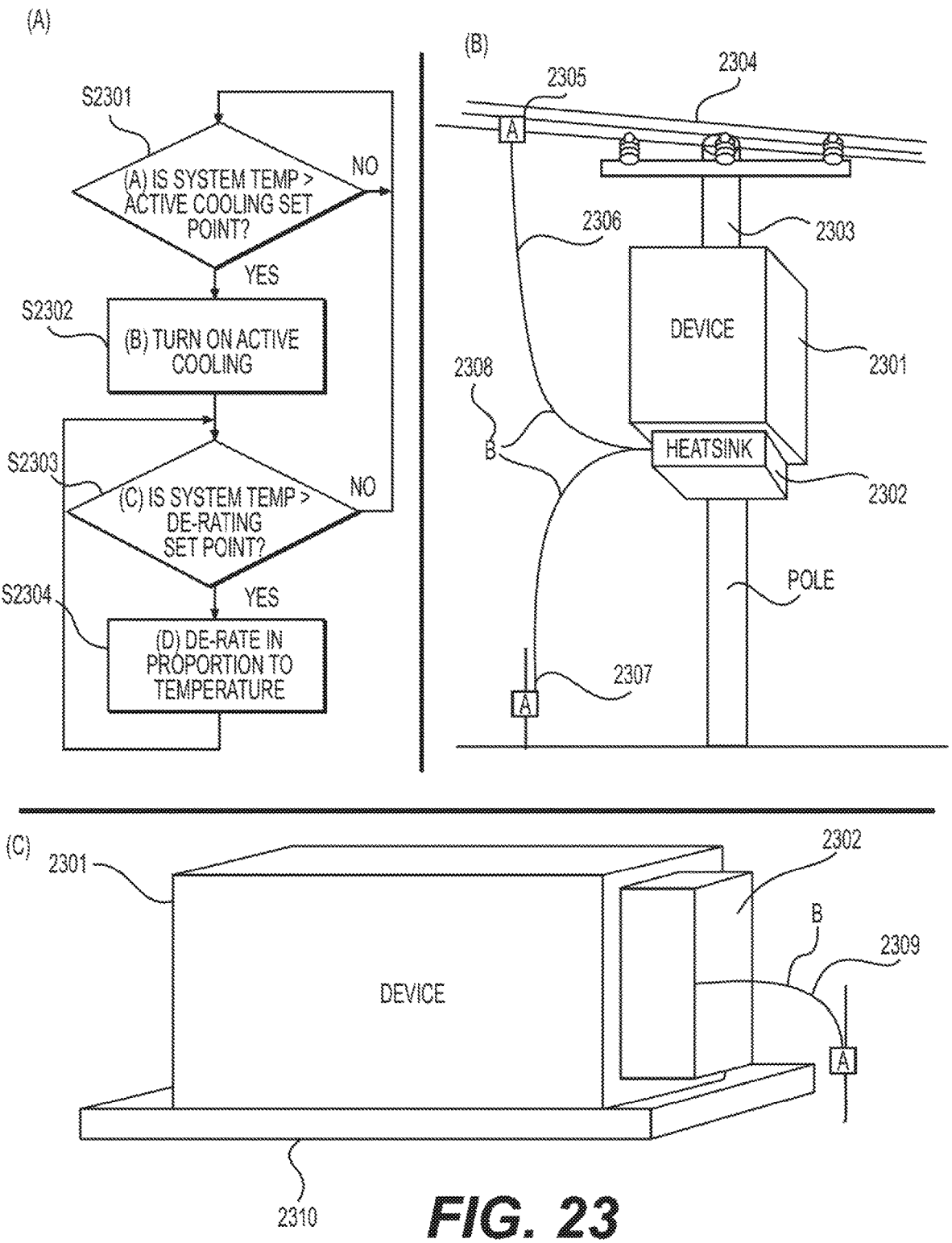
FIG. 23 shows (a) an embodiment of a method for heat management, and (b) and (c) show an embodiment of an electrical distribution grid edge energy manager and router device using distribution lines as additional heat sinks.

The broad range of environments in which GER devices may be employed raises the importance of internal thermal management. Generally, internal thermal management is a useful indicator of a GER device's health. FIG. 23 shows (A) an embodiment of a method for heat management, and (B) and (C) show an embodiment of an electrical distribution grid edge energy manager and router device using distribution lines as additional heat sinks.

As shown in FIG. 23(A), a GER device may monitor system temperature on a real-time basis, and scan for the system temperature exceeding a threshold, such as an active cooling set point S2301. The threshold may be a temperature at which internal active cooling mechanisms engage. The threshold may be variable on internal and external parameters, such as external temperature, weather forecasts (e.g., based on data received that indicates expected temperatures and humidity), and the like. If the system temperature, which may be monitored by one or more onboard sensors, exceeds the threshold, then the device may engage active cooling S2302. In the embodiment of the method shown in FIG. 23(A), the GER device may also de-rate based on the system temperature S2303. For example, if the system temperature exceeds a second threshold, which may be a de-rating set point, then de-rating may occur S2304. De-rating may be in proportion to the system temperature, or may be based on other algorithms and/or parameters.

Embodiments of the GER device may use multiple methods to manage excessive system temperatures. For example, active cooling may be used, such as described with respect to FIG. 23(A), to operate above a certain ambient temperature. Although active cooling is historically unfavorable at utilities due to maintenance requirements, it may be a requirement with electronic-based devices. Thus, embodiments of the GER device may include an active cooling (such as, for example, a forced air) system. Such cooling systems normally do not have a negative impact on performance when not operational, but if activated the active cooling may reduce performance de-rating which is can be based on the standard mode of high temperature operation.

Software de-rating of performance may be based on ambient temperature. Extremes in operating temperature generally do not damage power electronics, but may limit the functional power range of a GER device. Through the use of internal temperature monitoring and intelligent control of the power stage, such as through the exemplar method shown in FIG. 23(A), embodiments of the GER device may de-rate performance proportionally to internal ambient temperature.

Embodiments of the GER device may also include one or more external heat sinks, such as shown in FIGS. 23 (B) and (C). For example, placing one or more power stage heat sinks 2302 on the underside of GER device 2301 enclosure may reduce solar loading. As shown in (B), GER device 2301 is mounted to pole 2303. In such mountings, embodiments of the GER device 2301 have several mechanical enclosure options to locate one or more heat sinks 2302 on the lower face of the enclosure. One of ordinary skill in the art should appreciate that heat sinks may be positioned at other locations on a GER device, including internal to the outer enclosure, and at surfaces other than the underside. Embodiments of the GER device 2301 may also use distribution lines 2306 as extended heat sinks. Embodiments of the GER device 2301 may also provide thermal routes from the GER device 2301 and heat sink 2302 to the high voltage transmission lines B or the ground connection 2307. Such thermal routes may proceed along routes different than the route shown in FIG. 23(B). Connection is made via ceramic thermally conductive but electrically isolating clamps (A). Similarly, for pad-mounted GER devices as shown in FIG. 23(C), thermal routes may proceed from heat sink 2302 to ground connection 2309. Such options provide additional heat sinking possibilities that take advantage of installation location.

The pad mount enclosure shown in FIG. 23(C) also provides the optional for earth cooling via thermal pathways 2309 to the earth through one or more ceramic, thermally conductive but electrically isolating clamps A. Such clamps may be place in various locations, such as beneath the pad, and provide as addition heat sinking possibilities in certain installation locations.

As described above, embodiments may use internal GER device temperature monitoring in an algorithm that intelligently controls the GER device power stage. Controlling the power stage may also involve de-rating GER device performance based on the temperature conditions. Also, placement of power stage heat sinks on the underside of pole-mounted GER devices may limit solar loading. Some embodiments may use distribution lines and/or ground connection cabling as a thermal dissipation routes. Pad-mounted embodiments may use earth thermal capacitor cooling methods as an additional thermal dissipation route. Embodiments may also use thermally conductive but electrically isolating clamps.

Figure 24:
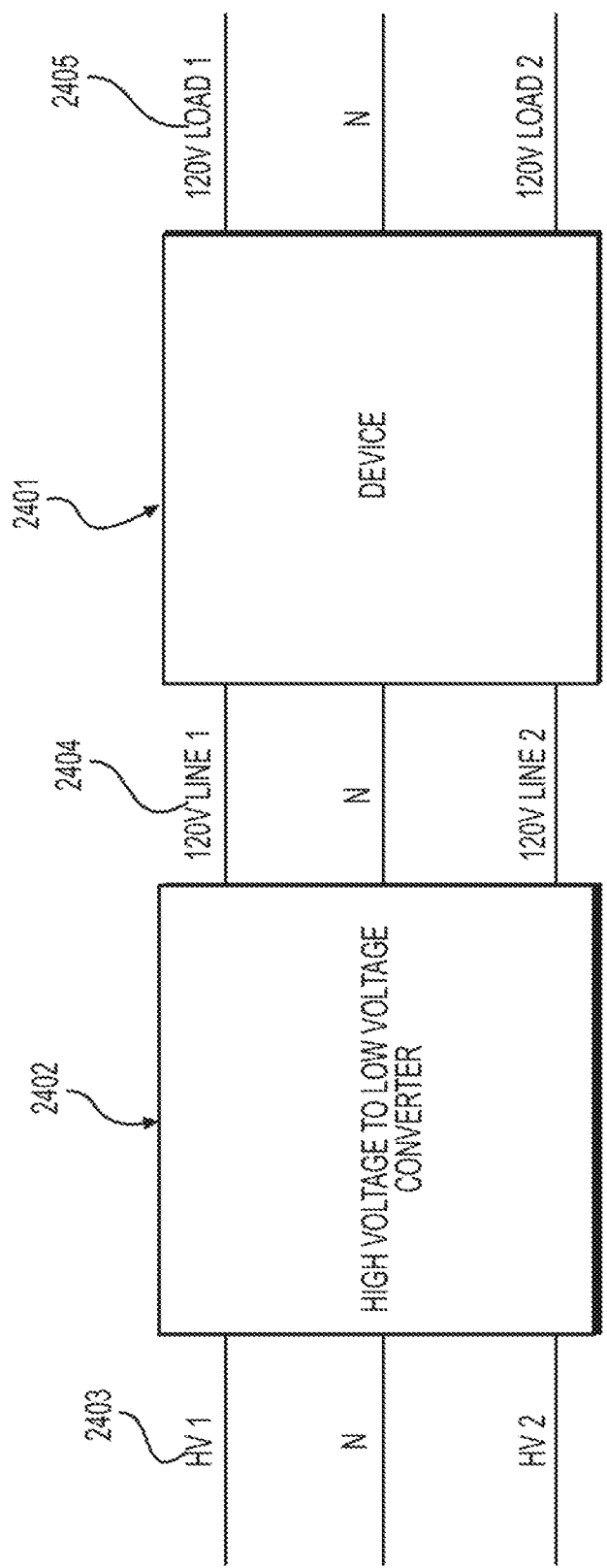
FIG. 24 illustrates an embodiment of an electrical distribution grid edge energy manager and router device incorporating a voltage conversion function.

Embodiments of the GER device may incorporate high-voltage to low-voltage conversion functionality. Depending on the conversion size, such embodiments may eliminate the distribution transformer. FIG. 24 illustrates one embodiment of an electrical distribution grid edge energy manager and router device 2401 incorporating a voltage conversion function 2402. The high-to-low voltage converter 2402 may be internal to the GER device 2401, e.g., within the same outer enclosure or sharing one or more internal layers (e.g., circuit boards). Alternatively, the voltage converter 2402 may be external, such that the converter 2402 attaches to the GER device 2401. The voltage conversion capability 2402 may therefore be included with one or more of the features described above, or alternatively the voltage conversion capability 2402 may be implemented as a stand-alone capability within the distribution network. The voltage conversion capability 2402 provides for a fully solid state, single unit solution, and creates a smaller foot print for installation. Further, some embodiments of the voltage converter 2402 permit bi-directional flow of electricity. Such embodiments may advantageously support applications in which consumers include those connected to a same transformer and also include one or more local power generation sources connected to the distribution grid.

The integrated high voltage to low voltage capability 2402 may be packaged within an existing distribution transformer enclosure footprint with a connection strategy similar to existing transformer. This approach has the potential to reduce the learning curve associated with installers learning new installation methods.

Figure 25:
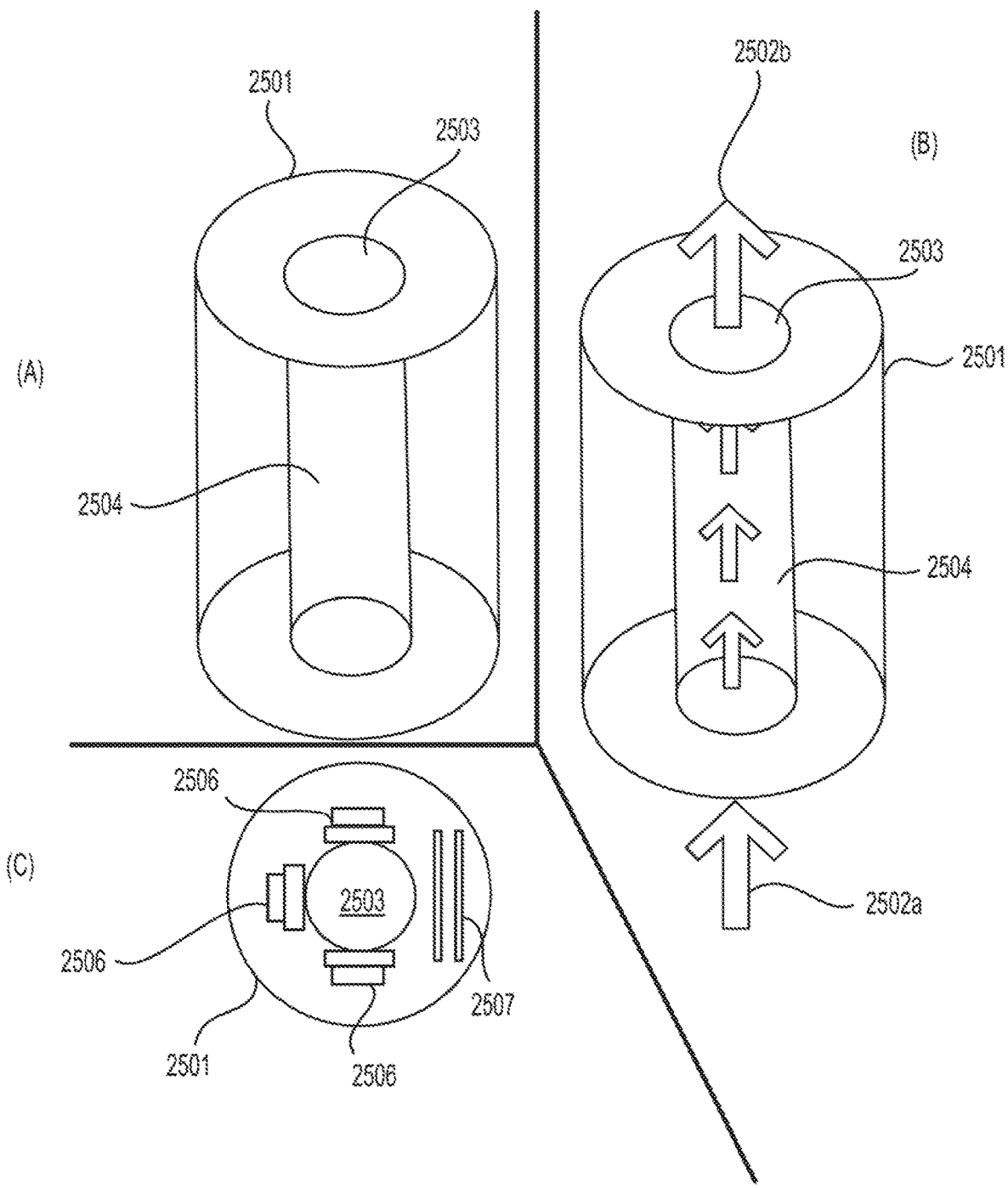
FIG. 25 shows an embodiment of an electrical distribution grid edge energy manager and router device having an advanced cooling package.

The voltage converter functionality may magnify the heat generated by a GER device. Embodiments of the GER device may be configured for advanced cooling structures, such as the structures shown in FIG. 25. The GER device 2501 shown in FIG. 25 is generally cylindrical, with a hollowed center volume 2503 for a cooling channel 2504. For example, cool air (or other fluid) may be supplied to one end of a hollow volume 2502a, and be forced through the hollow volume 2503 to an exit end 2502b of the hollow volume 2503. Other embodiments may use different geometries, and may include more than one hollowed volume for cooling. As shown in FIG. 25(C), heat generating devices 2506 may be positioned in close proximity to, and even in contact with, hollow center volume 2503. Components that do not generate heat 2507 may be positioned elsewhere. Adding fins and baffling projecting into the hollow center region 2503 may also improve convection effectiveness.

The voltage conversion functionality in some embodiments of the GER device may necessitate one or more methods for managing and metering the bidirectional power flow from distributed power generation devices. Historically, metering power generation devices has been completed through a concept referred to as "net metering," which merely provides an estimate of power being returned to the distribution grid from a localized generation source. In most current distribution grids, excess power that is fed to the distribution grid from the consumers' premises stays on the secondary side of the distribution transformer, benefitting only homes connected to the same transformer. In some embodiments of the GER device, power from a power generation device, such as a consumer's photovoltaic cell or another generation device attached to the grid, may be routed by a GER device to one or more other destinations on the grid.

Embodiments of the GER device may be coupled with a high-voltage to low-voltage conversion function with other capabilities as described herein. Including high-low voltage conversion in an embodiment of a GER device allows for the capability to bi-directionally flow power onto the distribution grid to consumers within the distribution feeder (i.e. flow of power from the secondary, or low voltage consumer side to the primary side, or high voltage utility distribution network side), as opposed to only those connected to the transformer where a generation source is present. Embodiments of the GER device may be configured to employ circuitry and one or more integrated algorithms or methods to enable the bidirectional flow of power.

Attaching new-to-market grid assets, renewable sources and loads, and consumer-purchased devices, all introduce undesirable harmonics into the distribution grid. These harmonics reduce the effectiveness of power delivery within the grid and shorten the life of both utility-owned and consumer equipment. Embodiments of the GER device may be configured with circuitry to manage a range of harmonics, including minimizing GER device-generated harmonics and filtering and isolating harmonics generated by other assets.

Figure 26:
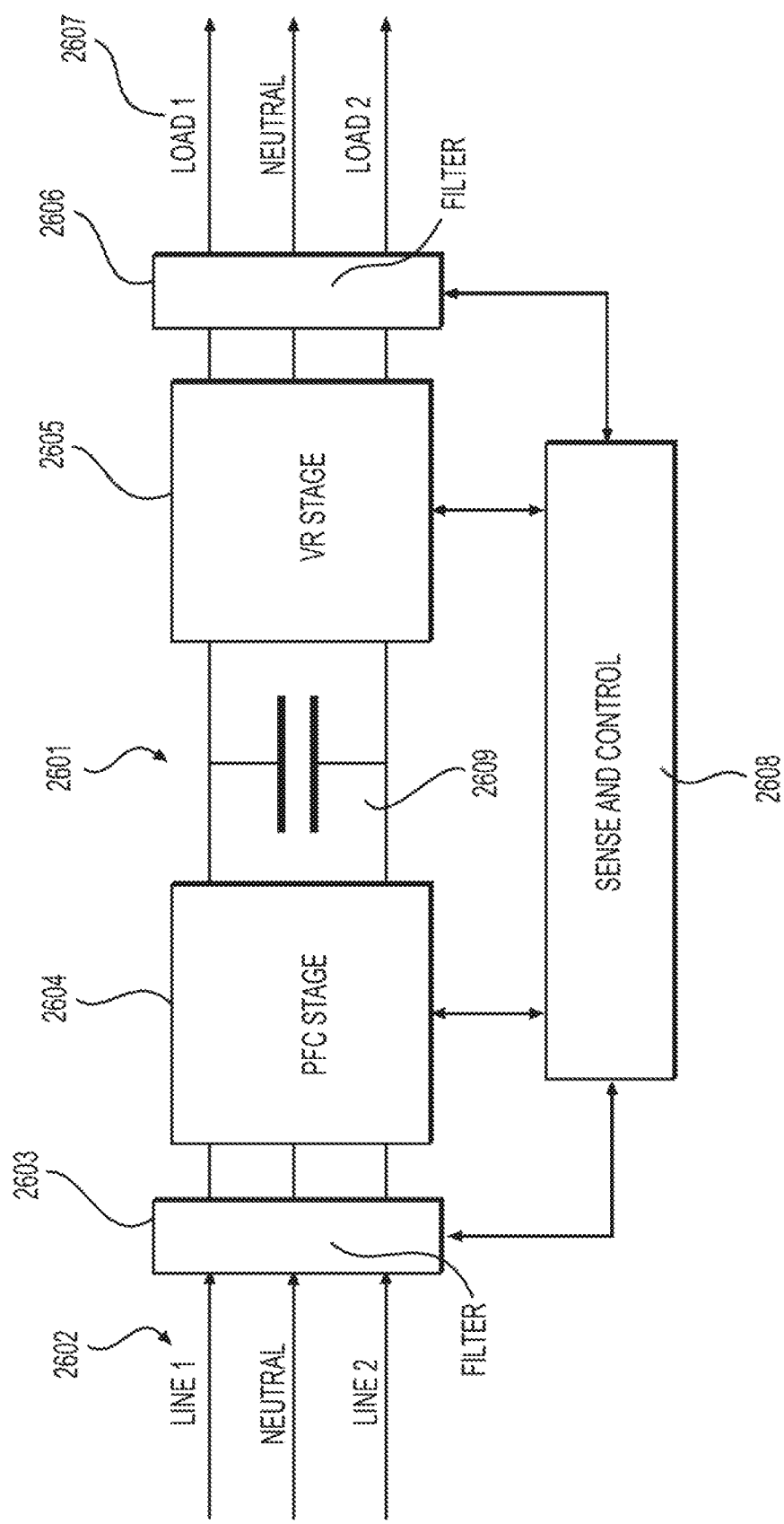
FIG. 26 shows a schematic for an embodiment of harmonics management in an embodiment of an electrical distribution grid edge energy manager and router device.

FIG. 26 shows a schematic for an embodiment of harmonics management in an embodiment of an electrical distribution grid edge energy manager and router device. The embodiment 2601 shown in FIG. 26 includes a two-stage architecture combines a Power Factor Correction (PFC) stage 2604 and Voltage Regulation (VR) stage 2605 with an intermediate DC stage 2609, although other configurations are possible. This allows for harmonic isolation between Line side 2602 and Load side 2607. The Controller of the power stage 2608, which may have the ability to sense and control, may alter its control of embedded switching devices and GER behavior based on the sensed presence of undesirable harmonics. Filters on the line 2603 and load (input and output) side 2606 provide further isolation of harmonics and are sensed and controlled via the power stage controller.

A central DC stage 2609 may be used in a GER device to assist harmonic isolation. Embodiments of a GER device may use integrated circuitry such as shown in FIG. 26 to minimize the resulting harmonics of utilizing power electronics in grid-scale applications. The circuitry may also manage and minimize harmonics from other equipment. The combination of a power factor correction stage 2604 and a voltage regulation stage 2605 with an intermediate DC stage 2609, allows for isolation between line and load sides. The integrated capability of the controller 2608 to alter algorithms based on internally-sensed harmonics may be used in embodiments of the GER device to adjust operating parameters and minimize GER device-generated harmonics. Filters, such as line-side 2603 and load-side 2606 filters, may be included in embodiments of the GER device and controlled by a central power stage.

Broad scale outages will likely occur in a distribution grid. In restoring electrical service to consumers after a broad scale outage, utilities typically restore power to consumers in a controlled, sequenced, and graduated manner. Such restoration protocols help avoid the detrimental in-rush current effects, irregular demands on generation capabilities, and potential damage to utility equipment. The power market refers to such restoration of power as a "cold start," and historically cold starts have been manually controlled.

Figure 27:
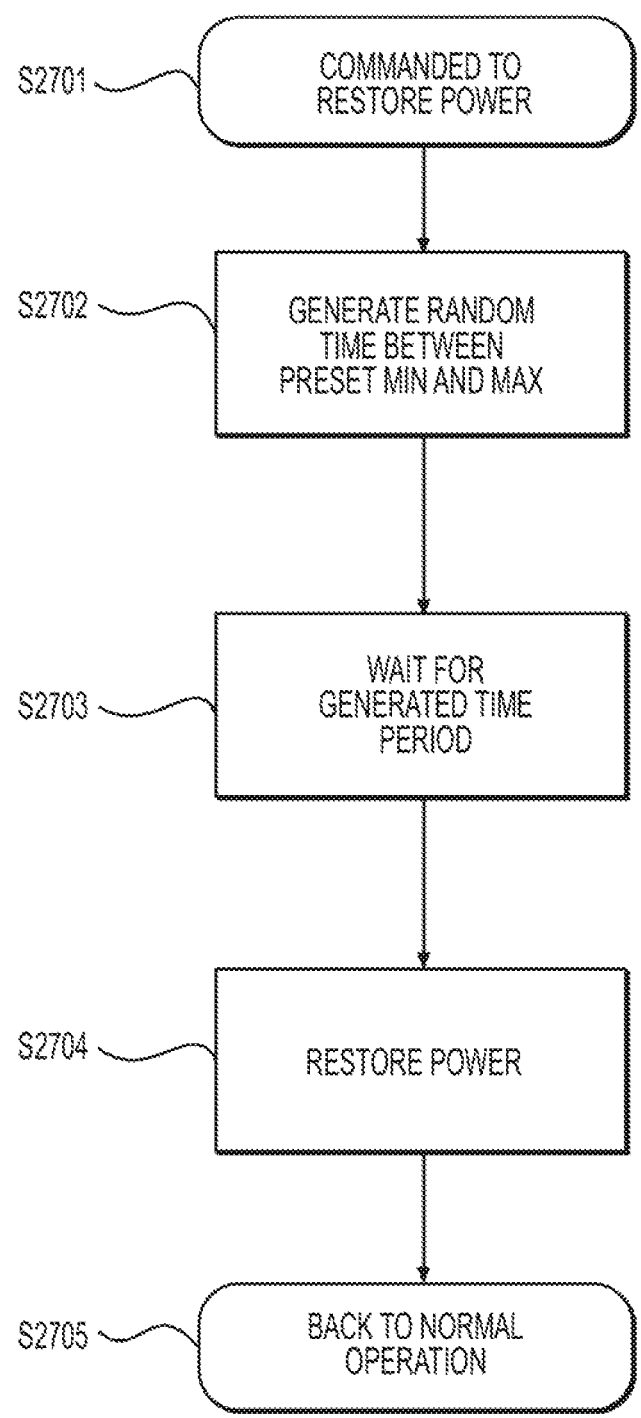
FIG. 27 is a flow chart of an embodiment of a cold-start protocol.

Embodiments of the GER device may be configured to operate protocols for restoring power distribution via cold start protocols. Such protocols may call for resumption of power distribution to consumers in a staggered and/or sequenced manner. FIG. 27 is a flow chart of an embodiment of a cold-start protocol. One of ordinary skill in the art should appreciate that the exemplar protocol shown in FIG. 27 is one of numerous methods for cold start protocols. Embodiments of a GER device may be configured to use one or more such protocols. Further, embodiments of the GER device may be configured to receive new, updated, and/or revised protocols, such as may be provided by an end user or utility.

In the exemplar protocol shown in FIG. 27, a GER device received a command to restore power to consumers S2701. The command may be issued by an end user or utility, and may come from a central management agent or, as another example, another GER device, such as a GER device in a micro-grid serving as a master device. Upon receipt of a restore command S2702, the GER device enters procedures to restore power. For instance, the GER device may generate a random time for initiating resumption of power distribution S2702. By use of internal processing, timers and random number generation, the GER device is able to provide a random delay between any two set boundary numbers to restore power to a connected consumer, after power is made present at the GER device's input. After the generated amount of time elapses (or at another signal) S2703, the GER device may restore power S2704 and resume normal operation. One of ordinary skill in the art should appreciate that other methods for sequencing cold starts may be employed.

In some embodiments, the time pause before power restoration may be preset by another source, such as, for example, a utility or other end user, a central management agent, or another GER device within a common micro-grid. In some embodiments, the cold start protocol may be configured for use and/or combined with cooperative load management techniques and protocols discussed elsewhere herein, to provide an even smoother power restoration.

Embodiments of the GER device may include embedded intelligence, i.e., one or more protocols, configured to enable random, deliberate, sequential, and/or timed resumption of power delivery. One or more algorithms and/or random number generator may be used to delay power delivery or restoration to a set of connected consumers for the purpose of demand smoothing. Embodiments of the GER device may be configured to inhibit and control power flow to a consumer based on one or more conditions and/or protocols, even if power is available through the GER device's input terminals.

The GER device installation location creates an opportunity to complement the traditional electric utility service of electricity delivery and power management. Embodiments of the GER device may include one or more of additional onboard computing capabilities, communications, and GPS services, may be used for additional purposes. Furthermore, embodiments of the GER device may include outer enclosures having the capability to include additional equipment. This flexibility allows for end users such as electric utilities to diversify the scope and features of service delivery to consumers, recoup the cost of installation through partnering with third-party service providers that may benefit from a valuable topology, and/or defer the cost of installation to a third-party service provider (to name a few examples of possible configurations). Examples of services that may be integrated include, but are not limited to, cellular repeaters, weather sensing and mapping, barometric pressure sensors and/or other sensors to pinpoint storm tracking; surveillance; EMS communications; DOT and traffic control. Services may be correlated with other onboard communications capabilities, or operated independently.

One of ordinary skill in the art should appreciate that a wide variety of additional and, in many instances, non-traditional, electric utility services may be incorporated into embodiments of the GER device. These services allow end users to maximize the use of the many topologies that may be created through installation of GER devices, within the electric utility distribution grid. Integration of additional sensory capabilities, such as barometric pressure, sound, and video, and/or cellular hardware provides numerous options for diversifying the services provided by embodiments of the GER device.

Embodiments of the GER device may perform power management and utility-service capabilities through various internal circuit and layer calibrations and configurations, direct commands from one or more of an end user, such as a utility, a central management agent, and a micro-grid controller or other GER device, and/or one or more internally loaded rules and algorithms, for example. The large number of potential internal and attached sensor inputs allow for many of a GER device's operational rules and algorithms to be replaced, revised, and updated over time. Embodiments of the GER device may also employ one or more learning or heuristic methods to modify operational rules and algorithms. A GER device's system heuristics may use data from that GER device, and may use data from other GER devices (such as in a micro-grid, for example). One of ordinary skill in the art should appreciate that processor and data storage components in a GER device may include the capability to receive, track, and analyze various data, then apply one or more algorithms to enable the GER device to make educated decisions regarding various features and functions, such as power management, for example. Heuristic algorithms may be monitored, controlled, and/or adjusted through a GER device control through, for example, a central management agent or micro-grid controller.

The functionality of the GER device may be expanded in situations when more than one GER device is installed in a distribution grid. Embodiments of the GER device may be configured to interact with and act in cooperation with one or more other GER devices. For instance, GER devices may communicate with each other to share information, data, etc. GER devices may also be configured to form localized micro-grids. A micro-grid may include one or more GER devices, in communication with each other. Micro-grids may be formed automatically, such as if more than one GER device is within a specified distance from another GER device or in the same geographical region. Alternatively, micro-grids may be formed under command or automatically upon various external events.

A micro-grid may include more than one GER device, such as two or more GER devices on the same feeder circuit. GER devices in a micro-grid may be sequential to each other along a section of a feeder circuit. A micro-grid may form a shared communications infrastructure, in which multiple PHY-layer protocols including but not limited to Wi-Fi, Wi-Max, cellular, power-line-carrier. A micro-grid may further include a common messaging layer, allowing device-to-device communications between GER devices in the same micro-grid (or other arrangements of GER devices). Micro-grids may also provide or generate a unique identification scheme through which each GER device may be identified. A GER device may be part of one or more micro-grids.

Upon a central command, power outage or reduction in capability of the distribution grid, preserving energy is a high priority. This can be accomplished through to the active control of loads and available energy sources. To enable this, Devices in an isolated section of a feeder with communication capabilities still functional will form an organized group to optimize use of available energy sources and control of attached load. Within the market, this group of local resources is generally referred to as a Micro Grid and the loss of a centralized power source introduces a situation referred to as islanding.

Figure 28:
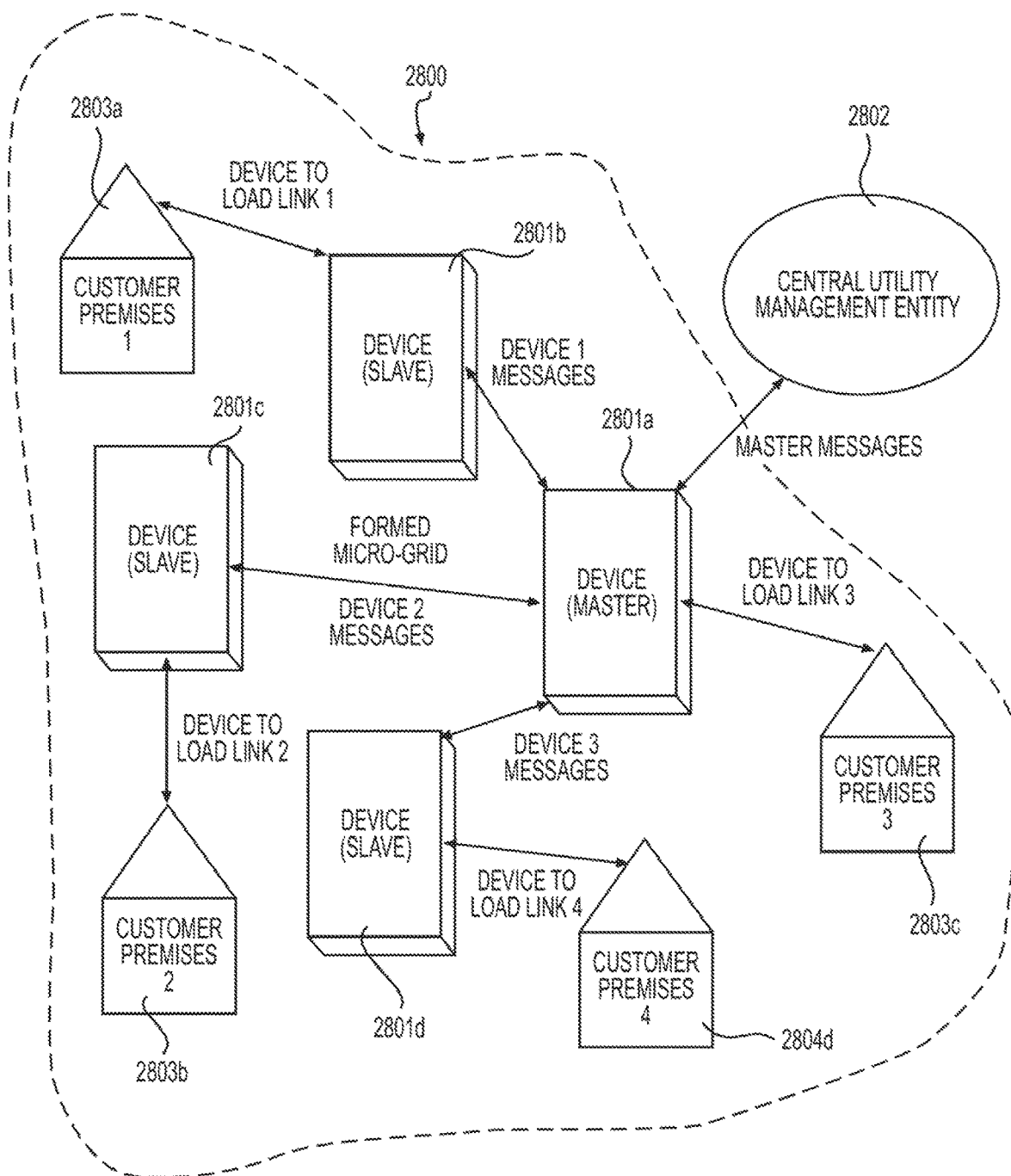
FIG. 28 shows an example of a micro-grid.

FIG. 28 shows an example of a micro-grid 2800. Micro-grid 2800 in this embodiment comprises a plurality of GER devices 2801a-2801d. As shown in this embodiment, each GER device 2801 is providing power distribution to a single customer premises 2803. The GER devices in micro-grid 2800 have established communications links between each GER device, and the micro-grid 2800 established that GER device 2801a would operate as the master GER device in the micro-grid, and that GER devices 2801b-d would operate as slave GER devices. In this embodiment, the master GER device s801a communicates with a central utility management entity 2802, such that the end user or utility may send and receive information, including messages, instructions, and data, to the micro-grid (or one or more slave GER devices) through master GER device 2801a. One of ordinary skill in the art should appreciate that other micro-grid communications pathways are possible. For example, in some embodiments, central utility management entity 2802 may also communicate with individual GER devices. Similarly, slave GER devices may communicate with other slave GER devices.

Embodiments of the GER device may be configured to use algorithms that, upon the occurrence of one or more predefined grid events, the GER device enters into a "grid formation" mode. The GER device may then poll for local GER devices in an attempt to form a micro-grid with other GER devices in a common area, for example. Micro-grids may be formed among GER devices based on more than location. For instance, a micro-grid may be formed among GER devices with a common set of features (e.g., all GER devices in a micro-grid include voltage management or surveillance capabilities). As another example, a micro-grid may be formed between GER devices with a shared local communications link; such as Wi-Fi, ZigBee or another local RF system, a cabled network, or a virtual network formed at a higher layer on a broader communications network such as cellular WAN. As another example, a micro-grid can be formed by type of customer (e.g. residential, senior living center, grocery center, gas stations) and/or geographical area.

Micro-grid formation and operation may be accomplished through one or more algorithms, as should be appreciated by one of ordinary skill in the art. Alternatively, these algorithms can be combined as would be evident to one of ordinary skill in the art.

Figure 29:
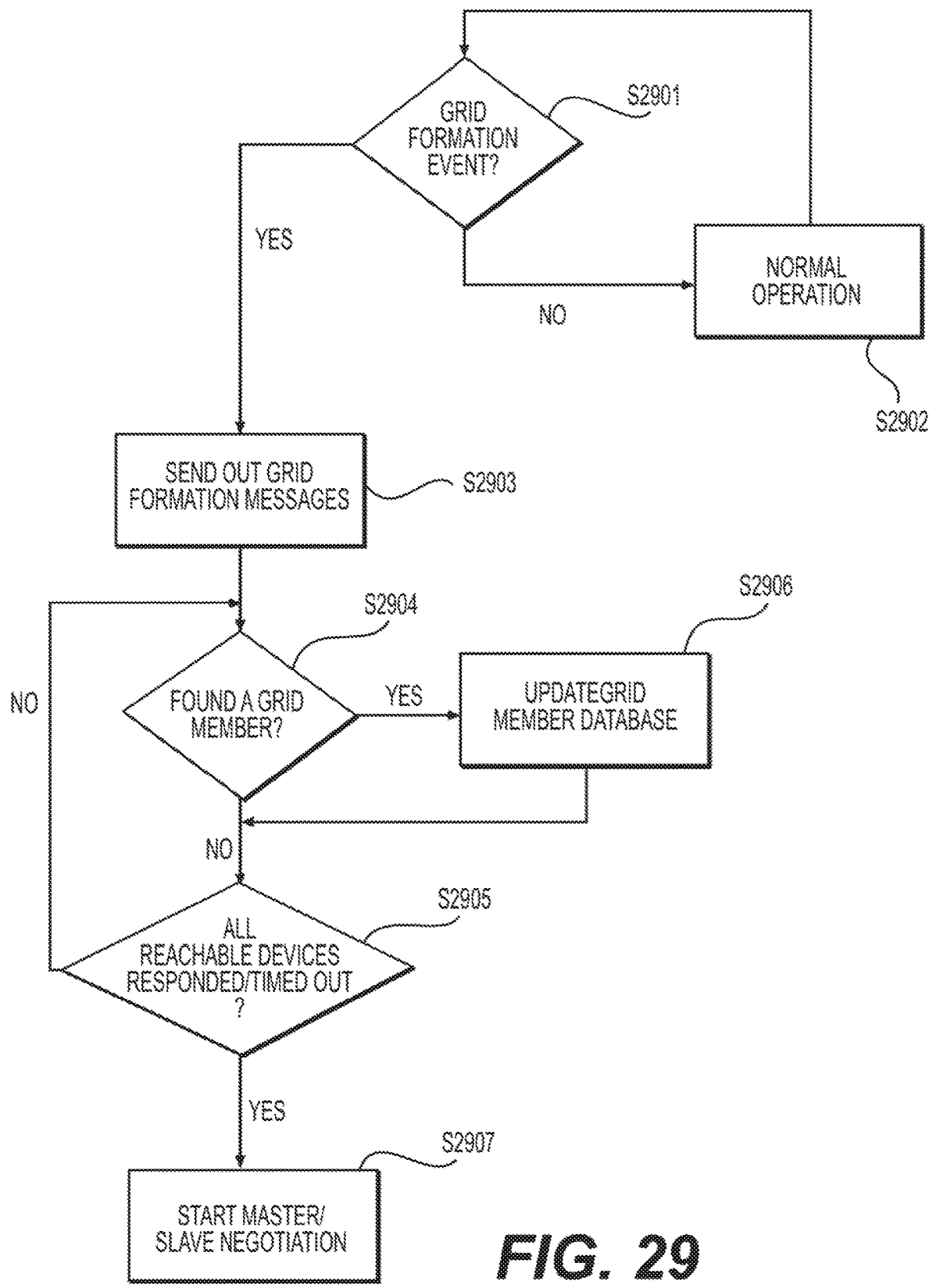
FIG. 29 is a flow chart of an embodiment of a grid formation protocol.

FIG. 29 is a flow chart of an embodiment of a grid formation protocol. Under the exemplar protocol, GER devices will enter Grid Formation Mode upon the occurrence of a grid formation event S2901. For example, a grid formation event may include any of the following: a command to do so by the central management agent; losing communication with the central management agent; receiving a grid request from another GER device; etc. If a grid formation event has not occurred, then the GER device may continue operating in a prior setting S2902.

When a GER device is in Grid Formation Mode, it may then signal the event to one or more other GER devices S2903, and wait for responses. Responses may indicate the state of other GER devices. In some embodiments, the GER device may continue in normal operation mode while listening of other GER devices. One another GER device has been identified, the protocol in FIG. 29 allows for the entry of a found GER device into or otherwise update a grid database S2906. After a predetermined amount of listening, or devices found, or other limitation S2905, the GER device may cease listening and begin another micro-grid algorithm, such as a master/slave negotiation S2907. One of ordinary skill in the art should appreciate that other algorithms may follow. Further, one of ordinary skill should appreciate that a GER device may continue in listening mode after starting another algorithm, such as a master/slave negotiation algorithm. In some embodiments of micro-grid formation protocols, a single GER device may form a micro-grid with identified GER devices that are also in Grid Formation Mode. In this way the size, configuration and geographic location of a formed micro-grid can be controlled via commands from the central management agent to each device to go into Grid Formation Mode or local algorithms based on external conditions. In other embodiments of micro-grid formation protocols, a GER device that has entered Grid Formation Mode may instruct other GER devices to enter Grid Formation Mode.

Figure 30:
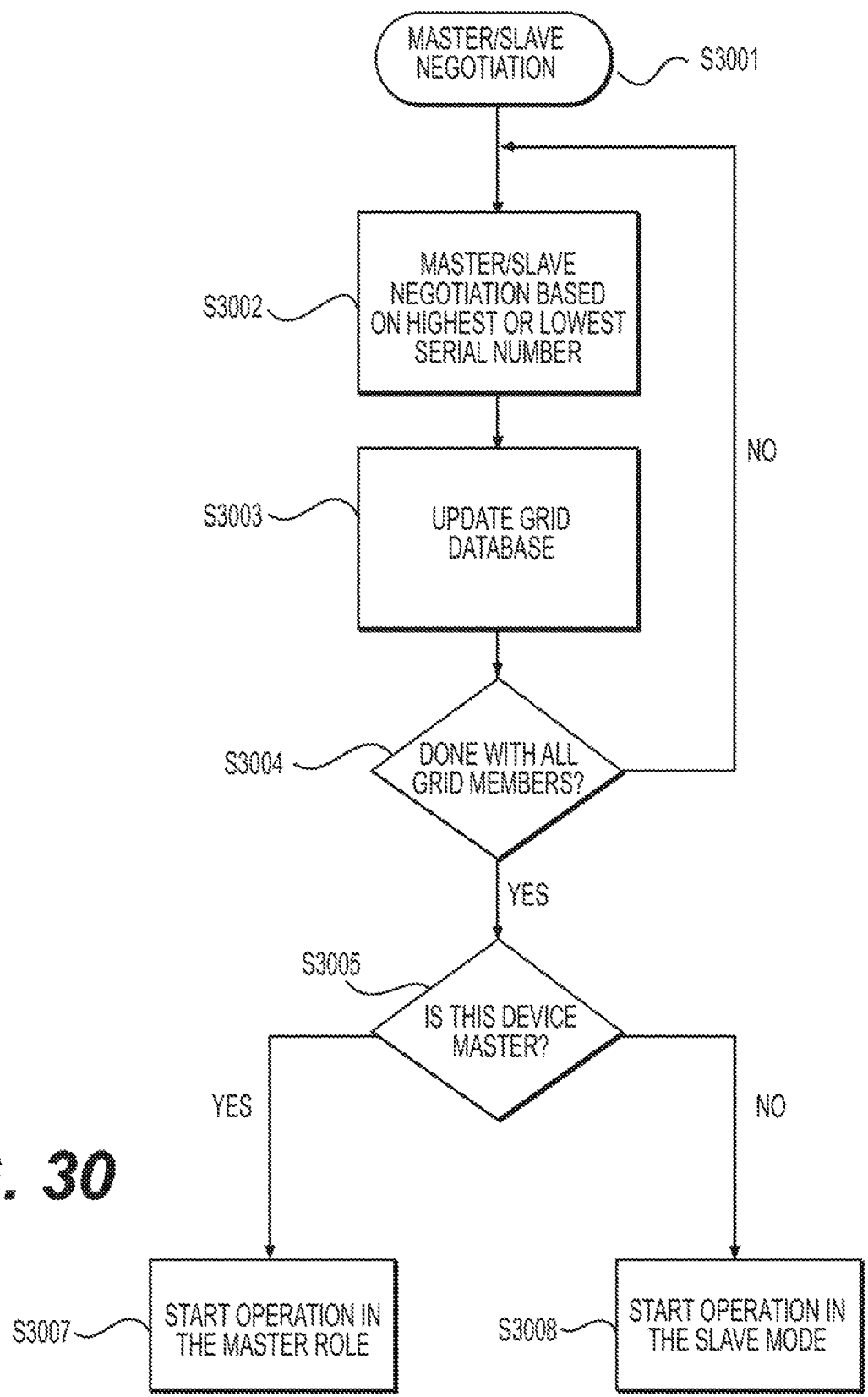
FIG. 30 shows a flow chart of an embodiment of a master device and slave device negotiation protocol.

A micro-grid may include one or more GER devices identified as a master device, and one or more GER devices identified as a slave device. A master device may be given certain responsibilities, capabilities, etc., and/or serve as a primary point of communication for other micro-grids, a utility, or other end user, for example. A slave device may depend on a master device for one or more services or instructions, such as when to delivery power, when to cold start, etc. Numerous methods may be used to identify master and slave devices. For example, FIG. 30 shows a flow chart of an embodiment of a master device and slave device negotiation protocol. In the exemplar protocol shown in FIG. 30, GER devices that communicate regarding forming a micro-grid may initially decide on which GER device is master through a simple ruling based on an embedded serial number (A) such as highest or lowest or based on previous configuration from a central management agent.

As shown in FIG. 30, GER devices may enter a master/slave negotiation algorithm S3001. In this simple protocol, the negotiation may be based on the serial number pre-assigned to each GER device S3002. Serial numbers of GER devices in a micro-grid may be added to a grid database S3003. After all GER devices have provided serial numbers S3004, then the highest (or lowest) serial number may determine the master device S3005. One of ordinary skill in the art should appreciate that other methods of identifying the master device as possible, such as relative location along a feeder circuit, geographical location, onboard communications features, etc. Depending on the master/slave assignment, each GER device may then operate in the micro-grid as a master device S3007 or slave device S3008.

For example, after a master device is identified S3005, slave devices may enter a mode S3008 whereby communications from the master device are relayed as necessary, and one or more actions of slave devices are performed by command of the master. As another example, master and slave devices may update their individual grid databases accordingly. As more GER devices interact with the master device, a negotiation algorithm, such as the exemplar algorithm shown in FIG. 30, may be repeated. In some embodiments, an algorithm may include steps for the addition of GER devices to an existing micro-grid. In some embodiments, a different algorithm may be used to add GER devices to a micro-grid in which a master device has already been identified. In some embodiments, a micro-grid may be formed with a single master device. In some embodiments, a micro-grid may have more than one master device. In some embodiments, a micro-grid may have a master device for one or more specific functions (e.g., communicating with an end user), and a separate master device for other functions (e.g., communicating with other micro-grids, communicating with non-grid assets, such as police and paramedic authorities). In some embodiments, a GER device declared the master in one negotiation may be declared as a slave during a later negotiation, or even in a separate micro-grid.

The maximum number of micro-grid members can be defined by a pre-defined parameter or controlled by external circumstances such as available generation and storage assets.

After formation of a micro-grid, the GER devices in the micro-grid may begin grid operations. Grid operations may be in addition to one or more ongoing or normal GER device operations. A micro-grid may include one or more grid operation algorithms. One of ordinary skill in the art should appreciate that numerous grid operations protocols are possible, depending on the nature, purpose, and responsibility of the micro-grid.

Figure 31:
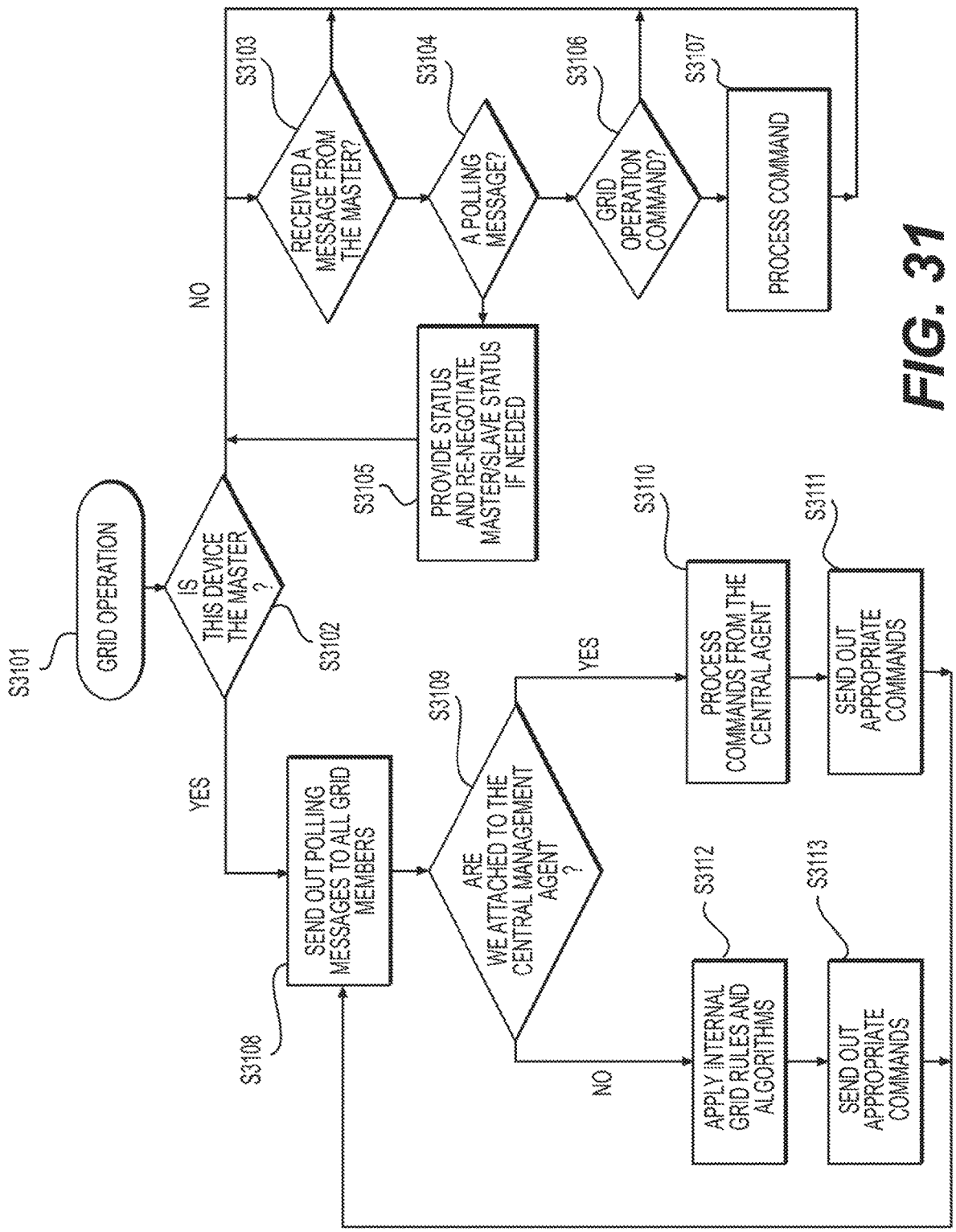
FIG. 31 illustrates a flow chart for an embodiment of a micro-grid operation protocol.

FIG. 31 illustrates a flow chart for one embodiment of a micro-grid operation protocol. In the exemplar protocol, after micro-grid formation, GER devices may initiate grid operation protocol S3101. The grid operation protocol may be the same for all GER devices on the micro-grid, or the grid protocol may vary in whole or in part depending on whether a GER device is a master device or a slave device. In the exemplar protocol in FIG. 31, the protocol determines whether the GER device is a master device or slave device S3102. If the GER device running the grid operation protocol is a master device, then that GER device may send a polling message to all member devices of the micro-grid S3108. The polling message may query whether, for example, the micro-grid is connected to or otherwise in communication with (e.g., through one or more member GER devices) a central management agent S3109. If so, then the micro-grid may wait for and follow instructions from the central agent (or other authorized source of instructions) S3110, and subsequently send out any commands or instructions to act S3111 based on instructions from S3110 (along with any other instructions from internal algorithms, for example). If the micro-grid is not connected to or otherwise in communication with a central management agent, then the micro-grid may apply internal rules and/or algorithms S3112. One of ordinary skill in the art should appreciate that such internal rules and algorithms may depend on the nature and/or purpose of the micro-grid. For example, if the micro-grid is formed for surveillance purposes, then the algorithm may include instructions for monitoring and recording audio and visual data. The master GER device may then issue instructions to other GER devices S3113.

If a GER device is a slave device in the micro-grid, then the slave device may determine whether a master device has sent a message S3103. The message may include a polling message, data, instructions, etc. If the message includes or is a polling message S3104, then the slave device may provide its status to the master device S3105. Providing status to a master device S3105 may also include re-negotiating the master/slave relationship, if necessary. The grid operation may provide for dynamic grid reforming based on various circumstances, such as, for example only, a fault or authorized command. If the message includes a grid operation command S3106, then the salve GER device may process the command S3107. A command may be, for example, directions for power routing and distribution. A command may be, for example, a sequenced cold-start for consumers receiving power from GER devices on the micro-grid. One of ordinary skill in the art should appreciate that a grid operation command may include a wide variety of instructions, based on, for example, the purpose of the micro-grid, current operating conditions, instructions from a central agent, etc. The exemplar algorithm shown in FIG. 31 is not meant to be limiting in any manner, but instead serve as a simple example of a grid operation protocol that may be performed by one or more GER devices in a micro-grid.

A micro-grid may provide numerous additional services to the utility, consumers, and third parties. For example, a micro-grid may be given the capability of sharing communications capabilities between members. For example, one GER device in a micro-grid may be used to boost communications signals from another GER device in the same micro-grid. As another example, a single GER device may receive messages or other data from multiple GER devices, compile and then deliver such data. As a result, a micro-grid may be used to reduce overall communications traffic. As another example, a micro-grid may be used to locally manage one or more GER devices, such as, for example, during periods when communications to the central management agent or other authority are lost, for instance, as a result of fault or deprioritizing.

In some embodiments, after GER devices form a micro-grid, one or more member GER devices may form or update a membership database. The membership database may include a variety of information, including for example only, identification of master and slave devices, features and functionalities on one or more GER devices in the micro-grid, and what communications links are available between members of the Micro-Grid and to any central management agent or other authority. In some embodiments, member GER devices may use a high level message passing scheme. The message passing scheme may be in addition to, part of, and/or independent of, physical layer communications link types. For example, when a member GER device seeks to send a message to the central management agent, but does not have a direct link to the agent, that GER device may use a membership database to determine a communications route through the micro-grid, to the central management agent (or other intended recipient). Destination, route, and source information may be encapsulated in the message, such that any intervening GER devices may determine whether the message is intended for that GER device, or instead requires relaying along a route. In a similar fashion, when any central management agent or other authority seeks to send a message to a member GER device, but has no direct communications link to that GER device, then the agent may use a membership database to select a route for relaying the message between other GER devices on the micro-grid to the targeted GER device. In some embodiments, a GER device may receive a message and a recipient, and determine a communications route to deliver the message. In some embodiments, a grid protocol may include instructions for delivering a message to a targeted GER device, which may include determining a communications route. These methods may constitute a physical layer agnostic routing scheme based on high level message passing.

In some embodiments, messages passed between micro-grid members may contain an indication of priority. The priority may include multiple levels, such that during reduced communications capability, a micro-grid (or an individual GER device) may prioritize passing of certain messages over others. In some embodiments, a grid protocol may include a store-and-forward system for low priority messages. Such messages may be stored and transmitted after communications capabilities improve, for example. Some messages may be deemed unimportant and deleted, based on factors such as message priority, internal storage space, and time.

Figure 32:
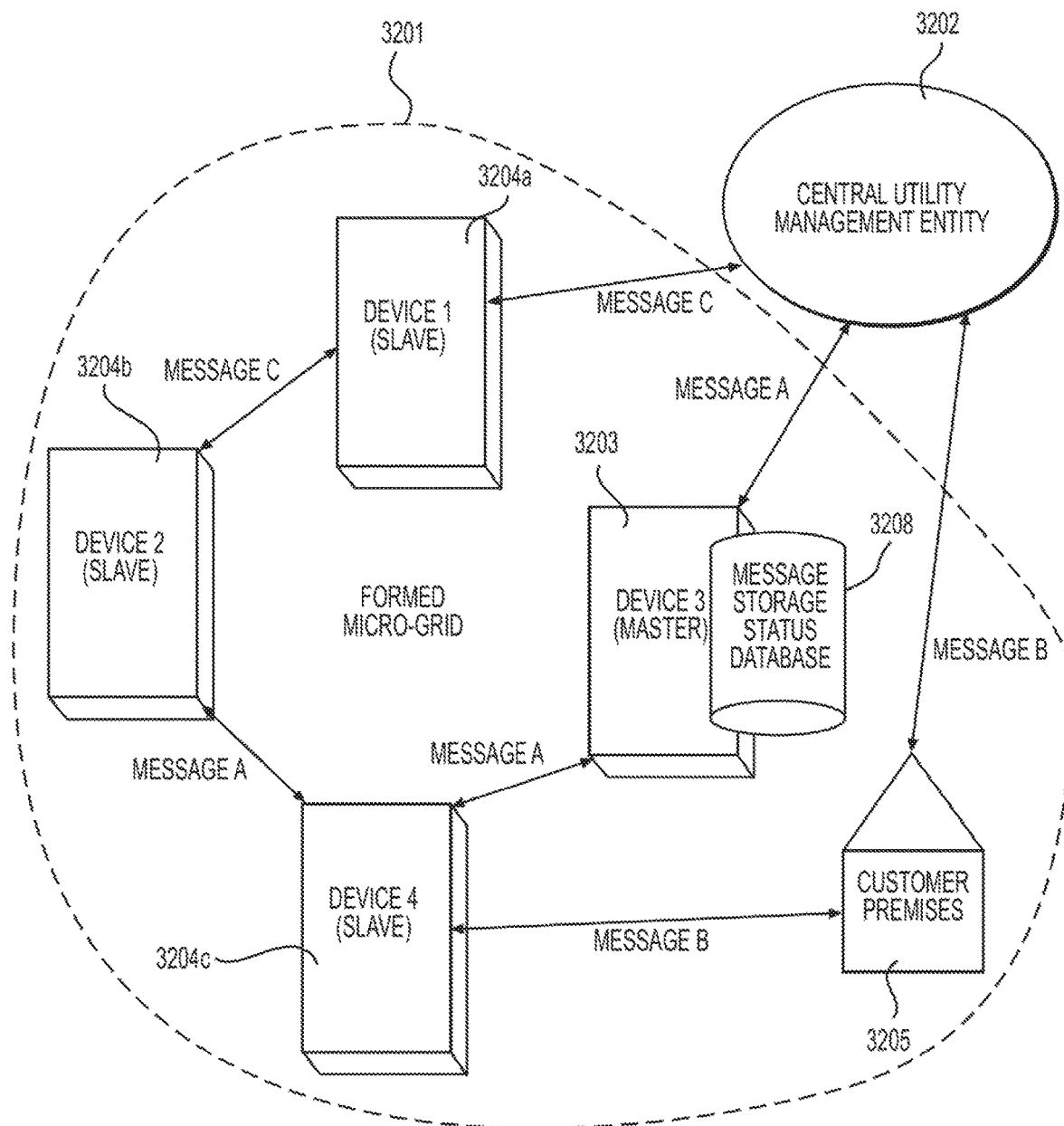
FIG. 32 shows an example of a micro-grid.

FIG. 32 shows an example of a micro-grid 3201. Within micro-grid 3201, master GER device 3203 and slave GER devices 3204a-3204c may be configured for using one or more direct communications links, such as peer-to-peer communications, to communicate messages and data, including Message A and Message C, directly between GER devices. Member devices in micro-grid 3201 may receive a message from a central utility management entity 3202, and route the message to the ultimate or intended destination. For example, central utility management entity 3202 may transmit Message C, intended for GER device 3204b. However, GER device 3204b may not have a direct communications link with central utility management entity 3202. In some embodiments, central utility management entity 3202 may transmit Message C to micro-grid 3201 with communications route information, and GER device 3204a may receive Message C, decode the communications route information, and transmit Message C to destination GER device 3204b. In some embodiments, central utility management entity 3202 may send Message C to the micro-grid 3201, and the micro-grid 3201 or a GER device, such as GER device 3204a, may determine that Message C should be transmitted to GER device 3204b.

As another example, central utility management entity 3202 may transmit Message A with the goal of GER devices 3204b and 3204c receiving the message. Master GER device 3203 may receive Message A, and transmit Message A to GER device 3204c. GER device 3204c may determine that Message A should also be transmitted to GER device 3204b, based on, for example only, instructions in Message A, additional instructions from master GER device 3203, or another grid protocol. Message A may include information instructing GER device 3204c to send Message B to a consumer location, such as customer premises 3205. Alternatively, central utility management entity 3202 may have a separate communications link with customer premises 3205, and may use that link to route Message B to GER device 3204c. One of ordinary skill in the art should appreciate that the communications routes shown in FIG. 32 are merely demonstrative, and that numerous configurations are possible for transmitting messages and data between GER devices and other senders and recipients over a micro-grid. As shown in FIG. 32, a master GER device 3203 may serve as a communications hub for a micro-grid 3201 communicating with a central utility management entity 3202. In some embodiments, any GER device in micro-grid 3201 may have an active role in receiving and transmitting messages and data.

In some embodiments, a GER device may include data storage 3208 that may be used for storing messages, data, and instructions. Database 3208 may retain messages and data during communications outages, for subsequent transmission. For example, if a communications path to the utility central management entity 3202 is unavailable, or if a direct communications path is not available, then database 3208 may store messages and data for later retrieval or transmission. Alternatively, if a separate utility-to-consumer communications path is present, then a GER device may utilize commercially available communications channels in order to communicate with central utility management entity 3202. As shown in FIG. 32, for instance, customer premises 3205 may have a communications path with central utility management entity 3202 for transmitting Message B. Micro-grid 3201 may be configured to use that additional communications route in certain situations, as should be appreciated by one of ordinary skill in the art.

One of ordinary skill in the art should appreciate that micro-grids may be used to centralize data among GER devices, and as a result save communications bandwidth, and/or provide for continued communications in the event of a loss of communications with a central utility management entity 3202 or other authority. Embodiments may be configured to operate protocols to establish of alternative communication routes. Alternative communications routes may include consumer-owned equipment and consumer-purchased services, for example. Some embodiments may permit the ad-hoc establishment of a peer-to-peer, message passing, communications networking scheme or schemes, between members of a micro-grid. Communications schemes may be agnostic of physical communications links. Communications between GER devices, a central utility management entity, and/or other distribution grid entities may include embedded source, destination, and priority information. Such information may be embedded in high level messages to allow message relaying the message and/or data to target destinations. Embodiments may include protocols for delaying and/or dropping lower priority messages in favor of higher priority ones.

Embodiments of a micro-grid may be configured to use one or more protocols for power load and supply management. For instance, a micro-grid may employ protocols to optimize source-to-load ratio. As an example, a micro-grid may form because of a reduction of a distribution grid's capability. In such a situation, it may become critical to optimize the source-to-load ratio. Part of the optimization may involve assessing available resources and demands, and prioritizing distribution, services, and other elements based on one or more factors, such as consumer need, emergency operation, and ultimate consequence.

Figure 33:
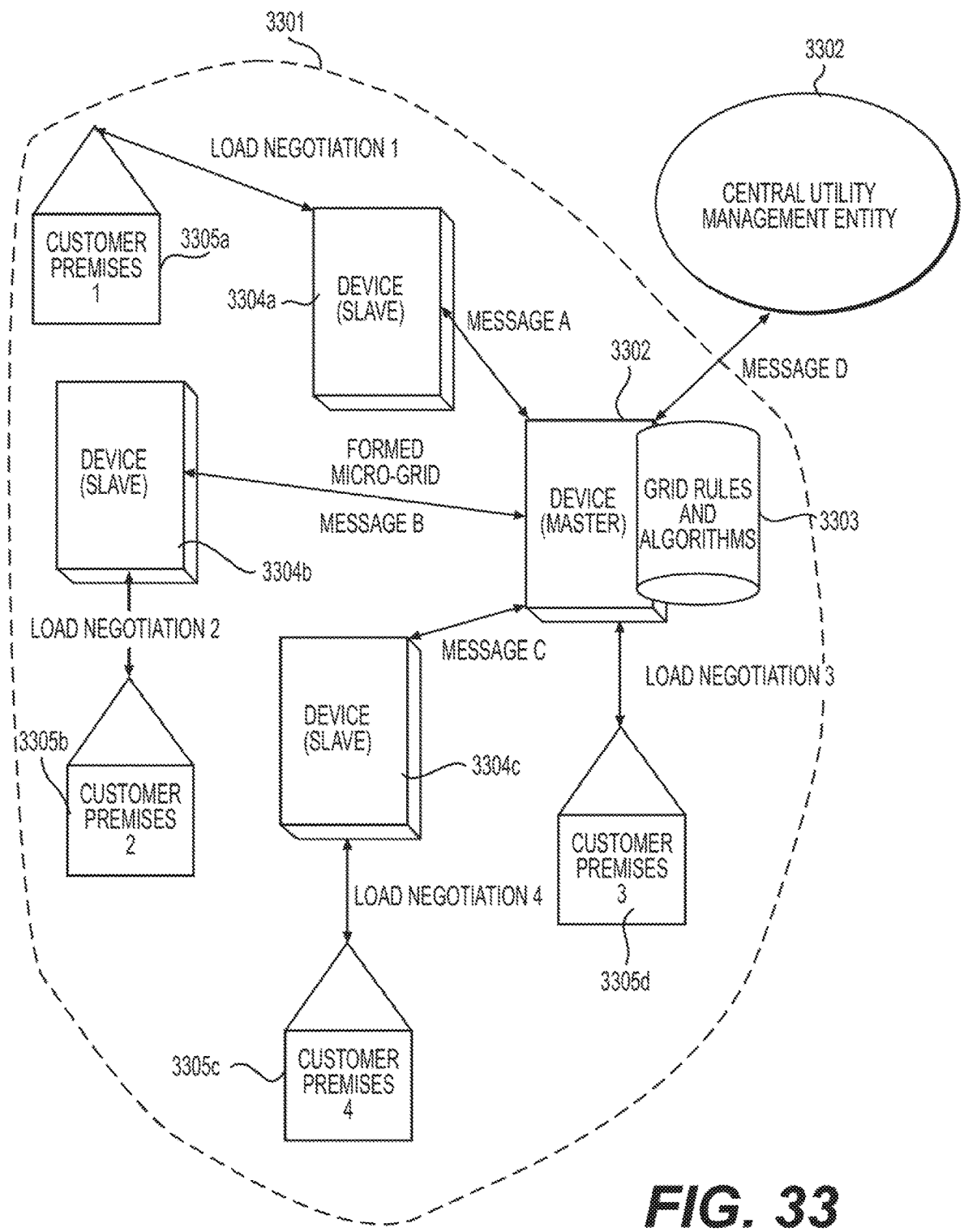
FIG. 33 illustrates an example of load negotiation in a micro-grid.

FIG. 33 illustrates an example of load negotiation in a micro-grid 3301. Micro-grid 3301 may have previously formed, or may be formed during a grid formation event such as sudden power distribution interruption, as described above. In this exemplar embodiment, micro-grid 3301 includes master GER device 3302 and slave GER devices 3304a-3304c. In this embodiment, each GER device supports one consumer, customer premises 3305a-3305d. Master GER device 3302 is in direct communication with central utility management entity 3302.

Micro-grid 3301, and/or the individual GER devices that form micro-grid 3301, may operate one or more protocols for load and supply management. For example, upon power distribution outage, each GER device in a micro-grid may communicate with consumers to determine current and expected load (Load Negotiation 1-4). GER devices may then report to the master GER device 3302 what load reduction capabilities are available (Message A, B and C). The master GER device 3302 may use commands from the central utility management entity 3302 (Message D), and/or its other rules and algorithms, to coordinate load reduction and power restoration commands/requests (Message A, B and C). Protocols for load management may include a number of different techniques for managing the service, as one of ordinary skill in the art should appreciate. For example, master GER device 3302 may require some slave GER devices 3304a-3304c to eliminate power to their respective consumers. Alternatively, one or more GER devices may be instructed to minimize load, or initiate one or more load management protocols, such as shown in FIG. 10. In some embodiments, a GER device, such as master GER device 3302, may continually monitor and control other GER devices in the micro-grid 3301. One of ordinary skill in the art should appreciate that a micro-grid may employ numerous methods for load negotiation and management, based on various factors such as operating conditions, available power, back-up power, demand, and priority, for example.

A Micro-grid, or GER devices in a micro-grid, may be configured to perform a polling method to determine available power resources. Available power sources may include diminished power from a distribution grid, power storage units, and power-generation units, for example. Embodiments of a polling method may determine load demands by consumers relying on GER devices in the micro-grid. One of ordinary skill in the art should recognize that numerous prioritization algorithms may be used to calculate available power and evaluate the most critical power needs. Such algorithms may be preprogramed, re-flashed (by, for example, a central management agent), or generated by a GER device.

Embodiments of the GER device may be configured to use rules and algorithms stored in a database 3303 of one or more GER devices. The database 3303 may include rules and algorithms developed prior to installation, and rules and algorithms updated, revised, or added during operation. Such rules and algorithms may be updated and revised based on, for example, system heuristics, modelling, utility procedures, and external conditions. The grid rules and algorithms may be coordinated by the micro-grid, a central authority, a GER device, or a combination thereof.

In some embodiments, after micro-grid formation, a GER device, such as a master GER device 3302, may implement grid management using a set of rules and/or algorithms 3302. Grid rules and algorithms may be updated and revised as needed, such as by a central management authority, or a GER device. For example, GER devices may update grid rules and algorithms through a download implemented over a communications link. The update may be triggered by, for example, conditions that dictate a change in the micro-grid behavior. The update or revisions may be specific to a micro-grid, or applicable to all or a subset of GER devices in a distribution grid. One of ordinary skill in the art should appreciate that there are numerous methods for providing updates to grid rules and algorithms. A GER device may report grid rules and algorithms implemented at a micro-grid level to the utility central management system. The report may be at a higher level of control/reporting than usual without grid formation, if, for example, communication is available. Grid rules and algorithms may be updated by the utility central management system as appropriate. In some embodiments, a designated GER device, such as a master GER device, may collect status information and other data from GER devices in a micro-grid. In some embodiments, a GER device may collect data from other attached/monitor devices for reporting to the utility central management system.

If a Grid is, alternatively, operating independently (i.e. not under central utility management system control), that grid may be controlled via any and all user interfaces of the Master Device (UI Message) to override internal Master embedded algorithms/rules (Grid Rules and Algorithms Sub-Set). The embedded rules/algorithms can be updated at any time by the central management agent but if the link to that agent is down then the latest set are used by the Master Device.

One of ordinary skill in the art should appreciate that micro-grids may be used for continued implementation of utility operating algorithms, even after communication loss with a central management agent, and also during normal operation. Updated or revised algorithms for grid management may be distributed through smaller independent algorithms, to be implemented at the grid edge. Management of a distribution grid at the grid edge may include communication between GER devices and a central management agent. Messages may include high information content, but at lower frequency and/or bandwidth, as appropriate for the particular communication. Further, authorized end users, such as utility personnel, may manage GER devices and/or micro-grids through a user interface included in, or attached to, one or more GER devices.

As will be appreciated by one of skill in the art, aspects or portions of the present approach may be embodied as a method, system, and at least in part, on a computer readable medium. Accordingly, the present approach may take the form of combination of hardware and software embodiments (including firmware, resident software, micro-code, etc.) or an embodiment combining software and hardware aspects that may all generally be referred to herein as a "circuit," "module" or "system." For example, measurements and subsequent calculations can be automated, using one or more software modules to characterize the device, record resistance changes, calculate deflections, calculate device temperature, and/or calculate rate of heat accumulation or exchange. Furthermore, the present approach may take the form of a computer program product on a computer readable medium having computer-usable program code embodied in the medium. The present approach might also take the form of a combination of such a computer program product with one or more devices, such as a modular sensor brick, systems relating to communications, control, an integrate remote control component, etc.

Any suitable non-transitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transitory computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transitory medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach is described with reference to illustrations and/or diagrams of methods, apparatus (systems) and computer program outputs according to embodiments of the approach. It will be understood that the steps described above, and the outputs, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc.

One of ordinary skill should understand that the above description and the Figures illustrate the architecture, functionality, and operation of possible implementations of devices, systems, methods, and computer program products according to various embodiments of the present approach. In this regard, each step in the disclosed embodiments and each calculation and output may represent a block, module, segment, or portion of code, which comprises one or more executable instructions for implementing the specified logical function(s). It should also be noted that, in some alternative implementations, the functions in a block may occur out of the order noted in the figures. For example, two blocks in succession may, in fact, be executed substantially concurrently, or the blocks may sometimes be executed in the reverse order, depending upon the functionality involved. It will also be noted that each block, and combinations of blocks in, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the foregoing description references certain preferred embodiments, other embodiments are possible. Additionally, the foregoing illustrative embodiments, examples, features, advantages, and attendant advantages are not meant to be limiting, as the devices, systems, and methods disclosed herein may be practiced according to various alternative embodiments, as well as without necessarily providing, for example, one or more of the features, advantages, and attendant advantages that may be provided by the foregoing illustrative embodiments.

Accordingly, while devices, systems, and methods have been described and illustrated in connection with preferred embodiments, many variations and modifications as will be evident to those skilled in the art may be made without departing from the scope of the present approach, and the claims should not be limited to the precise details of methodology or construction set forth above, as such variations and modifications are intended to be within the scope of the claims.

What is claimed is:

1. An electrical distribution grid energy management device comprising:
   (i) a primary electrical connection terminal for receiving power from an electrical grid power supply;
   (ii) at least one secondary electrical connection terminal for providing power to a consumer electrical supply line;
   (iii) a modular electrical circuit layer including a power processing circuit for receiving a portion of the power from the primary electrical connection terminal, processing power through a central DC power stage, and providing power from the central DC stage to at least one of the at least one secondary electrical connection terminals,
      (a) the power processing circuit configured to convert power received at the central DC power stage to DC power, and
      (b) the power processing circuit configured to convert DC power exiting the central DC stage to AC power;
   (iv) a controller layer configured to control the modular electrical circuit layer, the control layer comprising at least one computer processor and nonvolatile memory coupled to the computer processor; and (v) a physical layer comprising at least one communication device in operable communication with the controller layer, (vi) wherein the modular electrical circuit layer further comprises a Power Factor Correction stage and a Voltage Regulation stage, wherein the Power Factor Correction stage and Voltage Regulation stage are disposed on opposite sides of the central DC power stage, thereby providing harmonic isolation between the primary electrical connection terminal and at least one of the at least one secondary electrical connection terminals, and;

(vii) further wherein the electrical distribution grid energy management device comprises a modular power processing architecture capable of electrically coupling to a second grid energy management device for increasing one or more of power levels and voltages available at a site.

2. The energy management device of claim 1, further comprising at least one bidirectional DC power connection port configured for electrical communication with a DC power resource, the at least one DC power connection port in electrical communication with the central DC power stage.

3. The energy management device of claim 1, further comprising at least one AC power connection port configured for electrical communication with an AC power source, the at least one AC power connection port in electrical communication with an AC-to-DC power converter, the AC-to-DC power converter in electrical communication with the central DC stage.

4. The energy management device of claim 1, further comprising a first sensor for measuring at least one of voltage, current, power quality, and device load, on the primary electrical connection terminal, and a second sensor for measuring at least one of voltage, current, power quality, and device load, on the at least one secondary electrical connection terminal, the first and second sensors in communication with the controller layer.

5. The energy management device of claim 1, further comprising a Power Quality Meter, for measuring power quality of the primary electrical terminal and the at least one secondary electrical terminal.

6. The energy management device of claim 1, wherein the energy management device is configured for mounting on at least one of a pole, a pad, and a building.

7. The energy management device of claim 1, further comprising a communications link in communication with the controller layer and configured to receive data indicative of at least one of power provided to at least one consumer, and power demanded by at least one consumer.

8. The energy management device of claim 1, further comprising at least one current sense connection socket, the at least one socket in communication with the controller layer and configured for electrical communication with a current sense cable.

9. The energy management device of claim 1, further comprising a bi-directional direct current connection point configured to receive power from a direct current source.

10. The energy management device of claim 1, wherein the modular electrical circuit layer further comprises at least one harmonics filter.

11. The energy management device of claim 1, further comprising a high-to-low voltage converter.

12. An energy management device for placement on a portion of an electrical distribution grid downstream of a source connection and upstream of an energy consumer connection, the energy management device comprising:

a primary electrical connection terminal for receiving power from a source connection, the primary electrical connection terminal comprising at least one of a first voltage sensor and a first current sensor;

(ii) at least one secondary electrical connection terminal for providing power to a consumer, the at least one secondary electrical connection terminal comprising at least one of a second voltage sensor and a second current sensor;

(iii) a modular electrical circuit layer in electrical communication with the primary electrical connection terminal and the at least one secondary electrical connection terminal, the electrical circuit layer in thermal connection with a heat exchange system for dissipation of heat generated by the electric circuit layer, wherein the modular electrical circuit layer comprises a power processing circuit for receiving a portion of the power from the primary electrical connection terminal, processing the power through the central DC power stage, and providing the power from the central DC stage to the at least one secondary electrical connection terminal, (a) the power processing circuit configured to convert power received at the central DC power stage to DC power, and (b) the power processing circuit configured to convert DC power exiting the central DC stage to AC power;

(iv) a controller layer configured to control the electrical circuit layer, the control layer comprising at least one computer processor and nonvolatile memory coupled to the computer processor in operable communication with the at least one first and second sensors, so as to receive an output signal from the at least one first and second sensors;

(v) a physical layer comprising at least one communication device in operable communication with the controller layer, the communication device for transmitting data relating to the output signal to an end user;

(vi) wherein the modular electrical circuit layer further comprises a Power Factor Correction stage and a Voltage Regulation stage, wherein the Power Factor Correction stage and Voltage Regulation stage are disposed on opposite sides of a central DC power stage, thereby providing harmonic isolation between the primary electrical connection terminal and at least one of the at least one secondary electrical connection terminals, and;

(vii) further wherein the energy management device comprises a modular power processing architecture capable of electrically coupling to a second energy management device for increasing one or more of power levels and voltages available at a site.

13. The energy management device of claim 12, further comprising a Power Quality Meter for measuring power quality of the primary electrical terminal and the at least one secondary electrical terminal.

14. The energy management device of claim 12, wherein the physical layer includes a communication device configured to receive data indicative of at least one of power provided to at least one consumer, and power demanded by at least one consumer.

15. The energy management device of claim 12, wherein the physical layer includes a communication device configured to communicate with a second energy management device.

16. The energy management device of claim 12, wherein the nonvolatile memory comprises computer program code embodied therein that, when executed by the processor, perform operations comprising:
  (a) using the communication device, transmitting to an end user data relating to the output signal;
  (b) responsive to a grid event, execute a managing command; and
  (c) using the communication device, transmitting to the end user data relating to the output signal following execution of such managing command.

17. The energy management device of 12, wherein the nonvolatile memory comprises computer program code embodied therein that, when executed by the processor, perform operations comprising:
  (a) identifying a micro-grid formation event;
  (b) using the communication device, transmitting a grid formation message to at least one other energy management device in communication with the energy management device;
  (c) using the communication device, receiving data from the at least one other energy management device; and
  (d) forming a micro-grid with the at least one other energy management device.

18. The energy management device of claim 17, wherein the operations further comprise identifying a master energy management device.

19. The energy management device of claim 17, wherein the operations further comprise using the communication device to communicate with an end user.

* * * * *